US012719073B2

(12) United States Patent
Sevov et al.

(10) Patent No.: US 12,719,073 B2
(45) Date of Patent: Aug. 25, 2026

(54) REDOX RELAY FLOW BATTERIES AND METHODS OF MAKING THE SAME

(71) Applicant: Ohio State Innovation Foundation, Columbus, OH (US)

(72) Inventors: Christo Sevov, Columbus, OH (US); Curt Wong, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 675 days.

(21) Appl. No.: 17/924,473

(22) PCT Filed: May 13, 2021

(86) PCT No.: PCT/US2021/032160
§ 371 (c)(1),
(2) Date: Nov. 10, 2022

(87) PCT Pub. No.: WO2021/231683
PCT Pub. Date: Nov. 18, 2021

(65) Prior Publication Data

US 2023/0178784 A1 Jun. 8, 2023

Related U.S. Application Data

(60) Provisional application No. 63/024,598, filed on May 14, 2020.

(51) Int. Cl.
*H01M 8/18* (2006.01)
*H01M 12/08* (2006.01)

(52) U.S. Cl.
CPC ............ *H01M 8/188* (2013.01); *H01M 8/18* (2013.01); *H01M 12/08* (2013.01)

(58) Field of Classification Search
CPC ......... H01M 8/188; H01M 8/18; H01M 12/08
See application file for complete search history.

(56) References Cited

U.S. PATENT DOCUMENTS

2014/0030623 A1* 1/2014 Chiang ............ H01M 8/04074 429/457
2014/0239906 A1* 8/2014 Anderson ............ H01M 8/188 429/105

(Continued)

FOREIGN PATENT DOCUMENTS

CN 108933271 A 12/2018
EP 0197465 A2 * 10/1986 ............ H01M 10/05

(Continued)

OTHER PUBLICATIONS

Aminabhavi, T. M.; Balundgi, R. H.; Cassidy, P. E. A Review on Biodegradable Plastics. Polym. Plast. Technol. Eng. 1990, 29 (3), 235-262. https://doi.org/10.1080/03602559008049843.

(Continued)

*Primary Examiner* — Alexander Usyatinsky
(74) *Attorney, Agent, or Firm* — Meunier Carlin & Curfman LLC

(57) ABSTRACT

Disclosed a redox-relay battery comprising a half-cell electrode chamber comprising an electrode, wherein the half-cell electrode chamber is in fluid communication with a reservoir; wherein the half-electrode chamber further comprises a shuttle material comprising one or more redox-active organic compounds; wherein the reservoir comprises a plurality of redox-active solids (ROS); wherein the shuttle material is configured to circulate through the half-cell electrode chamber to the reservoir to relay a charge between at least a portion of the redox-active solids and the electrode, and wherein the plurality of the redox-active solids exhibit a redox potential substantially identical to a redox potential of the one or more redox-active organic compounds.

16 Claims, 18 Drawing Sheets

(56) References Cited

U.S. PATENT DOCUMENTS

2015/0280259 A1* 10/2015 Anderson ............... H01M 8/20 429/409
2017/0133689 A1* 5/2017 Moore .................. C08F 212/18
2018/0072669 A1* 3/2018 Liu ....................... H01M 8/188
2018/0277876 A1 9/2018 Jin et al.
2018/0342750 A1 11/2018 Okada

FOREIGN PATENT DOCUMENTS

JP 6397847 B2 9/2018
WO 2012/083233 A1 6/2012

OTHER PUBLICATIONS

Asua, J. M. Emulsion Polymerization: From Fundamental Mechanisms to Process Developments. J. Polym. Sci. Part A Polym. Chem. 2004, 42 (5), 1025-1041. https://doi.org/10.1002/pola.11096.
Beh, E. S.; De Porcellinis, D.; Gracia, R. L.; Xia, K. T .; Gordon, R. G.; Aziz, M. J. A Neutral PH Aqueous Organic-Organometallic Redox Flow Battery with Extremely High Capacity Retention. ACS Energy Lett. 2017, 2 (3), 639-644. https://doi.org/10.1021/acsenergylett.7b00019.
Bozorg, M.; Hankiewicz, B.; Abetz, V. Solubility Behaviour of Random and Gradient Copolymers of Di- and Oligo(Ethylene Oxide) Methacrylate in Water: Effect of Various Additives. Soft Matter 2020, 16 (4), 1066-1081. https://doi.org/10.1039/C9SM02032B.
Bugnon, L.; Morton, C. J. H.; Novak, P.; Vetter, J.; Nesvadba, P. Synthesis of Poly(4-Methacryloyloxy-TEMPO) via Group-Transfer Polymerization and Its Evaluation in Organic Radical Battery. Chem. Mater. 2007, 19, 2910-2914. https://doi.org/10.1021/cm063052h.
Burgess, M.; Chénard, E.; Hernández-Burgos, K.; Nagarjuna, G.; Assary, R. S.; Hui, J.; Moore, J. S.; Rodríguez-López, J. Impact of Backbone Tether Length and Structure on the Electrochemical Performance of Viologen Redox Active Polymers. Chem. Mater. 2016, 28 (20), 7362-7374. https://doi.org/10.1021/acs.chemmater.6b02825.
Burgess, M.; Hernández-Burgos, K.; Schuh, J. K.; Davila, J.; Montoto, E. C.; Ewoldt, R. H.; Rodríguez-López, J. Modulation of the Electrochemical Reactivity of Solubilized Redox Active Polymers via Polyelectrolyte Dynamics. J. Am. Chem. Soc. 2018, 140 (6), 2093-2104. https://doi.org/10.1021/jacs.7b08353.
Burgess, M.; Hernández-Burgos, K.; Simpson, B. H.; Lichtenstein, T.; Avetian, S.; Nagarjuna, G.; Cheng, K. J.; Moore, J. S.; Rodríguez-López, J. Scanning Electrochemical Microscopy and Hydrodynamic Voltammetry Investigation of Charge Transfer Mechanisms on Redox Active Polymers. J. Electrochem. Soc. 2016, 163 (4), H3006-H3013. https://doi.org/10.1149/2.0021604jes.
Cabrera, P. J.; Yang, X.; Suttil, J. A.; Brooner, R. E. M.; Thompson, L. T.; Sanford, M. S. Evaluation of Tris-Bipyridine Chromium Complexes for Flow Battery Applications: Impact of Bipyridine Ligand Structure on Solubility and Electrochemistry. Inorg. Chem. 2015, 54 (21), 10214-10223. https://doi.org/10.1021/acs.inorgchem.5b01328.
Cabrera, P. J.; Yang, X.; Suttil, J. A.; Hawthorne, K. L.; Brooner, R. E. M.; Sanford, M. S.; Thompson, L. T. Complexes Containing Redox Noninnocent Ligands for Symmetric, Multielectron Transfer Nonaqueous Redox Flow Batteries. J. Phys. Chem. C 2015, 119 (28), 15882-15889. https://doi.org/10.1021/acs.jpcc.5b03582.
Carino, E. V; Diesendruck, C. E.; Moore, J. S.; Curtiss, L. A.; Assary, R. S.; Brushett, F. R. BF 3-Promoted Electrochemical Properties of Quinoxaline in Propylene Carbonate. RSC Adv. 2015, 5 (24), 18822-18831. https://doi.org/10.1039/C5RA00137D.
Moeller, K. D. (2018). Using Physical Organic Chemistry to Shape the Course of Electrochemical Reactions. Chemical Reviews, 118(9), 4817-4833. doi:10.1021/acs.chemrev.7b00656 https://doi.org/10.1021/acs.chemrev.7b00656.
Chen, H.; Tu, H.; Hu, C.; Liu, Y.; Dong, D.; Sun, Y.; Dai, Y.; Wang, S.; Qian, H.; Lin, Z.; et al. Cationic Covalent Organic Framework Nanosheets for Fast Li-Ion Conduction. J. Am. Chem. Soc. 2018, No. step II, jacs.7b12292. https://doi.org/10.1021/jacs.7b12292.
Chen, Y.; Zhou, M.; Xia, Y.; Wang, X.; Liu, Y.; Yao, Y.; Zhang, H.; Li, Y.; Lu, S.; Qin, W.; Wu, X.; Wang, Q. A Stable and High-Capacity Redox Targeting-Based Electrolyte for Aqueous Flow Batteries. Joule 2019, 3 (9), 2255-2267. https://doi.org/10.1016/j.joule.2019.06.007.
Cheng, Y.; Wang, X.; Huang, S.; Samarakoon, W.; Xi, S.; Ji, Y.; Zhang, H.; Zhang, F.; Du, Y.; Feng, Z.; Adams, S.; Wang, Q. Redox Targeting-Based Vanadium Redox-Flow Battery. ACS Energy Lett. 2019, 4, 3028-3035. https://doi.org/10.1021/acsenergylett.9b01939.
Darling, R. M.; Gallagher, K. G.; Kowalski, J. A.; Ha, S.; Brushett, F. R. Pathways to Low-Cost Electrochemical Energy Storage: A Comparison of Aqueous and Nonaqueous Flow Batteries. Energy Environ. Sci. 2014, 7 (11), 3459-3477. https://doi.org/10.1039/c4ee02158d.
DeBruler, C.; Hu, B.; Moss, J.; Luo, J.; Liu, T. L. A Sulfonate-Functionalized Viologen Enabling Neutral Cation Exchange, Aqueous Organic Redox Flow Batteries toward Renewable Energy Storage. ACS Energy Lett. 2018, No. 614, 663-668. https://doi.org/10.1021/acsenergylett.7b01302.
Derible, A.; Diebold, C.; Dentzer, J.; Gadiou, R.; Becht, J. M.; Le Drian, C. A Palladium Catalyst Supported on Carbon-Coated Cobalt Nanoparticles-Preparation of Palladium-Free Biaryls by Suzuki-Miyaura Reactions in Ethanol. European J. Org. Chem. 2014, 2014 (34), 7699-7706. https://doi.org/10.1002/ejoc.201403038.
Dmello, R.; Milshtein, J. D.; Brushett, F. R.; Smith, K. C. Cost-Driven Materials Selection Criteria for Redox Flow Battery Electrolytes. J. Power Sources 2016, 330, 261-272. https://doi.org/10.1016/j.jpowsour.2016.08.129.
Doris, S. E.; Ward, A. L.; Baskin, A.; Frischmann, P. D.; Gavvalapalli, N.; Chénard, E.; Sevov, C. S.; Prendergast, D.; Moore, J. S.; Helms, B. A. Macromolecular Design Strategies for Preventing Active-Material Crossover in Non-Aqueous All-Organic Redox-Flow Batteries. Angew. Chemie—Int. Ed. 2017, 56 (6), 1595-1599. https://doi.org/10.1002/anie.201610582.
Duan, W.; Huang, J.; Kowalski, J. A.; Shkrob, I. A.; Vijayakumar, M.; Walter, E.; Pan, B.; Yang, Z.; Milshtein, J. D.; Li, B.; et al. "wine-Dark Sea" in an Organic Flow Battery: Storing Negative Charge in 2,1,3-Benzothiadiazole Radicals Leads to Improved Cyclability. ACS Energy Lett. 2017, 2 (5), 1156-1161. https://doi.org/10.1021/acsenergylett.7b00261.
Duan, W.; Huang, J.; Kowalski, J. A.; Shkrob, I. A.; Vijayakumar, M.; Walter, E.; Pan, B.; Yang, Z.; Milshtein, J. D.; Li, B.; Liao, C.; Zhang, Z.; Wang, W.; Liu, J.; Moore, J. S.; Brushett, F. R.; Zhang, L.; Wei, X. "wine-Dark Sea" in an Organic Flow Battery: Storing Negative Charge in 2,1,3-Benzothiadiazole Radicals Leads to Improved Cyclability. ACS Energy Lett. 2017, 2 (5), 1156-1161. https://doi.org/10.1021/acsenergylett.7b00261.
Dunn, B.; Kamath, H.; Tarascon, J. M. Electrical Energy Storage for the Grid: A Battery of Choices. Science. American Association for the Advancement of Science Nov. 18, 2011, pp. 928-935. https://doi.org/10.1126/science.1212741.
Elsenbaumer, R. L.; Jen, K. Y.; Oboodi, R. Processible and Environmentally Stable Conducting Polymers. Synth. Met. 1986, 15 (2-3), 169-174. https://doi.org/10.1016/0379-6779(86)90020-2.
Energy Information Administration, U. Annual Energy Outlook 2019 with Projections to 2050; 2019.
Friedrich, J. M.; Ponce-de-León, C.; Reade, G. W.; Walsh, F. C. Reticulated Vitreous Carbon as an Electrode Material. J. Electroanal. Chem. 2004, 561, 203-217. https://doi.org/10.1016/j.jelechem.2003.07.019.
Gaultois, M. W.; Sparks, T. D.; H Borg, C. K.; Seshadri, R.; Bonificio, W. D.; Clarke, D. R. Data-Driven Review of Thermoelectric Materials: Performance and Resource Considerations. Chem. Mater. 2013, 25, 2911-2920. https://doi.org/10.1021/cm400893e.
Gietter, A. A. S.; Pupillo, R. C.; Yap, G. P. A.; Beebe, T. P.; Rosenthal, J.; Watson, D. A. On-Surface Cross-Coupling Methods for the Construction of Modified Electrode Assemblies with Tailored Morphologies. Chem. Sci. 2013, 4, 437. https://doi.org/10.1039/c2sc21413j.

(56) References Cited

OTHER PUBLICATIONS

Gossage, Z. T.; Schorr, N. B.; Hernández-Burgos, K.; Hui, J.; Simpson, B. H.; Montoto, E. C.; Rodríguez-López, J. Interrogating Charge Storage on Redox Active Colloids via Combined Raman Spectroscopy and Scanning Electrochemical Microscopy. Langmuir 2017, 33 (37), 9455-9463. https://doi.org/10.1021/acs.langmuir.7b01121.
Greene, A. F.; Danielson, M. K.; Delawder, A. O.; Liles, K. P.; Li, X.; Natraj, A.; Wellen, A.; Barnes, J. C. Redox-Responsive Artificial Molecular Muscles: Reversible Radical-Based Self-Assembly for Actuating Hydrogels. Chem. Mater. 2017, 29 (21), 9498-9508. https://doi.org/10.1021/acs.chemmater.7b03635.
Gür, T. M. Review of Electrical Energy Storage Technologies, Materials and Systems: Challenges and Prospects for Large-Scale Grid Storage. Energy Environ. Sci 2018, 11, 2696. https://doi.org/10.1039/c8ee01419a.
Haegel, N. M.; Margolis, R.; Buonassisi, T.; Feldman, D.; Froitzheim, A.; Garabedian, R.; Green, M.; Glunz, S.; Henning, H.-M.; Holder, B.; et al. Terawatt-Scale Photovoltaics: Trajectories and Challenges. Science (80-. ). 2017, 356 (6334), 141-143. https://doi.org/10.1126/science.aal1288.
Hearne, S. J.; Iacopi, F.; Faunce, T. A.; Su, D.; Prest, J. On-Grid Batteries for Large-Scale Energy Storage: Challenges and Opportunities for Policy and Technology. MRS Energy Sustain. 2018. https://doi.org/10.1557/mre.2018.11.
Hendriks, K. H.; Robinson, S. G.; Braten, M. N.; Sevov, C. S.; Helms, B. A.; Sigman, M. S.; Minteer, S. D.; Sanford, M. S. High-Performance Oligomeric Catholytes for Effective Macromolecular Separation in Nonaqueous Redox Flow Batteries. ACS Cent. Sci. 2018, acscentsci.7b00544. https://doi.org/10.1021/acscentsci.7b00544.
Hendriks, K. H.; Robinson, S. G.; Braten, M. N.; Sevov, C. S.; Helms, B. A.; Sigman, M. S.; Minteer, S. D.; Sanford, M. S. High-Performance Oligomeric Catholytes for Effective Macromolecular Separation in Nonaqueous Redox Flow Batteries. ACS Cent. Sci. 2018, 4 (2), 189-196. https://doi.org/10.1021/acscentsci.7b00544.
Hendriks, K. H.; Sevov, C. S.; Cook, M. E.; Sanford, M. S. Multielectron Cycling of a Low-Potential Anolyte in Alkali Metal Electrolytes for Nonaqueous Redox Flow Batteries. ACS Energy Lett. 2017, 2 (10), 2430-2435. https://doi.org/10.1021/acsenergylett.7b00559.
Hensel, J. K.; Carpenter, A. P.; Ciszewski, R. K.; Schabes, B. K.; Kittredge, C. T.; Moore, F. G.; Richmond, G. L. Molecular Characterization of Water and Surfactant AOT at Nanoemulsion Surfaces. Proc. Natl. Acad. Sci. 2017, 114 (51), 13351-13356. https://doi.org/10.1073/pnas.1700099114.
Hu, B.; Luo, J.; Hu, M.; Yuan, B.; Liu, T. L. A PH-Neutral, Metal-Free Aqueous Organic Redox Flow Battery Employing an Ammonium Anthraquinone Anolyte. Angew. Chemie Int. Ed. 2019, 58 (46), 16629-16636. https://doi.org/10.1002/anie.201907934.
Hu, B.; Tang, Y.; Luo, J.; Grove, G.; Guo, Y.; Liu, T. L. Improved Radical Stability of Viologen Anolytes in Aqueous Organic Redox Flow Batteries. Chem. Commun. 2018, 54 (50), 6871-6874. https://doi.org/10.1039/C8CC02336K.
Huang, J.; Su, L.; Kowalski, J. A.; Barton, J. L.; Ferrandon, M.; Burrell, A. K.; Brushett, F. R.; Zhang, L. A Subtractive Approach to Molecular Engineering of Dimethoxybenzene-Based Redox Materials for Non-Aqueous Flow Batteries. J. Mater. Chem. A 2015, 3, 14971-14976. https://doi.org/10.1039/c5ta02380g.
Huang, J.; Yang, Z.; Murugesan, V.; Walter, E.; Hollas, A.; Pan, B.; Assary, R. S.; Shkrob, I. A.; Wei, X.; Zhang, Z. Spatially Constrained Organic Diquat Anolyte for Stable Aqueous Flow Batteries. ACS Energy Lett. 2018, 3 (10), 2533-2538. https://doi.org/10.1021/acsenergylett.8b01550.
Huang, Q.; Yang, J.; Ng, C. B.; Jia, C.; Wang, Q. A Redox Flow Lithium Battery Based on the Redox Targeting Reactions between LiFePO4 and Iodide. Energy Environ. Sci. 2016, 9 (3), 917-921. https://doi.org/10.1039/C5EE03764F.
Hyun-woo, N. Frequent Fire Raising Concerns over Safety of Solar Energy. The Korea Times. Dec. 18, 2018.
Ibe, T.; Frings, R. B.; Lachowicz, A.; Kyo, S.; Nishide, H. Nitroxide Polymer Networks Formed by Michael Addition: On Site-Cured Electrode-Active Organic Coatingw. Chem. Commun. 2010, 46, 3475-3477. https://doi.org/10.1039/c002797a.
Iyer, V. A.; Schuh, J. K.; Montoto, E. C.; Pavan Nemani, V.; Qian, S.; Nagarjuna, G.; Rodríguez-López, J.; Ewoldt, R. H.; Smith, K. C. Assessing the Impact of Electrolyte Conductivity and Viscosity on the Reactor Cost and Pressure Drop of Redox-Active Polymer Flow Batteries. J. Power Sources 2017, 361, 334-344. https://doi.org/10.1016/j.jpowsour.2017.06.052.
Jadoun, S.; Riaz, U. A Review on the Chemical and Electrochemical Copolymerization of Conducting Monomers: Recent Advancements and Future Prospects. Polym. Plast. Technol. Eng. 2020, 59 (5), 484-504. https://doi.org/10.1080/25740881.2019.1669647.
Jalkh, J.; Leroux, Y. R.; Vacher, A.; Lorcy, D.; Hapiot, P.; Lagrost, C. Tetrathiafulvalene-Tetracyanoquinodimethane Charge-Transfer Complexes Wired to Carbon Surfaces: Tuning of the Degree of Charge Transfer. J. Phys. Chem. C 2016, acs.jpcc.6b09459. https://doi.org/10.1021/acs.jpcc.6b09459.
Janoschka, T.; Hager, M. D.; Schubert, U. S. Powering up the Future: Radical Polymers for Battery Applications. Adv. Mater. 2012, 24 (48), 6397-6409. https://doi.org/10.1002/adma.201203119.
Janoschka, T.; Martin, N.; Hager, M. D.; Schubert, U. S. An Aqueous Redox-Flow Battery with High Capacity and Power: The TEMPTMA/MV System. Angew. Chemie Int. Ed. 2016, 55 (46), 14427-14430. https://doi.org/10.1002/anie.201606472.
Janoschka, T.; Martin, N.; Martin, U.; Friebe, C.; Morgenstern, S.; Hiller, H.; Hager, M. D.; Schubert, U. S. An Aqueous, Polymer-Based Redox-Flow Battery Using Non-Corrosive, Safe, and Low-Cost Materials. Nature 2015, 527, 78-81. https://doi.org/10.1038/nature15746.
Janoschka, T.; Morgenstern, S.; Hiller, H.; Friebe, C.; Wolkersdörfer, K.; Häupler, B.; Hager, M. D.; Schubert, U. S. Synthesis and Characterization of TEMPO- and Viologen-Polymers for Water-Based Redox-Flow Batteries. Polym. Chem. 2015, 6 (45), 7801-7811. https://doi.org/10.1039/C5PY01602A.
Ji, Y.; Goulet, M.; Pollack, D. A.; Kwabi, D. G.; Jin, S.; Porcellinis, D.; Kerr, E. F.; Gordon, R. G.; Aziz, M. J. A Phosphonate-Functionalized Quinone Redox Flow Battery at Near-Neutral PH with Record Capacity Retention Rate. Adv. Energy Mater. 2019, 9 (12), 1900039. https://doi.org/10.1002/aenm.201900039.
Jia, C.; Pan, F.; Zhu, Y. G.; Huang, Q.; Lu, L.; Wang, Q. High-Energy Density Nonaqueous All Redox Flow Lithium Battery Enabled with a Polymeric Membrane. Sci. Adv. 2015, 1 (10), 1-7. https://doi.org/10.1126/sciadv.1500886.
Jin, S.; Fell, E. M.; Vina-Lopez, L.; Jing, Y.; Michalak, P. W.; Gordon, R. G.; Aziz, M. J. Near Neutral PH Redox Flow Battery with Low Permeability and Long-Lifetime Phosphonated Viologen Active Species. Adv. Energy Mater. 2020, 10 (20), 2000100. https://doi.org/10.1002/aenm.202000100.
Jing, Y.; Wu, M.; Wong, A. A.; Fell, E. M.; Jin, S.; Pollack, D. A.; Kerr, E. F.; Gordon, R. G.; Aziz, M. J. In Situ Electrosynthesis of Anthraquinone Electrolytes in Aqueous Flow Batteries. Green Chem. 2020, 22 (18), 6084-6092. https://doi.org/10.1039/D0GC02236E.
Johnson, B. M.; Francke, R.; Little, R. D.; Berben, L. A. High Turnover in Electro-Oxidation of Alcohols and Ethers with a Glassy Carbon-Supported Phenanthroimidazole Mediator. Chem. Sci. 2017, 8 (9), 6493-6498. https://doi.org/10.1039/C7SC02482G.
Li, W.; Kerr, E.; Goulet, M.; Fu, H.; Zhao, Y.; Yang, Y.; Veyssal, A.; He, J.; Gordon, R. G.; Aziz, M. J.; Jin, S. A Long Lifetime Aqueous Organic Solar Flow Battery. Adv. Energy Mater. 2019, 9 (31), 1900918. https://doi.org/10.1002/aenm.201900918.
Li, Y.; Xu, Z.; Liu, Y.; Jin, S.; Fell, E. M.; Wang, B.; Gordon, R. G.; Aziz, M. J.; Yang, Z.; Xu, T. Functioning Water-Insoluble Ferrocenes for Aqueous Organic Flow Battery via Host-Guest Inclusion. ChemSusChem 2021, 14 (2), 745-752. https://doi.org/10.1002/cssc.202002516.
Liles, K. P.; Greene, A. F.; Danielson, M. K.; Colley, N. D.; Wellen, A.; Fisher, J. M.; Barnes, J. C. Photoredox-Based Actuation of an Artificial Molecular Muscle. Macromol. Rapid Commun. 2018, 39 (17), 1700781. https://doi.org/10.1002/marc.201700781.

(56) References Cited

OTHER PUBLICATIONS

Lin, K.; Chen, Q.; Gerhardt, M. R.; Tong, L.; Kim, S. B.; Eisenach, L.; Valle, A. W.; Hardee, D.; Gordon, R. G.; Aziz, M. J.; Marshak, M. P. Alkaline Quinone Flow Battery. Science (80-. ). 2015, 349 (6255), 1529-1532. https://doi.org/10.1126/science.aab3033.
Lin, K.; Gómez-Bombarelli, R.; Beh, E. S.; Tong, L.; Chen, Q.; Valle, A.; Aspuru-Guzik, A.; Aziz, M. J.; Gordon, R. G. A Redox-Flow Battery with an Alloxazine-Based Organic Electrolyte. Nat. Energy 2016, 1 (9), 16102. https://doi.org/10.1038/nenergy.2016.102.
Liu, T.; Wei, X.; Nie, Z.; Sprenkle, V.; Wang, W. A Total Organic Aqueous Redox Flow Battery Employing a Low Cost and Sustainable Methyl Viologen Anolyte and 4-HO-TEMPO Catholyte. Adv. Energy Mater. 2016, 6 (3), 1-8. https://doi.org/10.1002/aenm.201501449.
Liu, T.; Zhang, Y.; Jiang, Z.; Zeng, X.; Ji, J.; Li, Z.; Gao, X.; Sun, M.; Lin, Z.; Ling, M.; et al. Exploring Competitive Features of Stationary Sodium Ion Batteries for Electrochemical Energy Storage. Energy Environ. Sci. 2019. https://doi.org/10.1039/C8EE03727B.
Liu, W.; Liu, Y.; Zhang, H.; Xie, C.; Shi, L.; Zhou, Y.-G.; Li, X. A Highly Stable Neutral Viologen/Bromine Aqueous Flow Battery with High Energy and Power Density. Chem. Commun. 2019, 55 (33), 4801-4804. https://doi.org/10.1039/C9CC00840C.
Ma, T.; Pan, Z.; Miao, L.; Chen, C.; Han, M.; Shang, Z.; Chen, J. Porphyrin-Based Symmetric Redox-Flow Batteries towards Cold-Climate Energy Storage. Angew. Chemie—Int. Ed. 2018, 130 (12), 3212-3216. https://doi.org/10.1002/ange.201713423.
Maharjan, M.; Wai, N.; Veksha, A.; Giannis, A.; Lim, T. M.; Lisak, G. Sal Wood Sawdust Derived Highly Mesoporous Carbon as Prospective Electrode Material for Vanadium Redox Flow Batteries. J. Electroanal. Chem. 2019, 834, 94-100. https://doi.org/10.1016/j.jelechem.2018.12.049.
McCulloch, W. D.; Yu, M.; Wu, Y. PH-Tuning a Solar Redox Flow Battery for Integrated Energy Conversion and Storage. ACS Energy Lett. 2016, 1 (3), 578-582. https://doi.org/10.1021/acsenergylett.6b00296.
Milshtein, J. D.; Barton, J. L.; Darling, R. M.; Brushett, F. R. 4-Acetamido-2,2,6,6-Tetramethylpiperidine-1-Oxyl as a Model Organic Redox Active Compound for Nonaqueous Flow Batteries. J. Power Sources 2016, 327, 151-159. https://doi.org/10.1016/j.jpowsour.2016.06.125.
Moeller, K. D. Using Physical Organic Chemistry to Shape the Course of Electrochemical Reactions.
Montoto, E. C.; Cao, Y.; Kenneth Hernándezhernández-Burgos; Sevov, C. S.; Braten, M. N.; Helms, B. A.; Moore, J. S.; Rodríguez-Lópezlópez, J. Effect of the Backbone Tether on the Electrochemical Properties of Soluble Cyclopropenium Redox-Active Polymers. Macromolecules 2018, 51, 3539-3546. https://doi.org/10.1021/acs.macromol.8b00574.
Montoto, E. C.; Nagarjuna, G.; Hui, J.; Burgess, M.; Sekerak, N. M.; Hernández-Burgos, K.; Wei, T.-S.; Kneer, M.; Grolman, J.; Cheng, K. J.; Lewis, J. A.; Moore, J. S.; Rodríguez-López, J. Redox Active Colloids as Discrete Energy Storage Carriers. J. Am. Chem. Soc. 2016, 138 (40), 13230-13237. https://doi.org/10.1021/jacs.6b06365.
Montoto, E. C.; Nagarjuna, G.; Moore, J. S.; Rodríguez-López, J. Redox Active Polymers for Non-Aqueous Redox Flow Batteries: Validation of the Size-Exclusion Approach. J. Electrochem. Soc. 2017, 164 (7), A1688-A1694. https://doi.org/10.1149/2.1511707jes.
Muench, S.; Wild, A.; Friebe, C.; Ha, B.; Janoschka, T.; Schubert, U. S. Polymer-Based Organic Batteries. Chem. Rev. 2016, No. 116, 9438-9484. https://doi.org/10.1021/acs.chemrev.6b00070.
Nagarjuna, G.; Hui, J.; Cheng, K. J.; Lichtenstein, T.; Shen, M.; Moore, J. S.; Rodríguez-López, J. Impact of Redox-Active Polymer Molecular Weight on the Electrochemical Properties and Transport Across Porous Separators in Nonaqueous Solvents. J. Am. Chem. Soc. 2014, 136 (46), 16309-16316. https://doi.org/10.1021/ja508482e.
Ortiz-Medina, J.; Wang, Z.; Cruz-Silva, R.; Morelos-Gomez, A.; Wang, F.; Yao, X.; Terrones, M.; Endo, M. Defect Engineering and Surface Functionalization of Nanocarbons for Metal-Free Catalysis. Adv. Mater. 2019, 1805717. https://doi.org/10.1002/adma.201805717.
Pan, F.; Yang, J.; Huang, Q.; Wang, X.; Huang, H.; Wang, Q. Redox Targeting of Anatase TiO 2 for Redox Flow Lithium-Ion Batteries. Adv. Energy Mater. 2014, 4 (15), 1400567. https://doi.org/10.1002/aenm.201400567.
Perry, M. L.; Weber, A. Z. Advanced Redox-Flow Batteries: A Perspective. J. Electrochem. Soc. 2016, 163 (1), A5064-A5067. https://doi.org/10.1149/2.0101601jes.
Perticarari, S.; Sayed-Ahmad-Baraza, Y.; Ewels, C.; Moreau, P.; Guyomard, D.; Poizot, P.; Odobel, F.; Gaubicher, J. Dual Anion-Cation Reversible Insertion in a Bipyridinium-Diamide Triad as the Negative Electrode for Aqueous Batteries. Adv. Energy Mater. 2017, 1701988, 1701988. https://doi.org/10.1002/aenm.201701988.
Phal, S.; Shatri, B.; Berisha, A.; Geladi, P.; Lindholm-Sethson, B.; Tesfalidet, S. Covalently Electrografted Carboxyphenyl Layers onto Gold Surface Serving as a Platform for the Construction of an Immunosensor for Detection of Methotrexate. J. Electroanal. Chem. 2018, No. Oct. 2017, 0-1. https://doi.org/10.1016/j.jelechem.2017.12.072.
Pinson, J.; Podvorica, F. Attachment of Organic Layers to Conductive or Semiconductive Surfaces by Reduction of Diazonium Salts. Chem. Soc. Rev. 2005, 34 (5), 429-439. https://doi.org/10.1039/b406228k.
Ponce de León, C.; Frías-Ferrer, A.; González-García, J.; Szánto, D. A.; Walsh, F. C. Redox Flow Cells for Energy Conversion. J. Power Sources 2006, 160 (1), 716-732. https://doi.org/10.1016/j.jpowsour.2006.02.095.
Roe, S.; Menictas, C.; Skyllas-Kazacos, M. A High Energy Density Vanadium Redox Flow Battery with 3 M Vanadium Electrolyte. J. Electrochem. Soc. 2015, 163 (1), A5023-A5028. https://doi.org/10.1149/2.0041601jes.
Ruckenstein, E.; Li, Z. F. Surface Modification and Functionalization through the Self-Assembled Monolayer and Graft Polymerization. Adv. Colloid Interface Sci. 2005, 113 (1), 43-63. https://doi.org/10.1016/J.CIS.2004.07.009.
Schon, T. B.; McAllister, B. T.; Li, P.-F.; Seferos, D. S. The Rise of Organic Electrode Materials for Energy Storage. Chem. Soc. Rev. 2016, 45 (22), 6345-6404. https://doi.org/10.1039/C6CS00173D.
Sevov, C. S.; Brooner, R. E. M.; Chénard, E.; Assary, R. S.; Moore, J. S.; Rodríguez-López, J.; Sanford, M. S. Evolutionary Design of Low Molecular Weight Organic Anolyte Materials for Applications in Nonaqueous Redox Flow Batteries. J. Am. Chem. Soc. 2015, 137 (45), 14465-14472. https://doi.org/10.1021/jacs.5b09572.
Sevov, C. S.; Fisher, S. L.; Thompson, L. T.; Sanford, M. S. Mechanism-Based Development of a Low-Potential, Soluble, and Cyclable Multielectron Anolyte for Nonaqueous Redox Flow Batteries. J. Am. Chem. Soc. 2016, 138 (47), 15378-15384. https://doi.org/10.1021/jacs.6b07638.
Sevov, C. S.; Hendriks, K. H.; Sanford, M. S. Low-Potential Pyridinium Anolyte for Aqueous Redox Flow Batteries. J. Phys. Chem. C 2017, 121 (39), 24376-24380. https://doi.org/10.1021/acs.jpcc.7b06247.
Sevov, C. S.; Hickey, D. P.; Cook, M. E.; Robinson, S. G.; Barnett, S.; Minteer, S. D.; Sigman, M. S.; Sanford, M. S. Physical Organic Approach to Persistent, Cyclable, Low-Potential Electrolytes for Flow Battery Applications. J. Am. Chem. Soc. 2017, 139 (8), 2924-2927. https://doi.org/10.1021/jacs.7b00147.
Sevov, C. S.; Samaroo, S. K.; Sanford, M. S. Cyclopropenium Salts as Cyclable, High-Potential Catholytes in Nonaqueous Media. Adv. Energy Mater. 2017, 7 (5), 1602027. https://doi.org/10.1002/aenm.201602027.
Soloveichik, G. L. Flow Batteries: Current Status and Trends. Chem. Rev. 2015, 115 (20), 11533-11558. https://doi.org/10.1021/cr500720t.
Song, Y.; Zhao, S.; Chen, Y.; Cai, J.; Li, J.; Yang, Q.; Sun, J.; Liu, Z. Enhanced Sulfur Redox and Polysulfide Regulation via Porous VN-Modified Separator for Li—S Batteries. ACS Appl. Mater. Interfaces 2019, 11, 5687-5694. https://doi.org/10.1021/acsami.8b22014.

(56) References Cited

OTHER PUBLICATIONS

Song, Z.; Zhou, H. Towards Sustainable and Versatile Energy Storage Devices: An Overview of Organic Electrode Materials. Energy Environ. Sci. 2013, 6 (8), 2280. https://doi.org/10.1039/c3ee40709h.

Suga, T.; Konishi, H.; Nishide, H. Photocrosslinked Nitroxide Polymer Cathode-Active Materials for Application in an Organic-Based Paper Battery. Chem. Commun. 2007, No. 17, 1730. https://doi.org/10.1039/b618710b.

Sun, Z.; Li, Z.; Gao, L.; Zhao, X.; Han, D.; Gan, S.; Guo, S.; Niu, L. Grafting Benzenediazonium Tetrafluoroborate onto LiNi x Co y Mn z O 2 Materials Achieves Subzero-Temperature High-Capacity Lithium-Ion Storage via a Diazonium Soft-Chemistry Method. 2018. https://doi.org/10.1002/aenm.201802946.

Truesdell, B. L.; Hamby, T. B.; Sevov, C. S. General C(Sp 2 )-C(Sp 3 ) Cross-Electrophile Coupling Reactions Enabled by Overcharge Protection of Homogeneous Electrocatalysts. J Am Chem Soc 2020, 142, 5884-5893. https://doi.org/10.1021/jacs.0c01475.

Wahlquist, C. South Australia's Tesla Battery on Track to Make Back a Third of Cost in a Year. The Guardian. Sep. 27, 2018.

Wang, C.; Li, X.; Yu, B.; Wang, Y.; Yang, Z.; Wang, H.; Lin, H.; Ma, J.; Li, G.; Jin, Z. Molecular Design of Fused-Ring Phenazine Derivatives for Long-Cycling Alkaline Redox Flow Batteries. ACS Energy Lett. 2020, 5, 411-417. https://doi.org/10.1021/acsenergylett.9b02676.

Weber, A. Z.; Mench, M. M.; Meyers, J. P.; Ross, P. N.; Gostick, J. T.; Liu, Q. Redox Flow Batteries: A Review. J. Appl. Electrochem. 2011, 41 (10), 1137-1164. https://doi.org/10.1007/s10800-011-0348-2.

Wei, X.; Pan, W.; Duan, W.; Hollas, A.; Yang, Z.; Li, B.; Nie, Z.; Liu, J.; Reed, D.; Wang, W.; Sprenkle, V. Materials and Systems for Organic Redox Flow Batteries: Status and Challenges. ACS Energy Lett. 2017, 2 (9), 2187-2204. https://doi.org/10.1021/acsenergylett.7b00650.

Wei, X.; Xu, W.; Vijayakumar, M.; Cosimbescu, L.; Liu, T.; Sprenkle, V.; Wang, W. TEMPO-Based Catholyte for High-Energy Density Nonaqueous Redox Flow Batteries. Adv. Mater. 2014, 26 (45), 7649-7653. https://doi.org/10.1002/adma.201403746.

Winsberg, J.; Hagemann, T.; Janoschka, T.; Hager, M. D.; Schubert, U. S. Redox-Flow Batteries: From Metals to Organic Redox-Active Materials. Angew. Chemie—Int. Ed. 2017, 56 (3), 686-711. https://doi.org/10.1002/anie.201604925.

Winsberg, J.; Hagemann, T.; Muench, S.; Friebe, C.; Häupler, B.; Janoschka, T.; Morgenstern, S.; Hager, M. D.; Schubert, U. S. Poly(Boron-Dipyrromethene)—A Redox-Active Polymer Class for Polymer Redox-Flow Batteries. Chem. Mater. 2016, 28 (10), 3401-3405. https://doi.org/10.1021/acs.chemmater.6b00640.

Wu, M.; Jing, Y.; Wong, A. A.; Fell, E. M.; Jin, S.; Tang, Z.; Gordon, R. G.; Aziz, M. J. Extremely Stable Anthraquinone Negolytes Synthesized from Common Precursors. Chem 2020, 6 (6), 1432-1442. https://doi.org/10.1016/j.chempr.2020.03.021.

Xiao, P.; Xu, Y. Recent Progress in Two-Dimensional Polymers for Energy Storage and Conversion: Design, Synthesis, and Applications. J. Mater. Chem. A 2018, 6 (44), 21676-21695. https://doi.org/10.1039/C8TA02820F.

Yan, R.; Wang, Q. Redox-Targeting-Based Flow Batteries for Large-Scale Energy Storage. Adv. Mater. 2018, 30 (47), 1802406. https://doi.org/10.1002/adma.201802406.

Yang, B.; Hoober-Burkhardt, L.; Wang, F.; Surya Prakash, G. K.; Narayanan, S. R. An Inexpensive Aqueous Flow Battery for Large-Scale Electrical Energy Storage Based on Water-Soluble Organic Redox Couples. J. Electrochem. Soc. 2014, 161 (9), A1371-A1380. https://doi.org/10.1149/2.1001409jes.

Yang, Z.; Liu, J.; Baskaran, S.; Imhoff, C. H.; Holladay, J. D. Enabling Renewable Energy—and the Future Grid—with Advanced Electricity Storage. JOM 2010, 62 (9), 14-23. https://doi.org/10.1007/s11837-010-0129-0.

Yang, Z.; Tong, L.; Tabor, D. P.; Beh, E. S.; Goulet, M.-A.; De Porcellinis, D.; Aspuru-Guzik, A.; Gordon, R. G.; Aziz, M. J. Alkaline Benzoquinone Aqueous Flow Battery for Large-Scale Storage of Electrical Energy. Adv. Energy Mater. 2017, 1702056, 1702056. https://doi.org/10.1002/aenm.201702056.

Yang, Z.; Zhang, J.; Kintner-Meyer, M. C. W.; Lu, X.; Choi, D.; Lemmon, J. P.; Liu, J. Electrochemical Energy Storage for Green Grid. Chem. Rev. 2011, 111 (5), 3577-3613. https://doi.org/10.1021/cr100290v.

Yoo, S. J.; Li, L.-J.; Zeng, C.-C.; Little, R. D. Polymeric Ionic Liquid and Carbon Black Composite as a Reusable Supporting Electrolyte: Modification of the Electrode Surface. Angew. Chemie Int. Ed. 2015, 54 (12), 3744-3747. https://doi.org/10.1002/anie.201410207.

Yu, J.; Fan, L.; Yan, R.; Zhou, M.; Wang, Q. A Redox Targeting-Based Aqueous Redox Flow Lithium Battery. ACS Energy Lett. 2018, 3, 2314-2320. https://doi.org/10.1021/acsenergylett.8b01420.

Yu, J.; Wang, X.; Zhou, M.; Wang, Q. A Redox Targeting-Based Material Recycling Strategy for Spent Lithium Ion Batteries. Energy Environ. Sci. 2019, 12 (9), 2672-2677. https://doi.org/10.1039/C9EE01478K.

Zanzola, E.; Dennison, C. R.; Battistel, A.; Peljo, P.; Vrubel, H.; Amstutz, V.; Girault, H. H. Redox Solid Energy Boosters for Flow Batteries: Polyaniline as a Case Study. Electrochim. Acta 2017, 235, 664-671. https://doi.org/10.1016/j.electacta.2017.03.084.

Zhang, J.; Corman, R. E.; Schuh, J. K.; Ewoldt, R. H.; Shkrob, I. A.; Zhang, L. Solution Properties and Practical Limits of Concentrated Electrolytes for Nonaqueous Redox Flow Batteries. J. Phys. Chem. C 2018, 122 (15), 8159-8172. https://doi.org/10.1021/acs.jpcc.8b02009.

Zhang, J.; Huang, J.; Robertson, L. A.; Assary, R. S.; Shkrob, I. A.; Zhang, L. Elucidating Factors Controlling Long-Term Stability of Radical Anions for Negative Charge Storage in Nonaqueous Redox Flow Batteries. J. Phys. Chem. C. 2018, 122, 8116-8127. https://doi.org/10.1021/acs.jpcc.8b01434.

Zhang, J.; Huang, J.; Robertson, L. A.; Shkrob, I. A.; Zhang, L. Comparing Calendar and Cycle Life Stability of Redox Active Organic Molecules for Nonaqueous Redox Flow Batteries. J. Power Sources 2018, 397, 214-222. https://doi.org/10.1016/j.jpowsour.2018.07.001.

Zhang, J.; Shkrob, I. A.; Assary, R. S.; Tung, S. O.; Silcox, B.; Curtiss, L. A.; Thompson, L.; Zhang, L. Toward Improved Catholyte Materials for Redox Flow Batteries: What Controls Chemical Stability of Persistent Radical Cations? J. Phys. Chem. C 2017, 121 (42), 23347-23358. https://doi.org/10.1021/acs.jpcc.7b08281.

Zhou, M.; Chen, Y.; Zhang, Q.; Xi, S.; Yu, J.; Du, Y.; Hu, Y.-S.; Wang, Q. Na 3 V 2 (PO 4 ) 3 as the Sole Solid Energy Storage Material for Redox Flow Sodium-Ion Battery. Adv. Energy Mater. 2019, 9 (30), 1901188. https://doi.org/10.1002/aenm.201901188.

Zhou, M.; Huang, Q.; Pham Truong, T. N.; Ghilane, J.; Zhu, Y. G.; Jia, C.; Yan, R.; Fan, L.; Randriamahazaka, H.; Wang, Q. Nernstian-Potential-Driven Redox-Targeting Reactions of Battery Materials. Chem 2017, 3 (6), 1036-1049. https://doi.org/10.1016/j.chempr.2017.10.003.

Zhu, Y. G.; Du, Y.; Jia, C.; Zhou, M.; Fan, L.; Wang, X.; Wang, Q. Unleashing the Power and Energy of LiFePO4-Based Redox Flow Lithium Battery with a Bifunctional Redox Mediator. J. Am. Chem. Soc. 2017, 139 (18), 6286-6289. https://doi.org/10.1021/jacs.7b01146.

International Searching Authority (ISA/US). International Search Report and Written Opinion. PCT Application No. PCT/US2021/032160. Issued on Oct. 7, 2021. 12 pages.

Wong et al. All-organic storage solids and redox shuttles for redox-targeting flow batteries. ACS Energy Letters, vol. 6, No. 4, Mar. 12, 2021. <URL: https://pubs.acs.org/doi/abs/10.1021/acsenergylett.1c00143>.

European Patent Office. Extended European Search Report for European Application No. 21803125.0, dated Jun. 16, 2025, 9 pages.

* cited by examiner

3
$3_{red}$

3

17

Spherical redox-active yield high charge capacity and high flow rate.

Cycling in flow is performed using a flow-through "cartridge".

Cycling in flow is performed using a flow-through "cartridge".

82% of the theoretical capacity of the ROS can be cycled.

REDOX RELAY FLOW BATTERIES AND METHODS OF MAKING THE SAME

CROSS-TO RELATED APPLICATIONS

This application is a national stage application filed under 35 U.S.C. § 371 of PCT/US2021/032160 filed May 13, 2021, which claims the benefit of U.S. Provisional Application No. 63/024,598, filed May 14, 2020, the content of which is incorporated herein by reference in its entirety.

TECHNICAL FIELD

This application relates generally to novel redox-relay flow batteries comprising redox-active solids configured to behave as storage materials and redox-active organic compounds configured to behave as energy shuttles.

BACKGROUND

The growing global demand for electrical energy and environmental concerns has increased research efforts towards integrating renewable energy sources into the electrical grid. While energy generation from petroleum-based sources dominates the current market, dependence on renewable energy is expected to grow rapidly. For example, photovoltaic installations have outpaced annual predictions and are approaching terawatt scales at prices <$0.50/W.

However, the utilization of renewable energy is still challenging. For example, direct integration of renewable sources can destabilize the grid leading to power outages and blackouts. Furthermore, harvesting renewable energy is met with the challenges of the intermittent nature of renewable sources, difficulty in transport to load centers, and a supply-demand mismatch. Varying weather conditions greatly affect the availability of solar and wind sources. The amount of harvestable, renewable energy changes by the hour, which can cause an influx of energy to the grid to be unstable.

This variability causes renewable farms to be localized to areas that are exposed to the greatest solar and wind sources. The renewable farms are located far from most load centers, adding to the difficulty of large-scale integration of renewable sources. Finally, the demand for electrical energy is often at a mismatch with the availability of such renewable sources. During high-demand periods, access to renewable sources is at a minimum (FIG. 1B). Inexpensive, high-capacity electrical energy storage (EES) technologies are required to stabilize the grid and manage issues associated with the direct integration of renewable sources (FIG. 1A). Looking at the current outlook of electrical energy storage, the projected storage capacity through the next thirty years will only store about 10% of the available harvestable energy from wind and solar sources (FIG. 1C). These projections suggest that current EES technology needs to undergo drastic transformations to fully integrate renewable sources into the electrical grid.

Ideal grid-scale EES technology needs to be scalable and respond quickly to fluctuations in the grid. Supercapacitors are a potential candidate because of their high lifetime and quick discharge times. However, low energy density and high cost cause supercapacitors to be unrealistic candidates for grid-scale storage. Batteries have been targeted due to high energy densities and the potential to inexpensively scale the technology. Of the available technology, Li-ion batteries have been identified as the most "market-ready" with energy densities at ~250-300 Wh/kg. Although a significant achievement in grid-scale energy storage, Li-ion batteries still have their drawbacks. The first concern is the high cost of scaling Li-ion batteries for grid-scale purposes. To scale Li-ion batteries to the necessary size, metal electrodes need to be scale accordingly, contributing to the high cost. Also, the limited availability of lithium will make it difficult to globally install grid-scale Li-ion batteries.

Another drawback is safety concerns with Li-ion batteries. Li-ion technology has been prone to short-circuit, which results in the ignition of the battery.

Alternatives to Li-ion technology have been explored to circumvent the associated issues. One such example is the utilization of sulfur as an alternative to the classical cathode materials used. Sulfur offers many advantages over typical other electrode materials because it is inexpensive and can store a high amount of energy per kilogram of material. However, Li—S batteries' performance suffers greatly from what is known as the polysulfide shuttle effect. When the sulfur is reduced at the cathode, large lithium polysulfides are generated and migrate towards the lithium anode during charging. During that migration period, the large polysulfides are reduced to smaller polysulfides that can then shuttle between the two electrodes. Unfortunately, these polysulfides are a result of not fully charging and discharging the sulfur material. This leads to an overall underutilization of the sulfur, which results in decreased battery performance below that of the conventional Li-ion battery.

Redox-flow batteries (RFBs) are an alternative EES technology that is a safer and inexpensive option compared to solid-state batteries. Unlike solid-state batteries that necessitate direct surface contact between storage material and electrode, RFBs flow solutions of solvated redox-active compounds from external reservoirs to the electrode surface. Mobilization of the storage material decouples battery power (electrode surface area) from capacity (reservoir volume), which renders RFBs inexpensive to scale. The inherent design of RFBs offers the potential for the lowest maintenance costs of any EES technology. Commercial RFB technology utilizes vanadium-based electrolytes in an aqueous environment with stable cycling over 1000 cycles. However, high costs (>$300 per kWh) and low energy densities (<50 Wh/kg) limit the commercialization of most RFB technologies. Commercialization issues are caused by poor performance in several factors (FIG. 2). First, RFBs must use highly concentrated solutions of electrolyte material. As a result, newly designed electrolyte materials must have a solubility that exceeds 2.5 M. However, it has been reported that electrolyte solutions with a concentration that exceeds 0.5 M negatively affect solution viscosity and conductivity. On top of that, electrolytes need to be paired, such that the open-circuit voltage is >1 V in aqueous systems and >2.5 V in non-aqueous systems. Because of these limitations, designing better electrolytes is extremely difficult. Crossover of charged species is also another issue. During battery cycling, charged electrolyte species can permeate through the separator and discharge each other. This crossover event leads to continual capacity loss during battery cycling. Because bulk energy is stored in solution, crossover leads to large energy losses.

Thus, new approaches to provide for more efficient redox-relay flow batteries and methods of making the same are needed. These needs and other needs at least partially satisfied by the present disclosure.

SUMMARY

The present disclosure is directed to a redox-relay flow battery comprising: a half-cell electrode chamber comprising an electrode, wherein the half-cell electrode chamber is in fluid communication with a reservoir; wherein the half-electrode chamber further comprises a shuttle material comprising one or more redox-active organic compounds; wherein the reservoir comprises a plurality of redox-active solids (ROS); wherein the shuttle material is configured to circulate through the half-cell electrode chamber to the reservoir to relay a charge between at least a portion of the redox-active solids and the electrode; and wherein the plurality of the redox-active solids exhibit a redox potential substantially identical to a redox potential of the one or more redox-active organic compounds.

In still further aspects, the redox-relay battery can further comprise an electrolyte. Also disclosed herein are aspects where the plurality of the redox-active solids are substantially insoluble. While in still further aspects, at least a portion of the plurality of the redox-active solids comprises insoluble analogs of the one or more redox-active organic compounds. Further disclosed herein are the aspects wherein the one or more of redox-active organic compounds have a structure comprising:

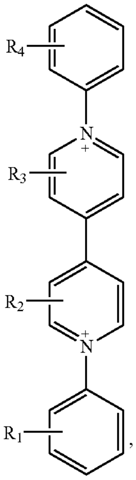

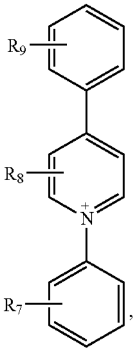

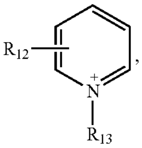

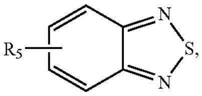

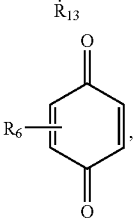

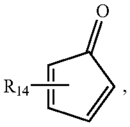

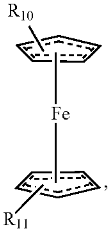

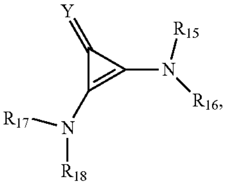

or

-continued

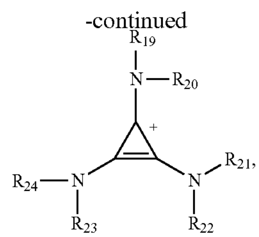

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula $-XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_8$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur.

Further disclosed herein is a cartridge comprising an amount of a plurality of redox-active solids (ROS), comprising a polymer comprising monomer units of one or more redox-active organic compounds; wherein the one or more redox-active organic compounds have a structure comprising:

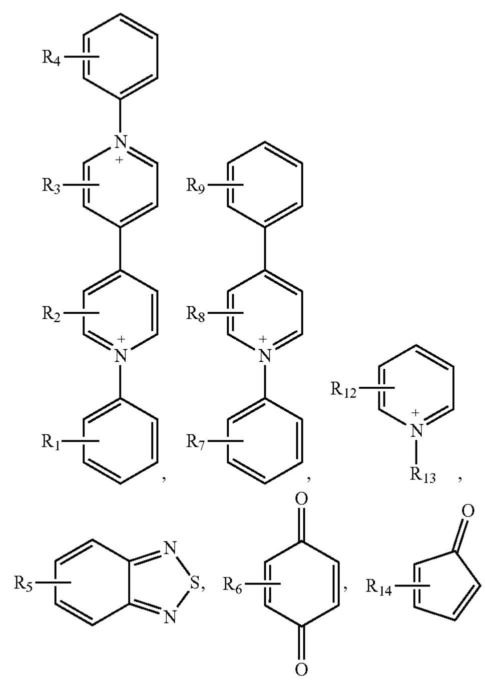

-continued

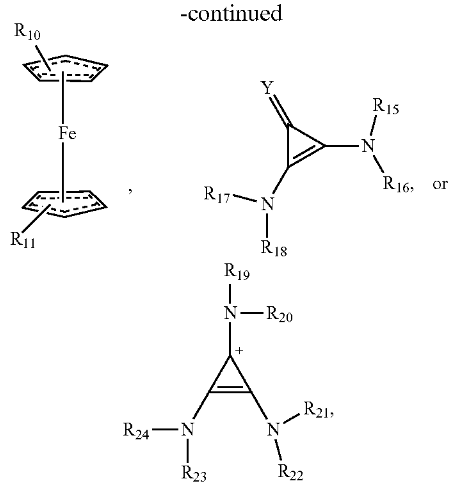

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula —$XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_8$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur.

In still further aspects, the cartridge is configured to be in fluid communication with a half-cell electrode chamber comprising an electrode and an amount of the one or more redox-active organic compounds present in an electrolyte, wherein the one or more redox-active organic compounds are configured to relay a charge between at least a portion of the plurality of the redox-active solids and the electrode, and wherein the plurality of the redox-active solids comprise a redox potential substantially identical to a redox potential of the one or more redox-active organic compounds.

Also disclosed is a system comprising any of the disclosed herein cartridges, a half-cell electrode chamber comprising an electrode and an amount of the one or more redox-active organic compounds, and a flow path for shuttling the redox-active organic compounds from the half-cell electrode chamber to the cartridge.

In still further aspects disclosed herein is a method comprising: providing one or more redox-active organic compounds having a structure comprising:

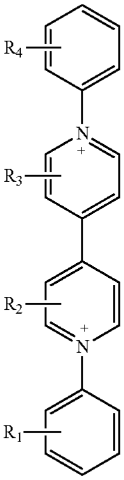
,
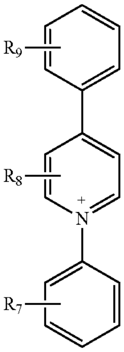
,
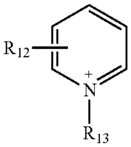
,
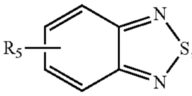
,
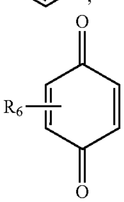
,
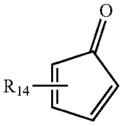
,
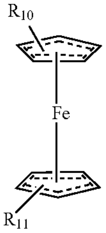
,
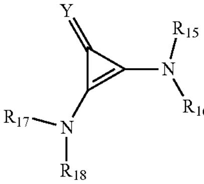
or
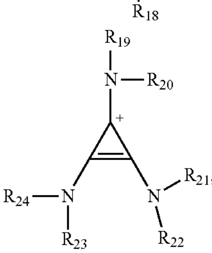

wherein $R_1$ through $R_{24}$, each independent of other, are selected from a hydrogen, halogen, $C_1$-$C_{22}$ alkyl, $C_1$-$C_{22}$alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula —$XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur; 554.

Additional advantages will be set forth in part in the description which follows, and in part will be obvious from the description or can be learned by practice of the aspects described below. The advantages described below will be realized and attained by means of the chemical compositions, methods, and combinations thereof, particularly pointed out in the appended claims. It is to be understood that both the foregoing general description and the following detailed description are exemplary and explanatory only and are not restrictive of the invention, as claimed.

DESCRIPTION OF DRAWINGS

FIG. 3A an illustration of RRFB with highlighted advantages compared to RFBs; FIG. 3B Representation of how to charge shuttle (small circle) and discharge shuttle (small square) interacts with the solid-state anode (large circle).

FIG. 12A depicts a SOC analysis of various charge shuttles; FIG. 12B depicts a SOC analysis of various discharge shuttles; FIG. 12C depicts a redox potential line $E_{1/2}$ vs. $Fc/Fc^+$ for each shuttle given in parentheses. % SOCs are of 1 minute after addition of 1 equivalent of RAP 2.

Figures 1A, 1B, 1C:
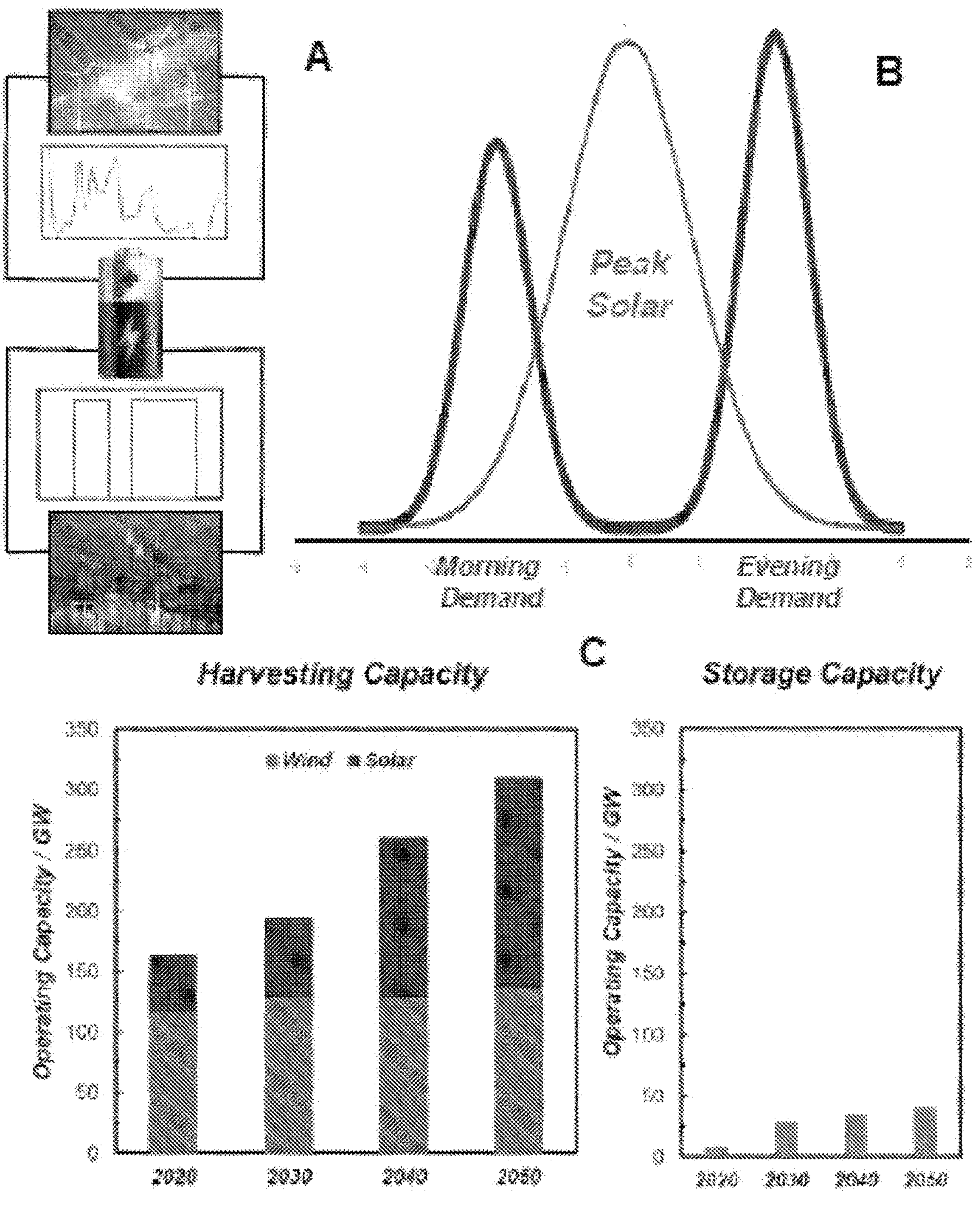
FIGS. 1A-1C depicts an illustration of EES stabilizing the electrical grid (FIG. 1A). A supply-demand mismatch between energy demand and peak solar sources (FIG. 1B). Projections of harvestable wind and solar energy compared to storage capacity over the next thirty years (FIG. 1C).
Figure 2:
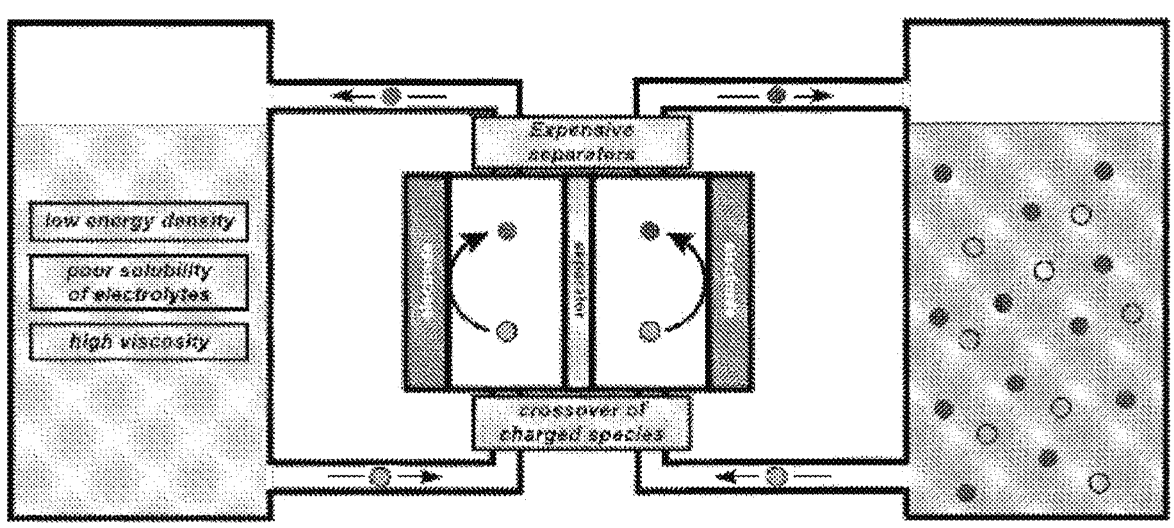
FIG. 2 depicts an illustration of RFB with highlighted issues.

The accompanying figures, which are incorporated in and constitute a part of this specification, illustrate several aspects described below.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the terms "optional" or "optionally" means that the subsequently described event or circumstance can or cannot occur and that the description includes instances where said event or circumstance occurs and instances where it does not.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used in the description and the appended claims, the singular forms "a," "an," and "the" include plural referents unless the context clearly dictates otherwise. Thus, for example, a reference to "a functional group" includes two or more such functional groups, reference to "a battery" includes two or more such batteries and the like.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms that shall be defined herein.

For the terms "for example" and "such as," and grammatical equivalences thereof, the phrase "and without limitation" is understood to follow unless explicitly stated otherwise.

As used herein, the term "substituted" means that a hydrogen atom is removed and replaced by a substituent. It is contemplated to include all permissible substituents of organic compounds. As used herein, the phrase "optionally substituted" means unsubstituted or substituted. It is to be understood that substitution at a given atom is limited by valency. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein, which satisfy the valencies of the heteroatoms. This disclosure is not intended to be limited in any manner by the permissible substituents of organic compounds. Also, the terms "substitution" or "substituted with" include the implicit proviso that such substitution is in accordance with a permitted valence of the substituted atom and the substituent and that the substitution results in a stable compound, e.g., a compound that does not spontaneously undergo transformation such as by rearrangement, cyclization, elimination, etc. In still further aspects, it is understood that when the disclosure describes a group being substituted, it means that the group is substituted with one or more (i.e., 1, 2, 3, 4, or 5) groups as allowed by valence selected from alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

The term "aliphatic" as used herein refers to a non-aromatic hydrocarbon group and includes branched and unbranched, alkyl, alkenyl, or alkynyl groups. As used herein, the term "$C_n$-$C_m$ alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, teri-butyl, isobutyl, sec-butyl; higher homologs such as 2-methyl-I-butyl, n-pentyl, 3-pentyl, n-hexyl, 1,2,2-trimethylpropyl, heptyl, octyl, nonyl, decyl, dodecyl, tetradecyl, hexadecyl, eicosyl, tetracosyl, and the like. The alkyl group can also be substituted or unsubstituted. Throughout the specification, "alkyl" is generally used to refer to both unsubstituted alkyl groups and substituted alkyl groups; however, substituted alkyl groups are also specifically referred to herein by identifying the specific substituent(s) on the alkyl group. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below and the like. When "alkyl" is used in one instance, and a specific term such as "alkylalcohol" is used in another, it is not meant to imply that the term "alkyl" does not also refer to specific terms such as "alkylalcohol" and the like.

As used herein, "$C_n$-$C_m$ alkenyl" refers to an alkyl group having one or more double carbon-carbon bonds and having n to m carbons. Examples of alkenyl groups include, but are not limited to, ethenyl, n-propenyl, isopropenyl, n-butenyl, seobutenyl, and the like. In various aspects, the alkenyl moiety contains 2 to 6, 2 to 4, or 2 to 3 carbon atoms. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, thiol, or phosphonyl, as described below.

As used herein, "$C_n$-$C_m$ alkynyl" refers to an alkyl group having one or more triple carbon-carbon bonds and having n to m carbons. Exemplary alkynyl groups include, but are not limited to, ethynyl, propyn-1-yl, propyn-2-yl, and the like. In various aspects, the alkynyl moiety contains 2 to 6, 2 to 4, or 2 to 3 carbon atoms. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

As used herein, the term "$C_n$-$C_m$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_n$-$C_m$ alkoxy," employed alone or in combination with other terms, refers to a group of formula —O-alkyl, wherein the alkyl group has n to m carbons. Example of alkoxy groups includes methoxy, ethoxy, propoxy (e.g., w-propoxy and isopropoxy), teributoxy, and the like. In various aspects, the alkyl group has 1 to 6, 1 to 4, or 1 to 3 carbon atoms.

The terms "amine" or "amino" as used herein are represented by the formula —$NR^1R^2$, where $R^1$ and $R^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)$NR^1R^2$.

The term "aldehyde" as used herein is represented by the formula —C(O)H. Throughout this specification, "C(O)" or "CO" is a shorthand notation for C═O, which is also referred to herein as a "carbonyl."

The term "carboxylic acid" as used herein is represented by the formula —C(O)OH. A "carboxylate" or "carboxyl" group as used herein is represented by the formula —C(O)$O^-$.

The term "ester" as used herein is represented by the formula —OC(O)$R^1$ or —C(O)O$R^1$, where $R^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $R^1OR^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $R^1C(O)R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "thio" refers to a group of formula —SH.

As used herein, the term "$C_n$-$C_m$ alkylthio" refers to a group of formula —S-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfmyl" refers to a group of formula —S(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonyl" refers to a group of formula —$S(O)_2$-alkyl, wherein the alkyl group has n to m carbon atoms. In various aspects, the alkyl group has 1 to 6, 1 to 4, or 1 to 3 carbon atoms.

As used herein, the term "carbamyl" to a group of formula —C(O)$NH_2$.

As used herein, the term "carbonyl," employed alone or in combination with other terms, refers to a —C(═O)— group, which may also be written as C(O).

As used herein, the term "carboxy" refers to a group of formula —C(O)OH.

As used herein, "halogen" refers to F, Cl, Br, or I. The term "hydroxyl" as used herein is represented by the formula —OH.

The term "cyano" as used herein is represented by the formula —CN. The term "nitro" as used herein is represented by the formula —$NO_2$.

The term "phosphonyl" is used herein to refer to the phospho-oxo group represented by the formula —P(O)$(OR^1)_2$, where $R^1$ can be absent, hydrogen, an alkyl, alkenyl, alkynyl, aryl, heteroaryl, cycloalkyl, or cycloalkenyl.

The term "silyl" as used herein is represented by the formula —$SiR^1R^2R^3$, where $R^1$, $R^2$, and $R^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —$S(O)_2R^1$, where $R^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —$S(O)_2NH$—.

As used herein, "cycloalkyl" refers to non-aromatic cyclic hydrocarbons, including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., C(O) or C(S)). Cycloalkyl groups also include cycloalkylidenes. Example of cycloalkyl groups includes cyclopropyl, cyclobutyl, cyclopentyl, cyclohexyl, cycloheptyl, cyclopentenyl, cyclohexenyl, cyclohexadienyl, cycloheptatrienyl, norbomyl, norpinyl, norcarnyl, and the like. In various aspects, cycloalkyl is cyclopropyl, cyclobutyl, cyclopentyl, cyclohexyl, cyclopentyl, or adamantyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example of heterocycloalkyl groups includes pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or $S(O)_2$, etc.). The heterocycloalkyl group can be attached through a ring-forming carbon atom or a ring-forming heteroatom. In various aspects, the heterocycloalkyl group contains 0 to 3 double bonds.

The term "cycloalkenyl," as used herein, is a non-aromatic carbon-based ring composed of at least three carbon atoms and containing at least one double bond, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, phosphorus, and nitrogen. In various aspects, the heteroaryl ring has 1, 2, 3, or 4 heteroatom ring members independently selected from nitrogen, sulfur, and oxygen. In various aspects, any ring-forming N in a heteroaryl moiety can be an N-oxide. In various aspects, the heteroaryl has 5-10 ring atoms and 1, 2, 3 or 4 heteroatom ring members independently selected from nitrogen, sulfur, and oxygen. In various aspects, the heteroaryl has 5-6 ring atoms and 1 or 2 heteroatom ring members independently selected from nitrogen, sulfur, and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl, and pyridazinyl.

The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within the second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

As used herein, the term "composition" is intended to encompass a product comprising the specified ingredients in the specified amounts, as well as any product which results, directly or indirectly, from a combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight, component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc., may be used herein to describe various elements, components, regions, layers and/or sections. These elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is then about 1% by weight, e.g., less than about 0.5% by weight, less than about 0.1% by weight, less than about 0.05% by weight, or less than about 0.01% by weight of the stated material, based on the total weight of the composition.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Redox flow batteries (RFBs) have drawn significant attention as candidates for grid-scale storage applications because they are particularly inexpensive to scale compared to solid-state batteries (SSBs). Energy in RFBs is stored in solvated compounds rather than in the solid electrodes themselves. As a result, increasing an RFB's capacity requires only an increase in the volume of the redox-active solution rather than building additional cell assemblies. Despite extensive efforts, non-aqueous RFBs (NRFBs) are typically limited to concentrations that are below the targets set by techno-economic analyses and have yet to be commercialized despite the promise of high-voltage systems. As an example, advanced NRFBs are generally demonstrated at concentrations below 0.1 M. Accessing high concentrations requires expensive molecular derivatization, and the resulting solutions are viscous and resistive. Recent studies suggest that nonaqueous systems may be restricted to operation at concentrations below 0.5 M because of limitations to ion solvation.

To avoid these issues, hybrid storage systems were developed to utilize redox-active solutions to charge/discharge anodic and cathodic solids in what is referred to as a redox-targeting reaction. Like in RFBs, a solvated molecule in this redox targeting flow battery (RTFB) undergoes electron transfer (ET) by flowing over a current collector. However, the role of the redox-active solution in the RTFB is not to store electrons but to shuttle electrons from the current collector to a redox-active solid for storage. With this design, the energy density of an RTFB scales with the capacity of the loaded solid, rather than with the concentration of solvated compound, allowing for energy densities that exceed 10 mol $e^-$ storage/kg solvent (>270 $AhL^{-1}$).

However, these redox-targeting reactions utilize shuttles that have set potentials for oxidation or reduction reactions and, as a result, fail to charge materials that require increasing overpotentials at increasing SOCs. As a result, only a small portion of the voltaic range for charging of the cluster is compatible with redox-targeting reactions, and the resulting devices reach low SOCs (<40%) and energy densities. Moreover, pairing charge/discharge shuttles with inorganic clusters is challenging because the redox chemistries of the storage solid and the shuttle are vastly different, with distinct redox potentials and rates of ET.

The aspects of the current disclosure are directed to forming the organic RFB having paired solids and shuttles chemistries. Aspects disclosed herein rely on building redox-active organic compounds into an insoluble polymer to create a shuttle-solid pair with redox chemistries that are inherently matched and synthetically modular. The redox-targeting reactions of matched pairs disclosed herein allow RTFBs to operate at both high SOCs and high voltaic efficiencies.

Previously it was shown, however, that designing a redox-active solid that is insoluble in all redox states presents a major challenge to RRFB design. Through multiple redox states, the ionic charge also changes, often from an ionic state to a neutral state. Therefore, while an electrolyte can be insoluble in its ionic state, it can be soluble in its neutral state. The constant change in redox state that electrolytes experience during battery cycling adds to the difficulty of designing these materials.

The aspects disclosed herein overcome these challenges. In some aspects disclosed herein are shuttles paired with their insoluble viologen-based solid analogs where such pairs are capable of cycling in a symmetric RTFB at 90% SOC. In such aspects, a 4-fold increase in storage capacity with improved voltaic efficiency over the analogous RFB is shown.

Figures 3A, 3B:
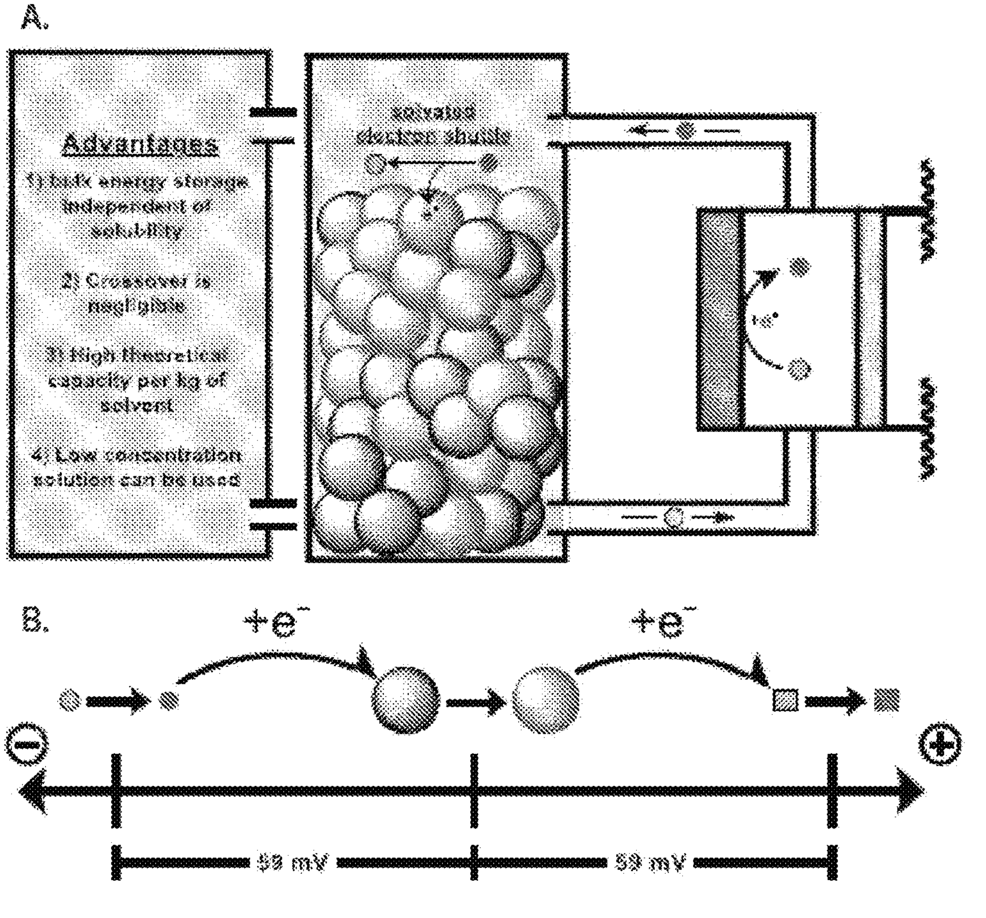
FIGS. 3A-3B depict.

In certain aspects, a redox-relay flow battery (RRFB), which merges solid-state and flow technologies to address key impediments to grid-scale application of RFBs, has been developed and described herein (FIG. 3A).

In certain aspects disclosed herein is a redox-relay flow battery comprising a half-cell electrode chamber comprising an electrode, wherein the half-cell electrode chamber is in fluid communication with a reservoir. In still further aspects, the half-electrode chamber further comprises a shuttle material comprising one or more redox-active organic compounds. In yet sill further aspects, wherein the reservoir comprises a plurality of redox-active solids (ROS). In exemplary aspects disclosed herein, the shuttle material is configured to circulate through the half-cell electrode chamber to the reservoir to relay a charge between at least a portion of the redox-active solids and the electrode. It is understood that in such exemplary aspects, the role of the charged redox-active compounds is not to store electrons but to shuttle electrons to the insoluble, redox-active solids. In still further aspects, the plurality of the redox-active solids exhibit a redox potential substantially identical to a redox potential of the one or more redox-active organic compounds.

It is understood that while the redox-active organic compounds can comprise any compounds suitable for the desired operation, in certain aspects, the redox-active compounds comprise one or more redox-active small organic molecules. Thus, it is understood that the terms "redox-active organic compounds" and "redox-active small organic molecules" or "ROMs" can be used interchangeably in this disclosure.

In still further aspects, the redox-relay battery disclosed herein comprises an electrolyte, wherein the electrolyte circulates between the half-cell electrode chamber and the reservoir. In such aspects, the electrolyte comprises the shuttles or one or more redox-active organic compounds in an amount from about 10 to about 500 mM, including exemplary values of about 20 mM, about 30 mM, about 40 mM, about 50 mM, about 60 mM, about 70 mM, about 80 mM, about 90 mM, about 100 mM, about 120 mM, about 150 mM, about 170 mM, about 200 mM, about 220 mM, about 250 mM, about 270 mM, about 300 mM, about 320 mM, about 350 mM, about 370 mM, about 400 mM, about 420 mM, about 450 mM, and about 470 mM.

Without wishing to be bound by any theory, it is understood that storing electrical energy as described herein substantially diminishes or even substantially eliminates issues associated with crossover since bulk energy is now stored in the redox-active solid, and any crossover can lead to a substantially negligible capacity loss.

In still further aspects, the flow batteries described herein can be used in both aqueous and non-aqueous systems. In other words, disclosed herein are aspects where the electrolyte is aqueous or non-aqueous.

It is understood that the aqueous or non-aqueous electrolytes can be chosen based on the desired applications. In aspects where the electrochemical widow is not desired to be greater than ~1.25 V, the aqueous electrolytes can be chosen as these can require a much lower operating voltage and concentration of active species. Yet, in the aspects where a larger electrochemical window is needed, the non-aqueous electrolytes can be used. In some aspects, the electrolytes based on acetonitrile, for example, can offer electrochemical windows exceeding 3V.

Since the disclosed herein redox-relay flow batteries can operate at a concentration of redox-active organic compounds from about 10 mM to about 500 mM, a large variety of electrolytes can be considered for shuttle species. Without wishing to be bound by any theory, the tunability of organic materials allows for factors, like redox potential and solubility, to be adjusted to the necessary system. It is understood that the tunability of organic materials can be useful in the electrolyte shuttle design in RRFBs since poor voltaic matching between the shuttle and redox-active solid can result in energy loss.

In still further aspects, and as disclosed herein, the redox potential of the plurality of the redox-active solids is substantially identical to the redox potential of the one or more redox-active organic compounds. In some aspects, the redox potential of the plurality of the redox-active solids is within about +/−150 mV, about +/−140 mV, about +/−130 mV, about +/−120 mV, about +/−110 mV, about +/−100 mV, about +/−90 mV, about +/−80 mV, about +/−70 mV, about +/−60 mV, about +/−50 mV, about +/−40 mV, about +/−30 mV, about +/−20 mV, or about +/−10 mV of the redox potential of the one or more redox-active organic compounds. It is understood that in some aspects, the redox potential of the plurality of the redox-active solids is within of less than about +/−60 mV or the redox potential of the one or more redox-active organic compounds. In certain exemplary aspects, a 90% state-of-charge (SOC) can be achieved with a shuttle redox potential that is 59 mV from the redox-active solid (FIG. 3B).

As disclosed herein and shown in FIGS. 3A-3B, RRFB storage can provide for a hybrid storage system with a number of key advantages over current RFBs. First, excessively high concentrations of the solvated shuttle are not required because the shuttle is a catalyst for energy storage rather than the storage material itself. Without wishing to be bound by any theory, it is assumed that the lower shuttle concentration can reduce solution viscosity, slow bimolecular decomposition pathways of solvated compounds, and eliminate the cost associated with extensive synthetic derivatization to prepare highly-soluble ROMs (or redox-active organic compounds). Moreover, ROMs with desirable potentials—but with solubilities that are impractical for RFB application—can be evaluated as RRFB shuttles. In doing so, the chemical space of redox chemistries can be significantly broadened. Second, the energy density of the RRFB scales with capacity (mass of ROS added) rather than with solubility.

Therefore, the systems disclosed herein can provide energy densities of over 20 mol of actives per kg solvent. At such energy densities, cost-competitive storage can be achieved at lower cell voltages (~2 V) than current RFB targets. In still further aspects, inexpensive, porous separators with low resistivity can be used because the energy is stored in the solid materials. Any crossover of the shuttle would only impact the coulombic efficiency (CE) of the cycle but would not lead to an irreversible capacity loss. Any commercially available separators that are suitable for intended purposes can be utilized In still further aspects, the solvents that can be used in the non-aqueous electrolytes can comprise acetonitrile, dimethyl carbonate, ethylene carbonate, ethyl methyl carbonate, ethylene sulfite, fluoroethylene carbonate, propylene carbonate, -methyl-2-pyrrolidone, dimethylformamide, tetrahydrofuran (THF), or any combination thereof.

In still further aspects, the electrolyte comprises a salt. In such exemplary aspects, any salts that allow the desired conductivity of the electrolyte can be used. In some aspects, the salt can comprise cations of Li, K, Na, Cs, Al, Mg, or any combination thereof. In yet other aspects, the salt can comprise anions of bis(trifluoromethane)sulfonimide, perchlorate, tetrafluoroborate, hexafluorophosphate, hexafluroarsenate, bis(fluorosulfonyl)imide, aluminum tetrachloride, boron tetrachloride, iodide, chlorate, chloride, $BrO_3$, $LiIO_3$, or a combination thereof.

In still further aspects, the plurality of the redox-active solids are substantially insoluble in the electrolyte. In yet other aspects, the plurality of the redox-active solids are insoluble in the electrolyte.

Also disclosed herein are aspects where at least a portion of the plurality of the redox-active solids comprises insoluble analogs of the one or more redox-active organic compounds. In such aspects, the at least a portion of the plurality of the redox-active solids can be a polymer comprising monomeric units of the one or more of redox-active organic compounds. In some aspects, the one or more redox-active organic compounds are polymerized to form the redox-active solids. In some exemplary aspects, the at least a portion of the plurality of the redox-active solids comprises an insoluble crosslinked polymer comprising monomers units of the one or more redox-active organic compounds. Yet, in other aspects, the at least a portion of the redox-active solids can comprise a covalent self-assembly comprising monomer units of the one or more redox-active organic compounds. In yet still further aspects, the at least a portion of the plurality of the redox-active solids can comprise the one or more redox-active organic compounds covalently bonded to a support. It is understood that support can comprise any material suitable for the desired application. In some aspects, the support can comprise carbon-based materials, functionalized polymers such as polystyrene beads, etc.

In still further aspects, wherein the redox-active organic compounds have a structure comprising

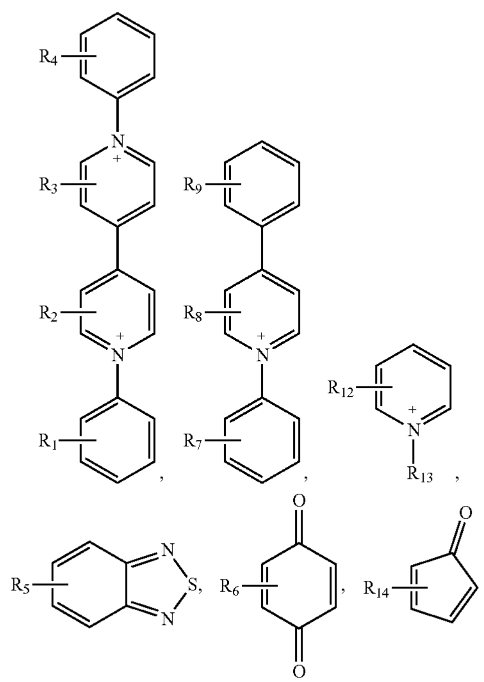

-continued

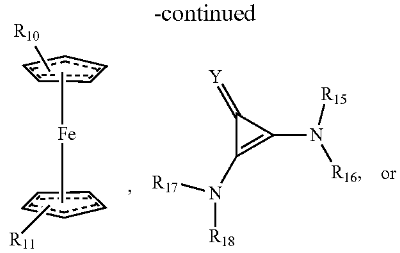

or

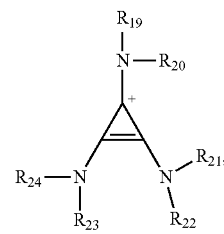

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_5$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula $-XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur.

It is understood that in such aspects, any of $R_1$ through $R_{24}$ can be the same or different. In certain aspects, some of the substituents are the same, while in other aspects, other substituents are the same. It is understood that the lists of substituents are not limited, and any known in the art substituents that can provide for the desired result can be used.

In still further aspects, the half-cell electrode is a cathode cell chamber. In such exemplary aspects, the electrode is a cathode. In still further aspects, the battery further comprises an anode cell chamber comprising an anode. In such exemplary aspects, the anode cell chamber is in fluid communication with a reservoir; wherein the anode cell chamber further comprises a shuttle comprising one or more redox-active organic compounds disclosed herein; wherein the reservoir comprises a plurality of redox-active solids (ROS) that are insoluble analogs of the one or more redox-active organic compounds; wherein the shuttle material is configured to circulate through the anode cell chamber to the reservoir to relay a charge between at least a portion of the redox-active solids and the anode; and wherein the plurality of the redox-active solids exhibit a redox potential substantially identical to a redox potential of the one or more redox-active organic compounds. It is understood that one or more redox-active compounds that present in this counter electrode chamber can be chosen based on anolytes properties of these compounds. It is further understood that the ROSs present in the reservoir coupled to this counter electrode are insoluble analogs of the one or more redox-active compounds having anolytes properties.

While in other aspects, the half-cell electrode is an anode cell chamber, and the electrode is an anode, and the battery further comprises a cathode cell chamber comprising a cathode. In such exemplary aspects, the cathode cell chamber is in fluid communication with a reservoir; wherein the cathode cell chamber further comprises a shuttle comprising one or more redox-active organic compounds disclosed herein; wherein the reservoir comprises a plurality of redox-active solids (ROS) that are insoluble analogs of the one or more redox-active organic compounds; wherein the shuttle material is configured to circulate through the cathode cell chamber to the reservoir to relay a charge between at least a portion of the redox-active solids and the anode; and wherein the plurality of the redox-active solids exhibit a redox potential substantially identical to a redox potential of the one or more redox-active organic compounds. It is understood that one or more redox-active compounds that present in this counter electrode chamber can be chosen based on the catholytes properties of these compounds. It is further understood that the ROSs present in the reservoir coupled to this counter electrode are insoluble analogs of the one or more redox-active compounds having catholytes properties.

In still further aspects, the anode and the cathode can comprise any known in the art materials. In some exemplary and unlimiting aspects, the anode and/or cathode can comprise carbon, platinum, nickel, or any combination thereof.

In still further aspects, the redox-active solids can have any shape. In some aspects, the plurality of redox-active solids have a shape of spheres, shards, or a combination thereof. In yet still, further aspects, the shape of at least a portion of the redox-active solids is substantially unchanged during charge/discharge operation of the battery.

In still further aspects, the redox-active solids have a size from about 20 microns to about 100 mm, including exemplary values of about 50 microns, about 100 microns, about 250 microns, about 500 microns, about 750 microns, about 1 mm, about 10 mm, about 50 mm, about 70 mm, and about 90 mm.

In yet further aspects, the volumetric capacity of the half-cell can be from about 100 Ah/L to 750 Ah/L, including exemplary values of about 200 Ah/L, about 400 Ah/L, about 500 Ah/L, and about 700 Ah/L.

In still further aspects, the battery can exhibit a voltaic efficiency of greater than about 70%, greater than about 80%, greater than about 90%, or even greater than about 95%.

Also disclosed herein are cartridges comprising a predetermined amount of redox-active solids (ROS) comprising a polymer comprising monomer units of one or more redox-active organic compounds; the one or more redox-active organic compounds have a structure comprising:

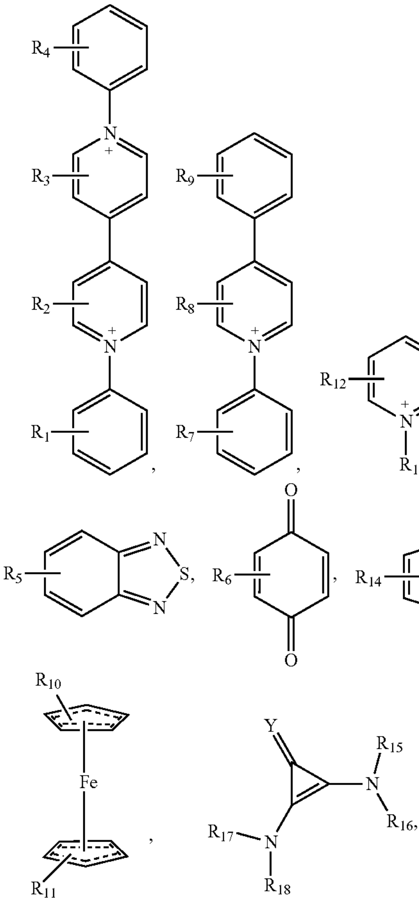

or

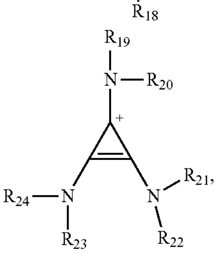

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula $—XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur.

In still further aspects, the cartridge is configured to be in fluid communication with a half-cell electrode chamber comprising an electrode and an amount of the one or more redox-active organic compounds present in an electrolyte, wherein the one or more redox-active organic compounds are configured to relay a charge between at least a portion of the plurality of the redox-active solids and the electrode, and wherein the plurality of the redox-active solids comprise a redox potential substantially identical to a redox potential of the one or more redox-active organic compounds.

In still further aspects, the redox-active solids of the disclosed cartridge can comprise any of the disclosed herein redox-active solids. In still further aspects, the disclosed herein cartridge is configured to be in fluid communication with any of the disclosed above half-cell electrode chambers. Again, it is further understood that any of the disclosed redox-active organic compounds and electrolytes can be utilized in such half-cell electrode chambers.

In yet further aspects, the cartridge is configured to be charged to provide redox-active solids exhibiting volumetric capacity from about 100 to about 750 Ah/L, including exemplary values of about 200 Ah/L, about 400 Ah/L, about 500 Ah/L, and about 700 Ah/L, at a first location and discharged at a second location, wherein the first location is the same or different from the second location. It is understood that in some aspects, the first location can be geographically distant from the second location. In some exemplary and unlimiting aspects, the cartridges can be charged at a production site and shipped to any other locations worldwide for the desired application. In yet other aspects, the cartridges can be charged at the location when the desired application is performed.

In still further aspects, disclosed herein is a system comprising the disclosed cartridge, an electrode, a reservoir comprising the amount of the redox-active organic compounds, and a flow path for shuttling the redox-active organic molecules from the reservoir to the cartridge. Any of the disclosed electrodes, redox-active organic compounds, and electrolytes can be used in such a system. In some aspects, the half-cell electrode chamber is a cathode chamber comprising a cathode electrode. In such aspects, the system can further comprise an anode electrode chamber comprising an anode. Yet, in still further aspects, if the half-cell electrode chamber is an anode chamber comprising an anode electrode, the system can further comprise a counter cathode chamber comprising a cathode electrode. It is further understood that the counter half-cell electrode chamber can also be in communication with the counter reservoir comprising any of the disclosed herein ROSs. It is further understood that the specific ROSs can be chosen based on the catholytes or anolytes properties depending on a specific half-cell in use.

In still further aspects, the system can be in electronic communication with a control unit. In still further aspects, the system can comprise at least one pumping device configured to circulate the electrolyte through the cartridge.

In still further aspects, the system can comprise two of any of the disclosed herein cartridges. In such aspects, one of the two cartridges is in fluid communication with an anode half-cell electrode chamber comprising an anode electrode and an amount of the one or more redox-active organic compounds present in an electrolyte, and wherein a second of the two cartridges is in fluid communication with a cathode half-cell electrode chamber comprising a cathode electrode and an amount of the one or more redox-active organic compounds present in an electrolyte.

Also disclosed herein are the methods of making the disclosed batteries. In such aspects, the methods comprise providing one or more redox-active organic compounds having a structure comprising:

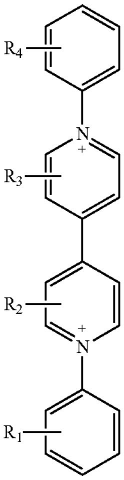
,
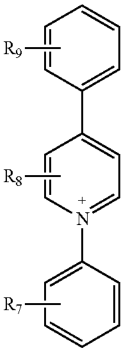
,
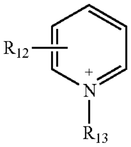
,
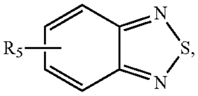
,
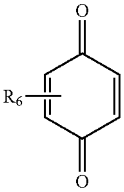
,
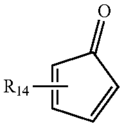
,
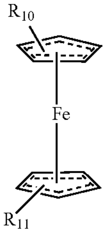
,
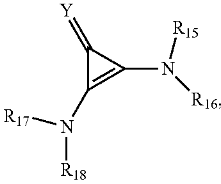
or
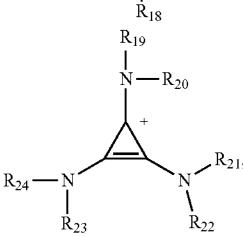

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; wherein $R_1$ through $R_{24}$, each independent of other are optionally substituted by a group having a formula —$XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur; forming a plurality of redox-active solids and forming any of the disclosed herein redox-relay batteries.

Also disclosed herein are the methods wherein the step of forming the plurality of the redox-active solids comprises polymerizing monomers of the one or more redox-active organic compounds to form an insoluble crosslinked polymer comprising monomer units of the redox-active organic compounds. Any known in the art methods of polymerization can be utilized. In some aspects, the polymerization used to form the redox-active solids from monomers of the redox-active organic compounds can comprise a ring-opening metathesis polymerization (ROMP). In some aspects, the ring-opening metathesis polymerization is living polymerization.

In still further aspects, the polymerization is due to self-assembly. In such aspects, the step of forming the plurality of the redox-active solids comprises polymerizing monomers of the one or more redox-active organic compounds to form a covalent self-assembly.

In still further aspects, the plurality of the redox-active solids can be formed by covalently bonding the one or more redox-active organic compounds to a support. In such exemplary and unlimiting aspects, the support, for example, can comprise a polymer that can be modified by the one or more redox-active organic compounds to form active functional groups.

In still further aspects, the formed redox-active solids can have different shapes. In certain aspects, the shape of the ROSs can be spherical. Any known in the art methods of forming spherical polymers and suitable for the desired application can be utilized. In certain aspects, the spherical ROSs can be formed by utilizing emulsion polymerization. In certain aspects, the emulsion polymerization using various solvents and surfactants was utilized to arrive at the ROSs having the disclosed size. In certain aspects, the solvents used to form the spherical ROS can comprise water, heptane, ethyl acetate, toluene, benzene, chlorobenzene, p-xylene, or a combination thereof. In yet further aspects, the surfactants useful for the emulsion polymerization can comprise sodium dodecyl sulfate, Brij 35, sodium dioctyl sulfosuccinate, or a combination hereof. In still further aspects, any commercially available surfactants suitable for the intended application can also be used.

By way of non-limiting illustration, examples of certain aspects of the present disclosure are given below.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is degrees C. or is at ambient temperature, and pressure is at or near atmospheric.

General Remarks

All purchased chemicals were used without further purification unless otherwise noted. Compounds 3, 4, 6, 7, 8, 9, 10, 11, 12, and 13 (as shown below) were prepared according to published literature procedures. 1,1'-bis(4-(tert-butyl)benzyl)-[4,4'-bipyridine]-1,1'-diium hexafluorophosphate was prepared according to published literature as a model compound for comparison to redox-active polymer (RAP) 2. The methods of making 1,1'-bis(4-(tert-butyl)benzyl)-[4,4'-bipyridine]-1,1'-diium hexafluorophosphate and compound 2 are also shown below. All bromide, chloride, or iodide counterions were exchanged for hexafluorophosphate anions.

(3)

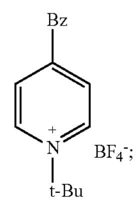

(4)

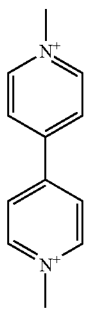

, (6)

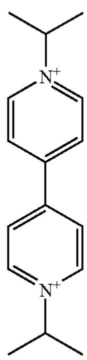

, (7)

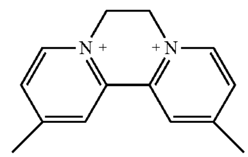

, (8)

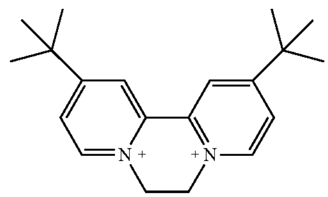

,

-continued (9)

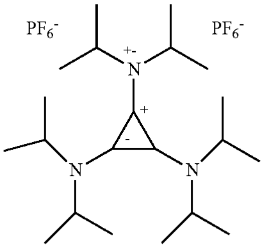

, (10)

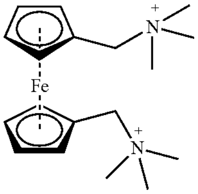

, (11)

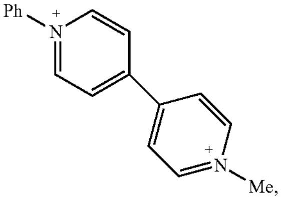

(12)

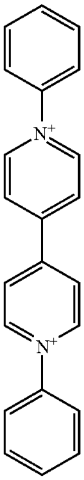

, (13)

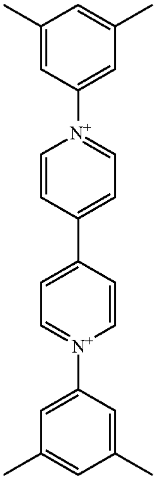

, and

-continued (14)

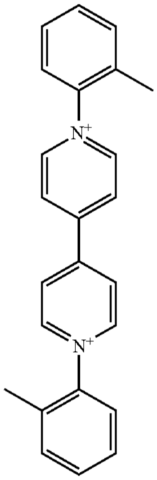

.

$^1$H NMR spectra were obtained at 400 MHz, and chemical shifts were recorded relative to CH3CN in CD3CN (δ 1.94 ppm). $^{13}$C NMR spectra were obtained at 101 MHz. $^{13}$C CPMAS NMR spectra were obtained at 500 MHz. Proof of purity was demonstrated by copies of NMR spectra. NMR multiplicities are reported as follows: singlet (s), doublet (d), triplet (t), quartet (q), multiplet (m). Scanning electron microscope (SEM) images were performed on an FEI Apreo Lovac Analytical SEM. UV-Vis spectrometry was performed on an Avantes AvaSpec spectrometer. Samples for UV-Vis spectrometry were prepared using 0.3 M KPFe in MeCN as the electrolyte solution.

All electrochemical analyses were carried out in a nitrogen-filled glovebox in solutions of acetonitrile (MeCN) with potassium hexafluorophosphate as supporting electrolyte. Cyclic voltammetry and normal pulse voltammetry were performed with a Biologic VSP multichannel potentiostat/galvanostat. Cyclic voltammetry and normal pulse voltammetry was carried out in a three-electrode electrochemical cell, consisting of a glassy carbon disk working electrode (0.07 $cm^2$, BASi), an Ag/Ag+ pseudo-reference electrode (BASi) with 0.01 M AgBF4 (Millipore Sigma) in MeCN, and a platinum wire counter electrode (23 cm, ALS). The glassy carbon disk electrode was polished in a nitrogen-filled glovebox using diamond polish (15 μm micron, BASi) and anhydrous MeCN. All cyclic voltammetry experiments were performed at a scan rate of 100 mV/s in a MeCN electrolyte containing 0.3 M KPF6 unless otherwise noted. All initial voltages for normal pulse voltammetry were set at the measured open-circuit voltage of the system. Reference electrodes were calibrated against an internal voltage reference of ferrocene (1-10 mM).

RRFB H-Cell and Flow Studies

H-cell charge/discharge measurements were carried out with a BioLogic VSP galvanostat in a custom glass H-cell and reticulated vitreous carbon electrodes (100 ppi). A porous glass frit (P5, Adams and Chittenden) was used as the separator.

A quasi-reference electrode (Ag/AgCl BASi) with 0.3 M KPF6 was used in the working side of the H-cell. The electrolyte solution in the working chamber of the H-cell contained 10 mM of each shuttle and 0.3 M $KPF_6$ in MeCN. The counter electrolyte contained the same solution but was chemically pre-charged with the highly reducing pyridine radical 3 (30 mM). The working chamber of the H-cell was loaded with 5.5 mL of the electrolyte solution, charged with a known quantity of the RAP, and stirred continuously during cycling at a rate of 3 mA with a voltaic cutoff. The counter chamber of the H-cell was loaded with a volume of solution equivalent to 1 equivalent of electrons with respect to the working side. A peristaltic pump (ColeParmer) with Tygon-C and PFA tubing was used to circulate the counter solution through the cell at 25 mL/min to maintain a 5.5 mL volume in the H-cell.

Cycling under flow conditions was performed with a zero-gap flow cell comprised of graphite charge-collecting plates containing an interdigitated flow field in combination with two layers of carbon paper electrodes (Nafion GDL 28AA) on each side. PTFE gaskets were used to achieve ~20% compression of the felt. A membrane received from Duramic separated the two half cells, and the exposed area of the membrane in the gasket window was used as the active area (2.55 $cm^2$). No pretreatment of the membrane or electrodes was performed. The cell, reservoirs (Fisher brand disposable borosilicate glass tubes with a threaded end, 16×100 mm), and tubing were assembled and brought into a nitrogen-filled glovebox. Both chambers were charged with 11 mL of a solution containing 15 mM of dimethylviologen, 10 mM of ferrocene, and 0.3 M potassium hexafluorophosphate. The anodic reservoir was charged with uncharged polymer. The cathodic reservoir was charged with polymer charged with an excess of pyridine radical 3. A peristaltic pump (ColeParmer) with Tygon-C and PFA tubing was used to circulate the electrolyte solutions through the cell at 15 mL/min. Filter paper was wrapped around the intake tubing in the reservoir to ensure no polymer flowed through the cell. Solution was pumped through the bottom of the reservoir to ensure efficient mixing of the polymer.

Example 1

Various strategies for synthesizing desired components for the disclosed RRFB have been developed and are shown below.

As discussed above, the design of disclosed herein RRFBs is based on (i) the storage solids being substantially insoluble at all redox states and (ii) the redox potentials of the storage solids and relay shuttles being substantially identical or being substantially matched to each other.

Without wishing to be bound by any theory, it is assumed that trace solubility of the solid can lead to irreversible capacity losses from the crossover. Additionally, solvated materials leaching from the cartridge can precipitate within the reactor cell and clog the RRFB. The second criteria can guide the selection of shuttles that can fully charge and fully discharge the storage solid. For example, an anodic shuttle with a redox potential that is more positive than the anodic solid by as little as 60 mV will be too weak of a reductant to charge the solid anode. The resulting RRFB would reach a low, if any, state-of-charge (SOC) because of the mismatch between the shuttle and solid.

Figures 5A, 5B, 5C:
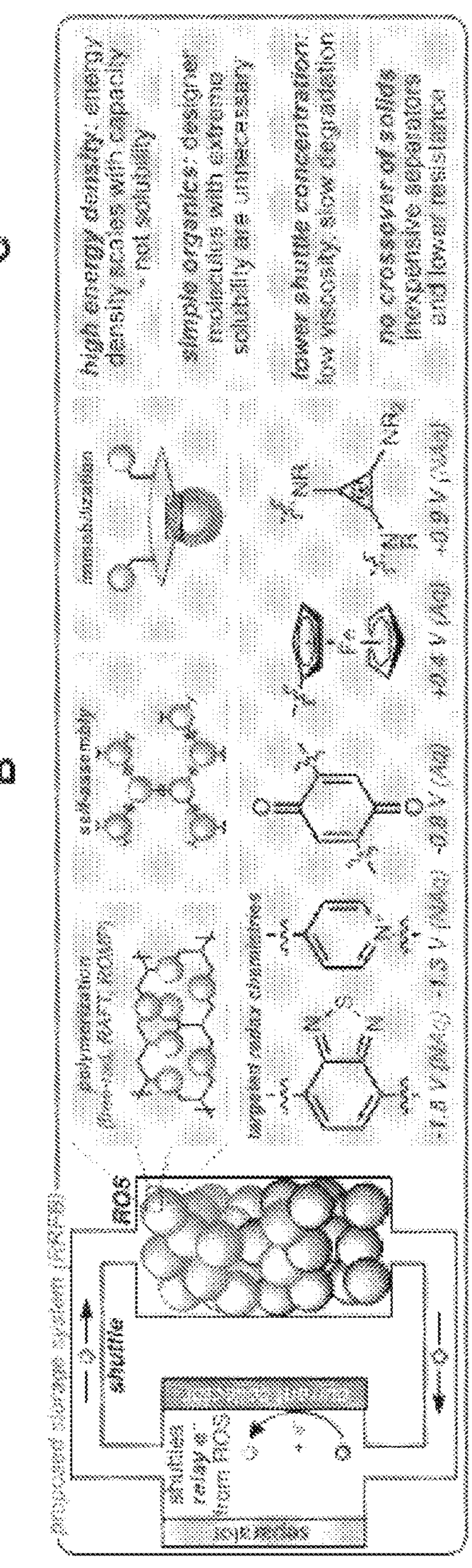
FIGS. 5A-5C depict an illustration of an exemplary RRFB (FIG. 5A), a summary of exemplary methods of making ROSs from the targeted redox chemistries (FIG. 5B); and the advantages of RRFBs over conventional RFBs (FIG. 5C).

To address this issue, the shuttles and solids based on the same redox chemistry were developed. Some exemplary RRFBs and possible routes of making the same are shown in FIGS. 5A-5C.

Figure 6:
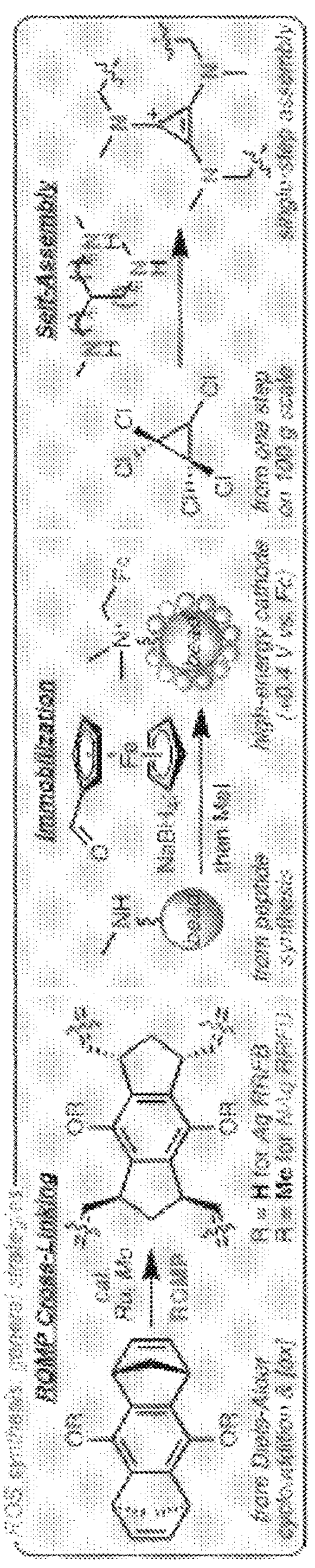
FIG. 6 depicts general strategies for rendering ROMs insoluble in various aspects.

In still further aspects, the ROM shuttles can be paired with storage solids that are insoluble analogs of the ROM. Without wishing to be bound by any theory, it was assumed that the identical redox chemistries can provide matching of redox potentials between the shuttle and solid as desired. Three strategies can be used for the synthesis of ROSs that are generally applicable to a variety of desirable redox chemistries (FIG. 6). The resulting ROSs can be explored for aqueous and nonaqueous applications. The first two strategies rely on hyper-crosslinking of ROMs through radical polymerization or covalent self-assembly to create robust and insoluble ROSs. A third strategy can employ solid supports onto which ROMs can be covalently linked.

Any available synthetic tools that are applicable to the desired application can be utilized. Such synthetic tools can complement the limitations of the free-radical polymerization that was utilized to generate the ROS 15:

(15)

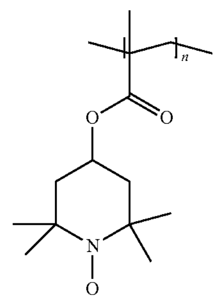

,

The methods used for the synthesis of the desired compounds include (i) ring-opening metathesis polymerization (ROMP), (ii) ROM immobilization, and (iii) rapid self-assembly of ROMs for ROS synthesis.

The ring opening metathesis polymerization (ROMP) can be applied to form ROSs of dialkoxyarenes (FIG. 6, left, R=alkyl). These attractive catholytes (+0.6 V) require extensive substitution for chemical stability in the oxidized state. Exemplary previously developed soluble analogs formed through a multistep synthetic route involving the annulated structure are illustrated in FIG. 6 (left). In contrast, the reactivity of the strained alkenes to effect a ROMP can also be employed. The resulting structures can retain a high degree of substitution and steric hindrance around the arene core to maintain chemical stability. Moreover, ROMP is a living polymerization, which allows the molecular weight of the polymer to be easily controlled by the amount of catalyst added (each catalyst generates one polymer). Finally, this strategy can provide access to highly-substituted hydroquinone analogs (R═H), which will be evaluated as ROSs for Aq applications.

Immobilization of organics can also be used for ROS synthesis. This approach can be applied to the synthesis of ferrocenyl ROSs that undergo oxidation at higher potentials than ferrocene. It was shown that e-withdrawing ammonium substituents on ferrocene can increase the oxidation potential by up to 0.4 V. Aqueous RFBs of this chemistry can undergo hundreds of cycles with only minor capacity losses, which likely results from the crossover. Without wishing to be bound by any theory, it is hypothesized that creating an RRFB analog could eliminate the capacity to fade entirely. In certain aspects, it is possible to couple ferrocenyl fragments to polystyrene beads with amine termini that are commonly used for solid-state peptide synthesis (FIG. 6, middle). Reductive amination of the ferrocenyl aldehyde, followed by global methylation, can immobilize the ferrocenyl ROM through the targeted ammonium substituent.

The ROSs can also be synthesized using ROMs that can "click" together to form highly crosslinked ROSs self-assemblies. Candidates for this synthetic approach need to have multiple reactive sites to allow for polymerization as well as linking between polymer chains. An example of such synthesis can be the self-assembly of cyclopropenium (CP) ROSs. It is known CP catholytes are robust, despite their oxidation potential being among the highest of organic catholytes. Synthesis of CP catholytes is accomplished in a single step from pentachloro cyclopropane (accessible on a large scale) and an amine (FIG. 6, right). ROSs can be prepared by combining the chlorocylopropane precursor with di- or triamine substrates that can bridge multiple CP units. Because diamines of varying lengths are abundant, commodity chemicals, distances between CP units can be easily varied.

Some additional exemplary synthesis routes are shown and discussed below.

Example 2

Synthesis of 1,1'-bis(4-vinylbenzyl)-[4,4'-bipyridine]-1,1'-dilum chloride (Compound 1)

A250 mL round bottom flask was charged with 4,4'-bipyridine (10.0 g, 64.0 mmol), 4-vinylbenzyl chloride (36.2 mL, 256 mmol, 4 equiv), acetonitrile (60 mL), and a magnetic stir bar. The mixture was allowed to reflux for 12 hours and then cooled to room temperature. The yellow solid was collected via vacuum filtration and washed with acetonitrile. The solvent was removed in vacuo to yield the title compound as a pale, yellow solid (24.9 g, 84%). 1H NMR (400 MHz, D2O) δ: 9.29 (d, J=7.1 Hz, 4H), 8.66 (d, 7.1 Hz, 4H), 7.74 (d, 8.3 Hz, 4H), 7.64 (d, J=8.3 Hz, 4H), 6.94 (dd, J=17.7, 11.0 Hz, 2H), 6.04 (dd, 17.7, 0.6 Hz, 2H), 6.04 (s, 4H), 5.52 (dd, 11.0, 0.6 Hz). 13C NMR (101 MHz, D2O) δ 150.1, 145.4, 139.1, 135.6, 131.6, 129.7, 127.2, 127.1, 116.0, 64.5.

(1)

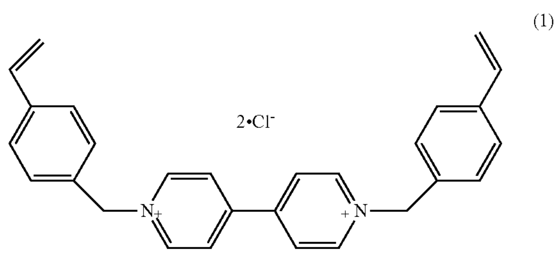

Polymerization of 1,1'-bis(4-vinylbenzyl)-[4,4'-bipyridine]-1,1'-diium hexafluorophosphate (Compound 2, Spheres)

A 40 mL scintillation vial was charged with 1 (2.0 g, 4.3 mmol), $H_2O$ (2.0 mL), dioctyl sodium sulfosuccinate (8.9 mg, 0.020 mmol), benzene (20 mL), and a 25 mm football stir bar. At a stirring rate of 180 rpm, the mixture was heated to 85° C. until the solid dissolved. While stirring, an aqueous solution of potassium persulfate (1.2 mL, 180.6 mM) was quickly added. The mixture was allowed to react at 85° C. for 1 hour. The yellow solid was collected via vacuum filtration and washed with $H_2O$. The collected solid was sifted through a 60 mesh strainer, and smaller fragments were sifted through a 150 mesh strainer. A 40 mL scintillation vial was charged with the collected spherical solids and a saturated aqueous solution of potassium hexafluorophosphate. The mixture was shaken for 1 hour, and the process was repeated two more times. The same process was repeated twice with acetonitrile. The solid was collected by vacuum filtration. Solvent was removed in vacuo to yield the title compound as a pale, yellow solid (0.91 g, 31%). Elemental Analysis: Calculated for $C_{26}H_{26}F_{12}N_2P_2$: C, 49.4; H, 3.85; N, 4.12. Found: (1) C, 49.0; H, 4.06; N, 4.17. (2) C, 49.1; H, 4.3; N, 4.89. Solid-state $^{13}C$ NMR spectroscopy: CPMAS 6:150.0, 149.5, 64.9, 41.0, 14.9.

(2)

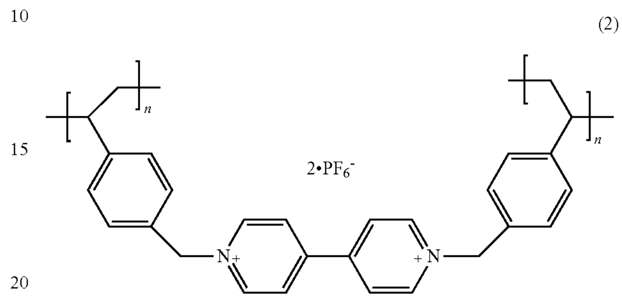

Synthesis of 1,1'-di-o-tolyl-[4,4'-bipyridine]-1,1'-dilum hexafluorophosphate (Compound 14)

Following the published literature procedure, a round bottom flask was charged with o-toluidine (2.84 mL, 26.7 mmol), N,N'-bis(2,4-dintirophenyl)-4,4'-bipyridinium dichloride (5.00 g, 8.91 mmol), and a magnetic stir bar. N,N'-dimethylacetamide (90 mL) was added dropwise to the mixture. The mixture was stirred at 95° C. for 14 hrs. At a temperature below 60° C., ethyl acetate (90 mL) was added dropwise. The solid was collected by vacuum filtration. The resulting brown solid was dissolved in a minimal amount of $H_2O$ and a saturated aqueous solution of potassium hexafluorophosphate (50 mL). The resulting solid was collected by vacuum filtration. Solvent was removed in vacuo to yield the title compound as a pale, white solid (3.35 g, 60%). 1H NMR (400 MHz, CD3CN) δ: 9.04 (d, J=6.98 Hz, 4H), 8.62 (d, 6.98 Hz, 4H), 7.71-7.56 (m, 8H), 2.24 (s, 6H). $^{13}C$ NMR (101 MHz, CD3CN) δ: 152.2, 147.8, 142.7, 133.8, 133.2, 133.1, 128.9, 128.6, 126.8, 17.27.

(14)

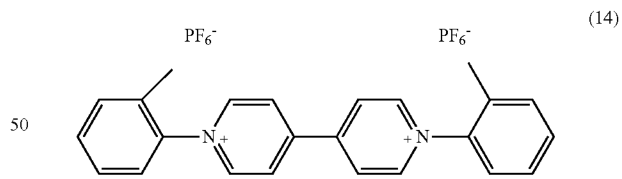

Oxidation of Compound 9

The following synthesis was performed in a nitrogen-filled glovebox. A 20 mL scintillation vial was charged with $NOPF_6$ (181 mg, 1.03 mmol), acetonitrile (2 mL), and a magnetic stir bar. A separate 20 mL scintillation vial was charged with 9 (500 mg, 1.03 mmol) and acetonitrile (2 mL). To the vial containing $NOPF_6$, the solution of 9 was added dropwise while vigorously stirring. The solution turned red upon addition of 9. Diethyl ether was added to the resulting solution to precipitate the red solid. Red solid was isolated by vacuum filtration. The crude red solid was recrystallized from 15 mL of dry acetonitrile. The resulting red solution was placed in the freezer to induce crystallization. The resulting red solid was isolated using vacuum filtration, washing with a 1:1 mixture of acetonitrile and diethyl ether. Solvent was removed in vacuo to yield the title compound as a bright, red solid (360 mg, 55%).

(9)

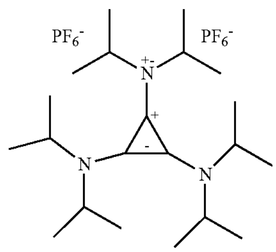

Synthesis of 1,1'-bis(4-(tert-butyl)benzyl)-[4,4'-bipyridine]-1,1'-diium hexafluorophosphate (Model Compound)

The title compound was prepared according to published literature and employed as a model for the viologen polystyrene RAP. The $^{13}C$ NMR spectrum of the title compound compared to the solid-state $^{13}C$ NMR spectrum of RAP 2 with a particular focus on benzylic carbon resonances. 13C NMR (101 MHz, CD3CN) δ: 154.3, 151.3, 146.4, 130.7, 130.1, 128.5, 127.5, 35.4, 31.4. This compound has been used to investigate various resonances in the NMR spectra in order to more precisely characterize the compounds of interest having a similar resonance pattern.

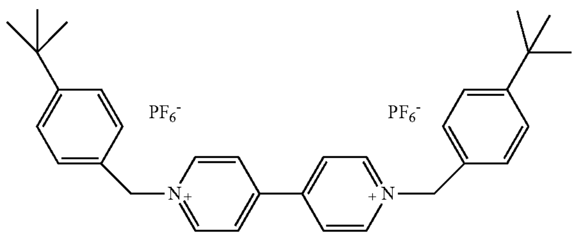

Monitoring State of Charge Using Cyclic Voltammetry

For charging experiments, a three-necked vial was loaded with uncharged polymer 2 (20.4 mg, 30.0 μmol). For discharge experiments, polymer 2 (20.4 mg, 30.0 μmol) was chemically reduced using an excess of pyridine radical 3 in acetonitrile for 1 hour. The charged polymer 2· was added to a 3-necked vial. To the polymer (2 or 2·), 3 mL of a 10 mM solution (1 equiv) of charging or discharging shuttle in 0.3 M potassium hexafluorophosphate in acetonitrile was added. For charging, shuttles 3, 4, 6, 7, and 8 were employed in their reduced states. Reduced states of shuttles 4 and 6-8 were prepared in situ through comproportionation with the highly-reducing pyridine radical 3 (1 equiv) as a chemical reductant. For discharging, shuttles 5 and 9-14 were used. For shuttle 5, ferrocenium hexafluorophosphate was synthesized as previously reported and used for the analysis. For shuttle 9, oxidized 9 was synthesized and used for the analysis. For shuttle 10, oxidized 9 (1 equiv) was added to obtain a solution of the oxidized 10. Cyclic voltammetry of the solution was performed at varying time intervals (0, 1, 2, 5, 10, and 20 minutes). In between time intervals, solutions were stirred. Electrodes were maintained in the same position during stirring and CV acquisition. Three trials were performed for each set of shuttles.

Example 3

Synthesis of Insoluble RAP.

The viologen materials required for RTFBs must be completely insoluble in all charge states so that the materials remain only in the storage chambers. Partial dissolution of the storage solid at any redox state will result in precipitation in the tubing, electrolysis cell, or counter chamber and clog the RTFB system. The polystyrene derivatives of viologen as the solubilities of viologen-based styrenyl polymers can be modified using comonomers that decrease solubility, such as tert-butyl styrene or crosslinking additives such as divinylbenzene. Despite these efforts, the resulting polymers all exhibited detectable solubility in the RTFB electrolyte (0.3 M $KPF_6$ in acetonitrile).

To evaluate the possibility of forming insoluble RAPs, the common electrolytes were targeted for the initial derivatization. Without wishing to be bound by any theory, it was hypothesized that soluble polymers for aqueous RFBs could be insoluble in non-aqueous organic solvents. TEMPO methacrylate polymer, 15, ($E_{1/2}$=0.35 V vs. ferrocene/ferrocenium couple (Fc/Fc)) as shown above was synthesized following previously reported procedures. The solubility of 15 in acetonitrile was tested with cyclic voltammetry (CV), and not detectable solubility was observed. The solubility of $15_{ox}$ in acetonitrile was also tested by CV. A solution of a TEMPO analog with the same redox potential as 15 was electrochemically oxidized and passed over 15 to oxidize it to $15_{ox}$. The observed increase in the current, as shown in CV, suggested that $15_{ox}$ is soluble in acetonitrile.

To decrease solubility, crosslinking with divinylbenzene was used. Polymer 16 shown below) was synthesized using 5% divinylbenzene as a crosslinking reagent.

(16)

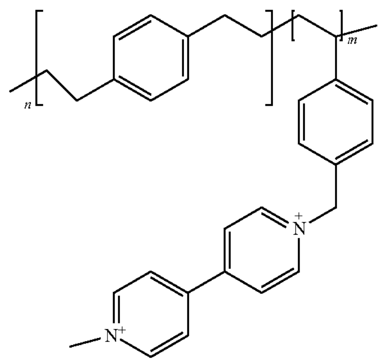

Figure 4:
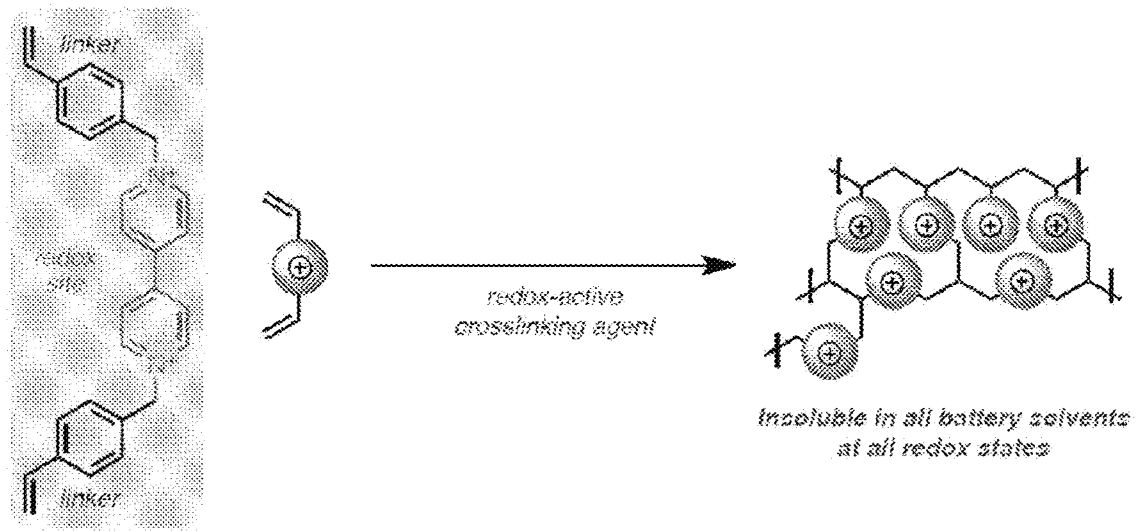
FIG. 4 depicts exemplary schematics of making insoluble ROSs in one aspect.

To further increase the extent of crosslinking, a viologen monomer (1) was synthesized, as shown above. This viologen also served as its own crosslinking agent (as shown in FIG. 4). Radical-initiated polymerization of this monomer formed a precipitate in just minutes, and the isolated solid was found to have no detectable solubility in both aqueous and nonaqueous solvents. The purity of the material was confirmed by elemental analysis, and insights into the structure were obtained through solid-state analytical techniques.

Solid-state $^{13}C$ NMR spectroscopy revealed a loss of resonances associated with vinylic groups with concomitant formation of benzylic carbons, which is consistent with a highly-crosslinked polystyrenyl backbone. Most importantly, the solid exhibited two reversible redox couples that are consistent with a reduction of a viologen core ($E_{1/2}$=−0.77, −1.19 V vs. $Fc/Fc^+$).

Example 4

Preliminary Cycling Performance of RAPs

An attempt to evaluate the depth and rate of charging that can be achieved with a shuttle that has the thermodynamic potential to fully reduce any accessible viologen units in the RAP was made.

First, charging of 2 using N, N'-dimethylviologen hexafluorophosphate ($E_{1/2}$=−0.83 V vs. $Fc/Fc^+$) as a charging shuttle was investigated. During charging, a capacity ~3.5 times greater than the theoretical capacity of the shuttle was observed for the first cycle.

Figure 16:
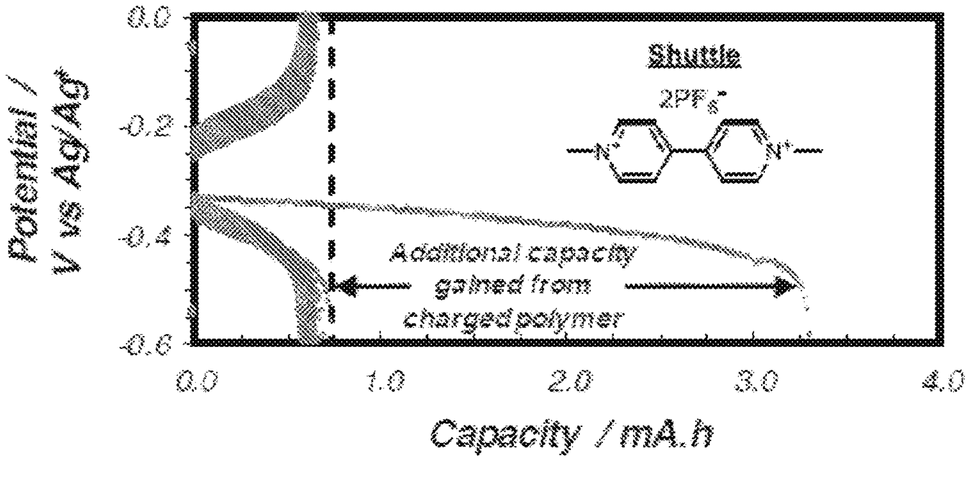
FIG. 16 depicts battery cycling of 2 (theoretical capacity=3.685 mAh) using N, N-dimethylviologen hexafluorophosphate in acetonitrile (5 mM). The dotted line indicated the theoretical capacity of the shuttle in solution. The battery was cycled at 5 C with respect to the shuttle. Supporting electrolyte: 0.3 M $KPF_6$ acetonitrile solution.

Following the first cycle, the shuttle solution cycled at its theoretical capacity (FIG. 16). This suggests that the shuttle could charge the polymer but was unable to discharge the polymer. Without wishing to be bound by any theory, this effect was assumed to be due N, N'-dimethylviologen hexafluorophosphate having a more negative redox potential than 2. Furthermore, no observed charging was observed at the redox potential 2, which suggests the polymer is insoluble in acetonitrile in all redox states.

Figure 20:
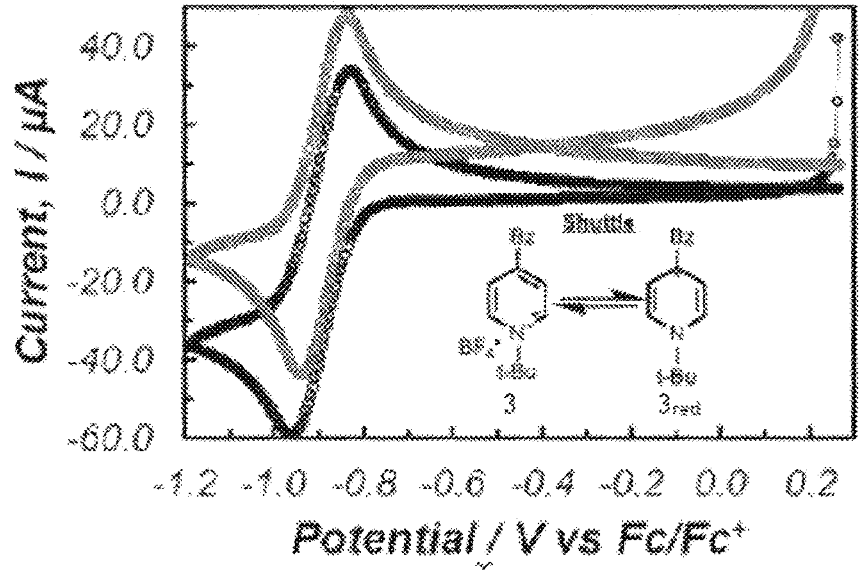
FIG. 20 depicts cyclic voltammetry of 10 M solution in acetonitrile of 3 before (red) and after (black) addition of 2. Scan rate: 100 mV/s. Supporting electrolyte:0.3 M $KPF_6$.

The charging behavior of 2 was also studied by using CV. CV of the charged shuttle, $3_{red}$ ($E_{1/2}$=−1.10 V vs. $Fc/Fc^+$), exhibited a positive current at −0.5 V, which shows $3_{red}$ is present in solution. After addition of 2, a CV showed a zero current at −0.5V, which suggests that $3_{red}$ no longer present in the solution (FIG. 20). These results show that $3_{red}$ charges 2. This can be assumed because $3_{red}$ has a more negative redox potential than 2.

Figures 21A, 21B:
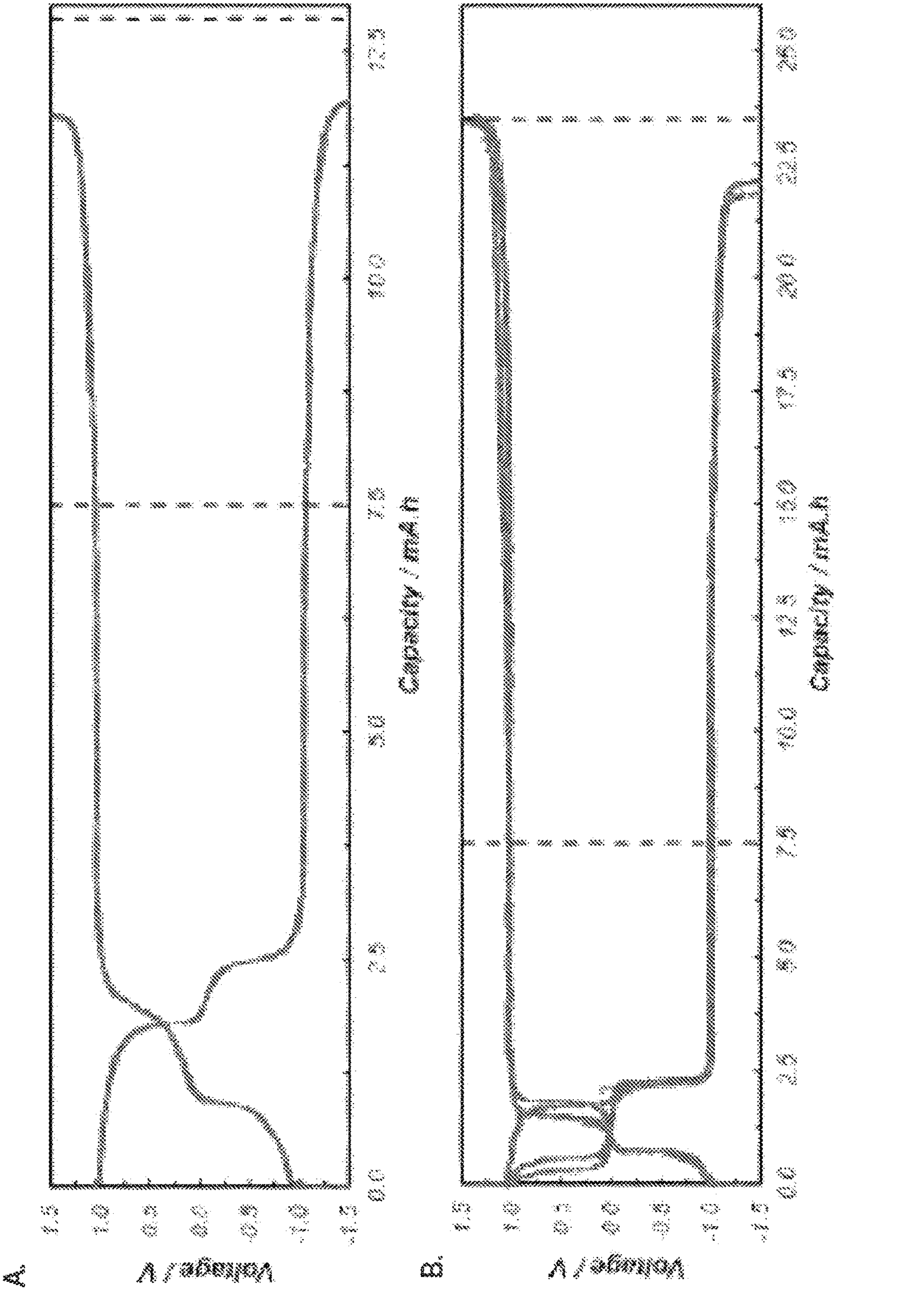
FIGS. 21A-21B depict RRFB cycling with 10 mM of 4, 10 mM of Fc, and (FIG. 21A) 5.685 mA h of 2 or (FIG. 21B) 15.958 mA h of 2. Batteries were cycled in 0.3 M $KPF_6$ in acetonitrile at 3 mA. The first dotted line is the theoretical capacity of the shuttle solution. The second dotted line is the overall capacity of RRFB.

As discussed above, initially, 3 and then Fc (5) were identified as suitable charge and discharge shuttles, respectively. A RRFB was set up using 10 mM solution of both shuttles (theoretical capacity=7.5 mA·h) and 2 (theoretical capacity=5.36 mA·h). Cycling at 3 mA shows capacities greater than the theoretical capacity of the shuttle solution was achieved (FIG. 21A). 90% SOC of the total capacity of the RRFB was also observed. The battery also exhibited high coulombic efficiency (>95%) and negligible overpotential. Given that a low capacity of 2 was used, this RRFB does not achieve the cost-competitive metrics of other EES technology. To achieve higher metrics, the amount of 2 was increased in the RRFB setup to a theoretical capacity of ~16 mA·h. The upscaled battery was cycled under the same previous conditions. As with the first RRFB, an increased capacity three times the theoretical capacity of the shuttle was observed (FIG. 21B). A 10 mM concentration of both charge and discharge shuttles, a capacity equivalent to a ~70 mM flow battery, was achieved. These results highlight the potential for the RRFB shuttle system to propel RFB technology to a marketable state.

Figure 22:
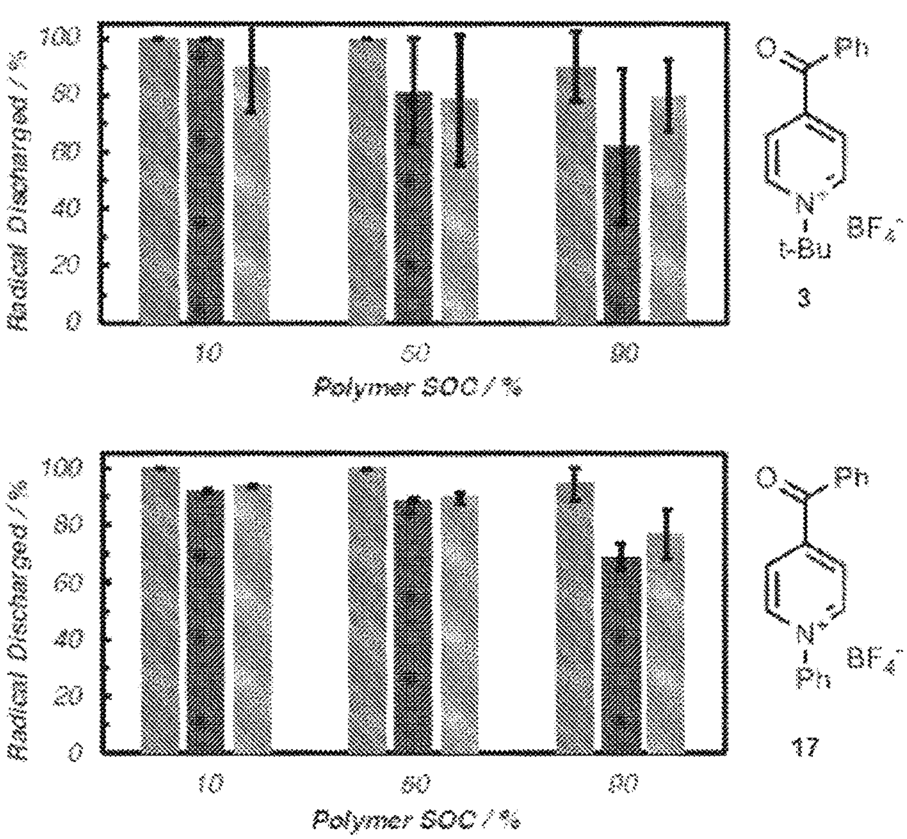
FIG. 22 depicts an effect of shuttle and polymer SOC on charging the polymer. 10% (red), 50% (blue), and 90% (grey) SOC solutions of charge shuttle 3 top) and 17 (bottom) were used. The ratio of polymer to the shuttle was 6:1. Error bars are shown in black.

The redox potential of the shuttles can be tuned to arrive closer to the redox potential of 2. The effect of SOC of both the polymer and shuttle on charging the polymer has been investigated. Samples of 2 were charged to 10, 50, and 90 percent SOC. Solutions of 10, 50, and 90% SOC of $3_{red}$ were used to charge the different SOC samples of 2. CV was used to quantify the extent to which the samples of 2 were charged (FIG. 22).

Using 3 as a charge shuttle, which has a redox potential of 376 mV more negative than 2, the SOC of the polymer did not affect charging when shuttle SOC was also low. As the SOC of 3 increased to 50%, diminished charging was observed as the SOC of 3 increased. However, there was no significant difference between 50% SOC and 90% SOC of 2. Using the more positive charge shuttle 17 ($E_{1/2}$=−0.94 V vs. $Fc/Fc^+$), which is 213 mV more negative than 2, the same trends were observed when using 3 as a charge shuttle.

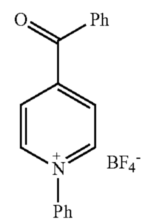

(17)

Figure 23:
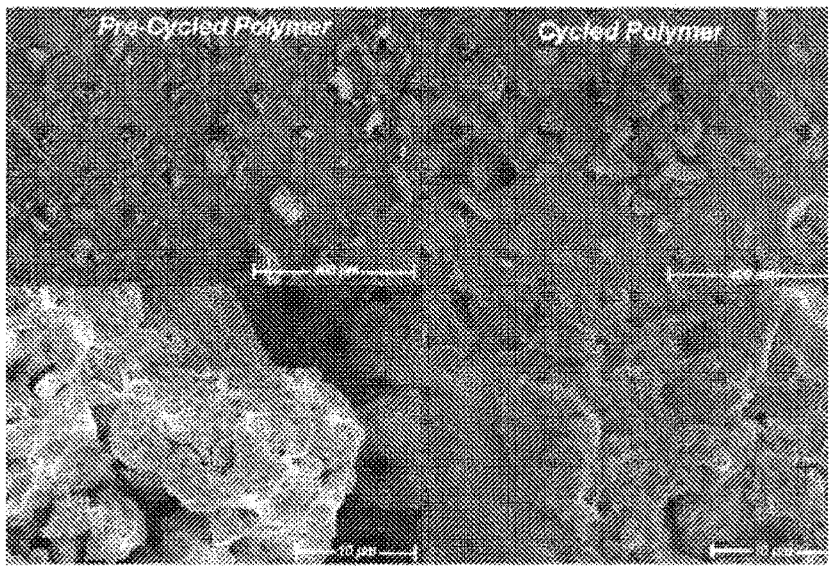
FIG. 23 depicts SEM images of 2 before (left) and after cycling (right).

Given the ~160 mV difference between 3 and 17, these results suggest that tuning of shuttles is possible. The physical properties of 2 were also studied using scanning electron microscopy (SEM). SEM images of 2 before and after battery cycling were taken to look for any physical deformations that occurred during cycling experiments (FIG. 23). No significant changes, like swelling or aggregation, after cycling, were observed, which indicates that 2 is stable under the current battery cycling conditions. Also, 2 looks to be composed of high surface area particles. High surface area allows for better surface contact with solvated shuttle species. This causes there to be more electron transfer events, increasing the specific capacity of the material. It has also been shown that 2 can be recycled and further used in multiple batteries. This shows the potential for the easy transport of energy with the RRFB design.

Figure 17:
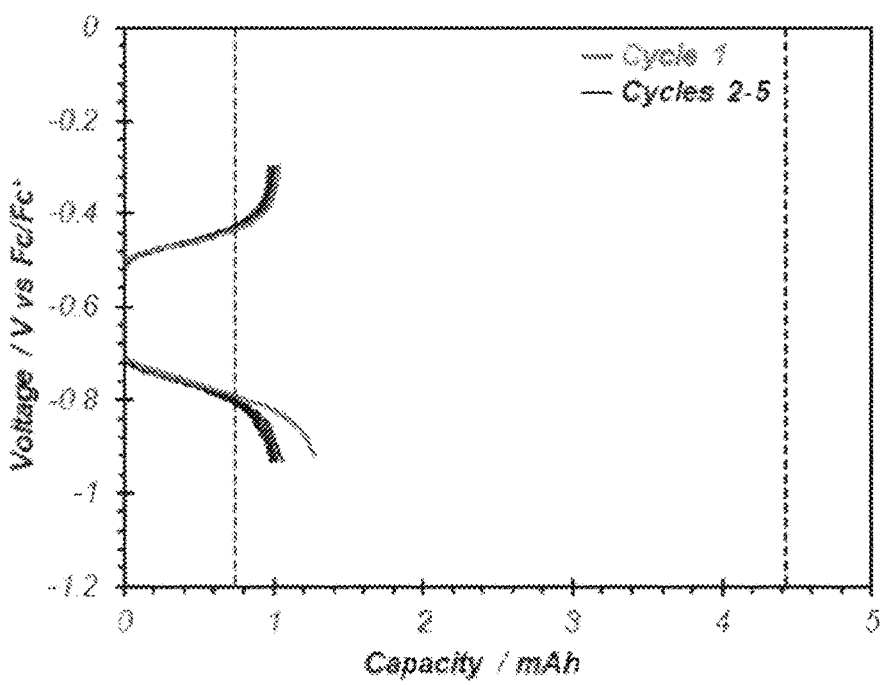
FIG. 17 Charge-discharge curves using 12 (5 mM) as a shuttle and particulates of 2 (0.1375 mmol). Battery was cycled at 9 mA in a 0.3M $KPF_6$ acetonitrile solution. Dashed lines indicate theoretical capacities of shuttles and overall battery, respectively.
Figure 18:
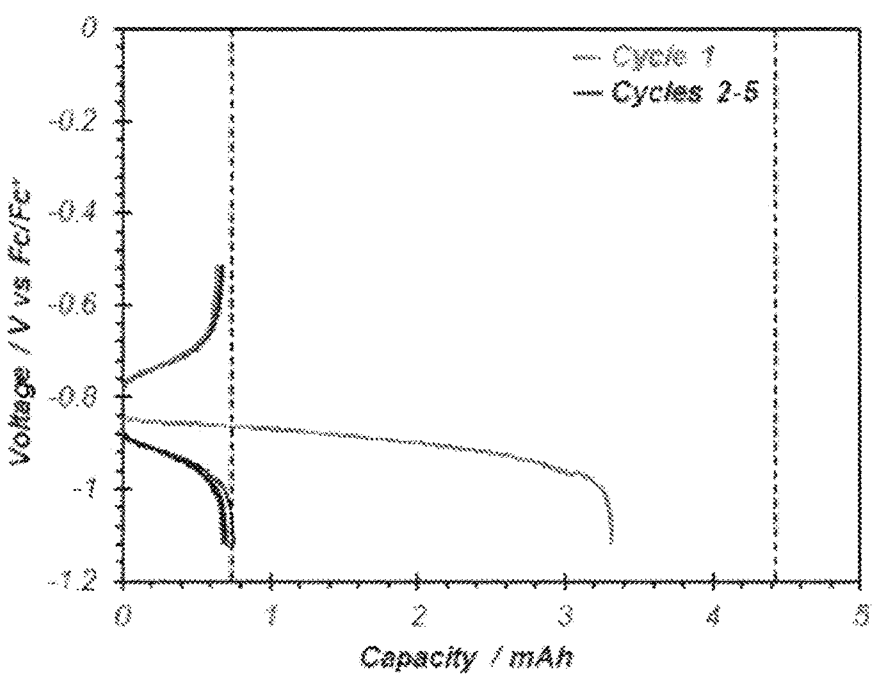
FIG. 18 Charge-discharge curves of RRFB cycling of RAP 2 (0.1375 mmol) using 4 (5 mM) as the only shuttle. The cell was cycled at 9 mA in a 0.3 M KPF6 acetonitrile solution. Dashed lines indicate theoretical capacities of shuttles and overall battery, respectively.

FIG. 17 shows charge-discharge curves using 12 (5 mM) as a shuttle and particulates of 2 (0.1375 mmol). In this experiment, the battery was cycled at 9 mA in a 0.3M KPF6 acetonitrile solution. It was found that shuttle 12 can discharge 2 but fails to efficiently charge 2. Without wishing to be bound by any theory, this was attributed to the fact that this shuttle has a more positive redox potential than the RAP. FIG. 18 shows charge-discharge curves of RRFB cycling of RAP 2 (0.1375 mmol) using 4 (5 mM) as the only shuttle. In this experiment, the cell was cycled at 9 mA in a 0.3 M KPF6 acetonitrile solution. It was found that shuttle 4 can charge 2 but fails to discharge 2. Without wishing to be bound by any theory, this was attributed to the fact that this shuttle has a more negative redox potential than the RAP.

Figure 7:
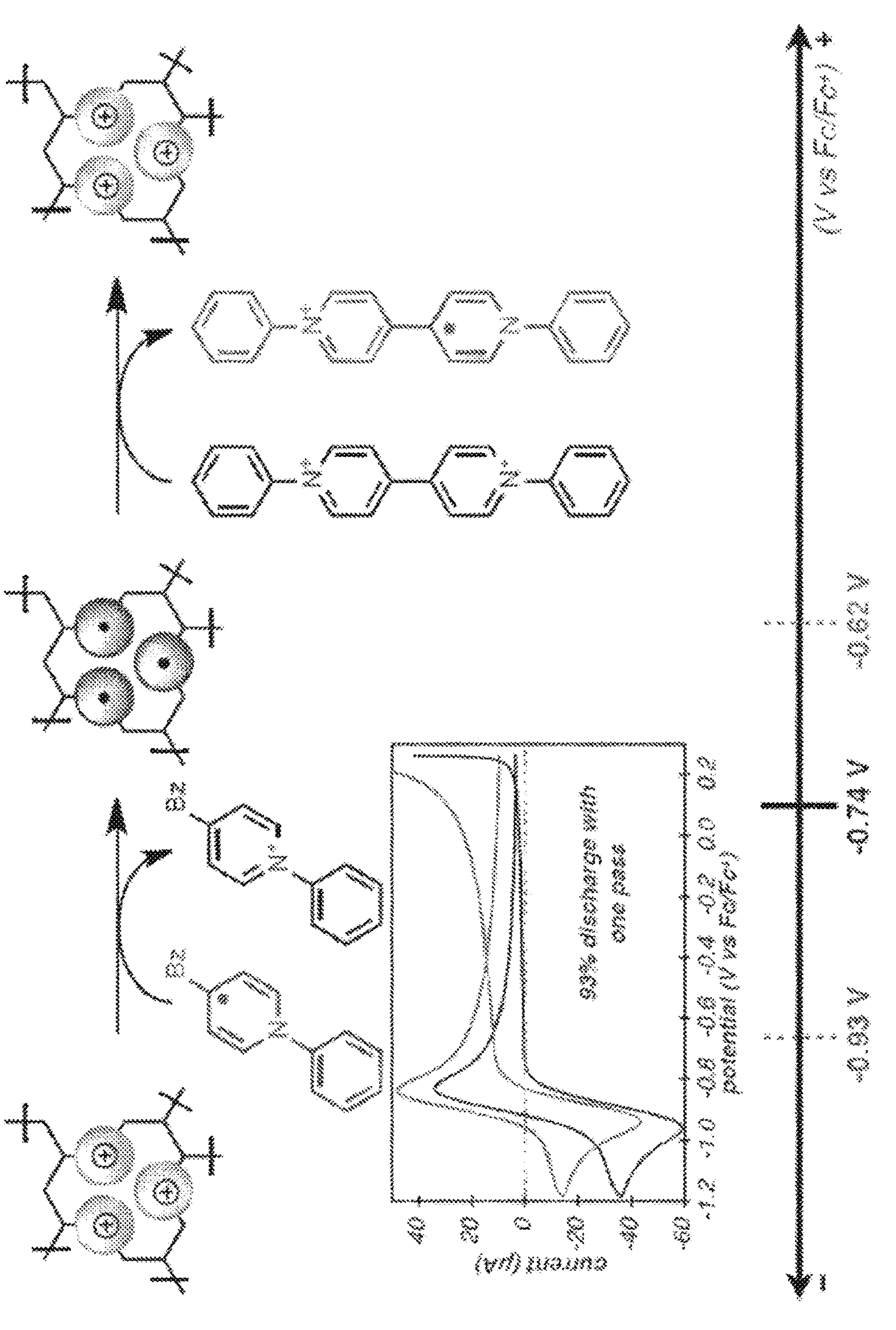
FIG. 7 depicts a schematic of the charge-discharge cycle of ROS in one aspect.

Some additional exemplary CVs for possible shuttles/redox-active solids are shown in FIG. 7.

Figure 14:
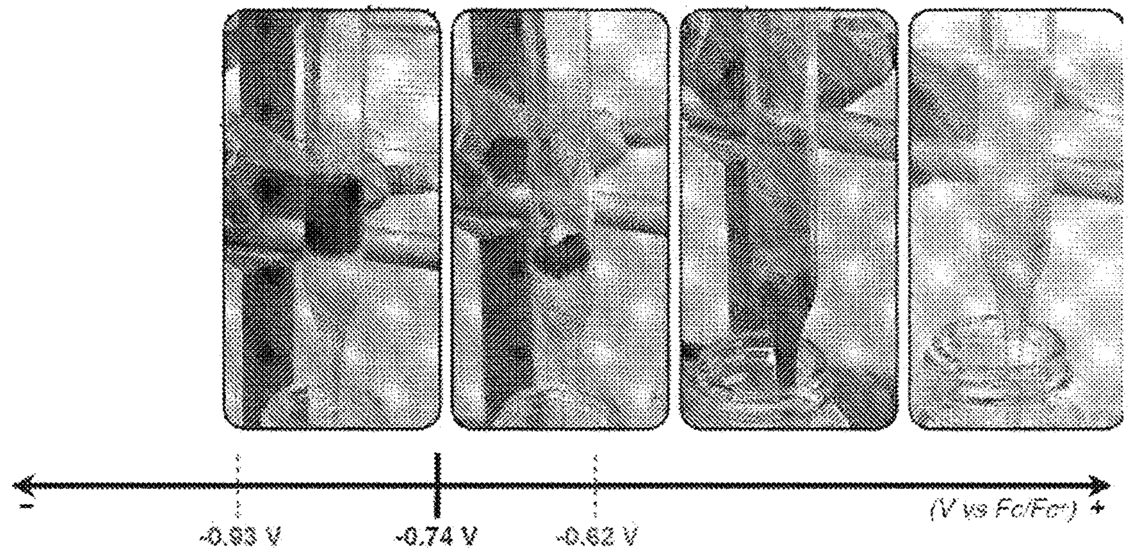
FIG. 14 depicts photographs of the materials used in FIG. 7.
Figure 15:
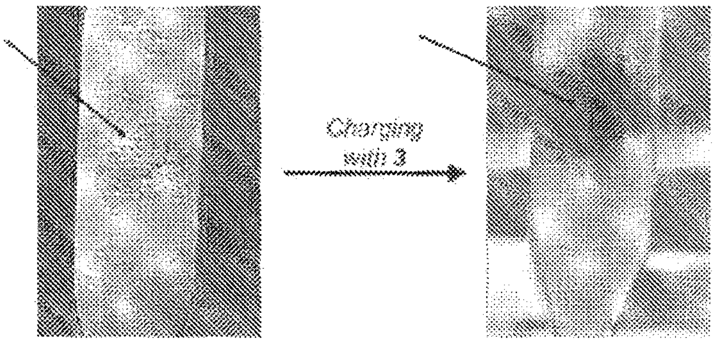
FIG. 15 depicts photographs of charging of 2 after flow-through of a solution of 3. Arrow to the colored portion of 2 prior to flowthrough of 3 indicates 2 is uncharged. Dark color of 2 after flow-through of 3 visually indicates charging of 2.

Visual changes that occur due to charge/discharge processes can be observed in FIGS. 14 and 15. FIG. 14 further depicts photographs of the materials used in FIG. 7. While FIG. 15 depicts photographs of charging of 2 after flow-through of a solution of 3. Arrow to the colored portion of 2 prior to flowthrough of 3 indicates 2 is uncharged. Dark color of 2 after flow-through of 3 visually indicates charging of 2.

Example 5

It was found that the solution-based spectroscopies or electroanalytical techniques commonly used to monitor redox events of RFBs or SSBs are unsuitable for these studies because the RAP has no detectable solubility and never interacts directly with a current collector. Scanning electrochemical microscopy (SECM) is one way to indirectly study redox-active materials and has been applied to charging studies of immobilized colloids. However, this technique's limited throughput and accessibility make it impractical for the general community to rapidly evaluate libraries of solid-shuttle combinations. Consequently, an accessible technique that mimics SECM was developed to indirectly measure redox changes of a RAP by monitoring the redox-state of a homogeneous reporter molecule with CV.

Figures 8A, 8B, 8C:
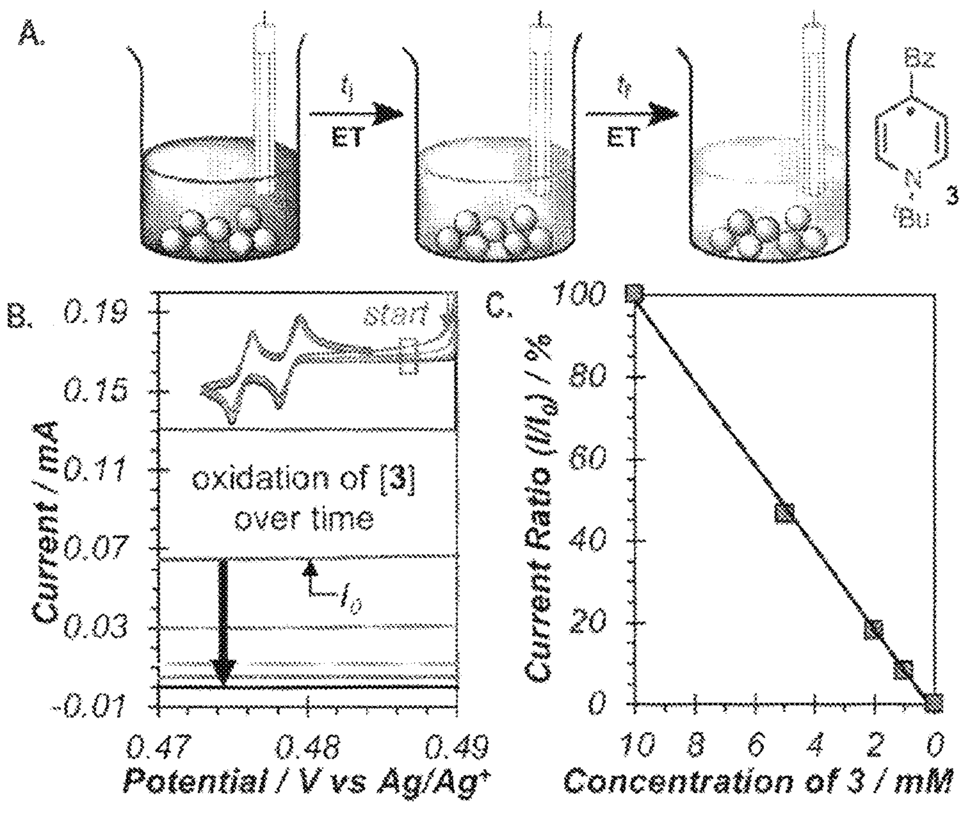
FIGS. 8A-8C show: method to monitor RAP SOC utilizing a homogenous shuttle species and solution-state CV (FIG. 8A); CVs of 10 mM solutions of containing varying mole fractions of 3 and $3^+$ ranging from only 3 (purple) to only $3^+$ (black) (FIG. 8B); calibration curve established to monitor the concentration of 3 by CV as calculated by the ratio of the measured current response (I) at 0.48 V to the current response of the initial 10 mM solution ($I_0$) (FIG. 8C).

Additional experiments using compound 2 with a shuttle 3 were conducted to evaluate this technique. As illustrated in FIG. 8A, the RAP (2) was added to solutions of pre-charged shuttles (reporters), and the capacity and rate of shuttle discharge were monitored by CV. A highly-reducing and persistent benzoylpyridine radical 3 was selected as a reporter molecule that could quantitatively charge (reduce) any accessible viologen sites upon mixing.

Without wishing to be bound by any theory, any discharge of the reporter molecule, in this case, could be attributed to the charging of the RAP. CVs were first performed on known concentrations of the pyridine radical 3. The amplitudes of the baseline currents were monitored at the start of CVs scanned from 0 V, where radical 3 undergoes diffusion-limiting oxidation (FIG. 8B).

With the addition of RAP, radical 3 is oxidized by the polymer to $3^+$. This change in the redox state of the reporter from 3 to $3^+$ decreases the concentration of oxidizable 3 in solution, which in turn proportionally decreases the baseline currents measured at high potentials. A calibration curve of these baseline amplitudes was created from CV measurements on solutions containing various ratios of 3 and $3^+$ that combine to 10 mM (FIG. 8C). This calibration curve was further validated using UV-vis measurements by monitoring the absorbance of 3 at 510 nm. Variation to the concentration of the shuttle in either redox state mimics varying states of shuttle oxidation by the RAP. For example, a solution that does not charge the RAP is represented by 10 mM 3 and no $3^+$, a 50% discharge of the solution is represented by 5 mM 3 and 5 mM $3^+$, and a 90% discharge of the solution is represented by 1 mM 3 and 9 mM $3^+$. These studies reveal a linear correlation between the relative ratio of 3 and $3^+$ in solution.

Figure 9:
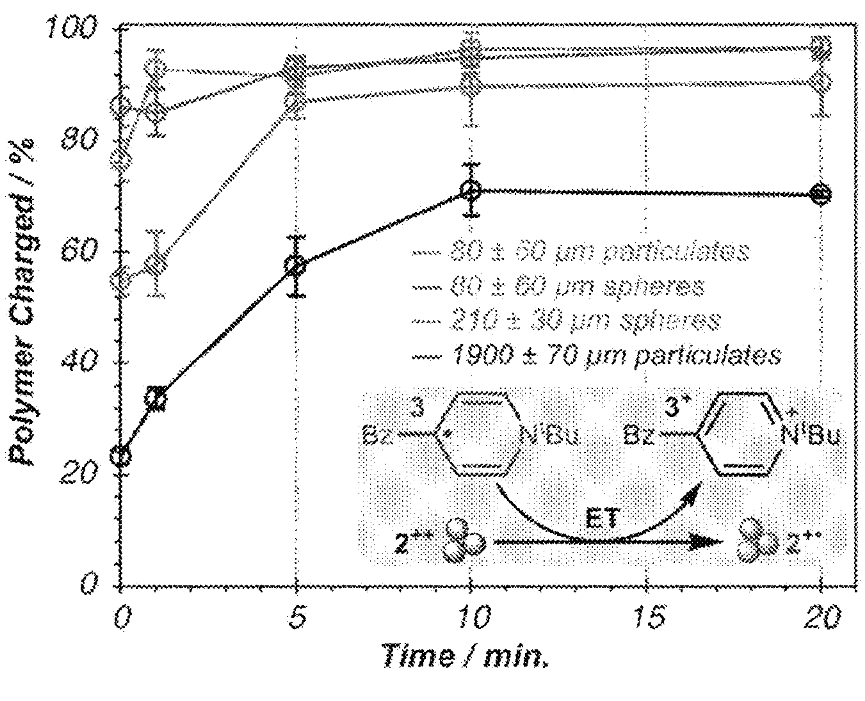
FIG. 9 depicts a charging performance of different viologen RAPs of various shapes and sizes with 10 mM of pyridine radical 3.

Results from charging studies with radical 3 as a reporter are summarized in FIG. 9 (black trace). Upon adding RAP to a solution of 3, the dark purple solution indicative of radical 3 has lightened over the course of 10 minutes. Analysis immediately after addition has indicated that the RAP was charged to 25% SOC, which increased to 70% after 10 minutes. Without wishing to be bound by any theory, it was hypothesized that the slow and incomplete charging was due to inaccessible redox centers at the core of the RAP.

The isolated particulates measuring nearly 2 mm in width were ground into smaller fragments with average sizes of just 80 μm. Addition of the powdered material to the reporter solution resulted in a near-instantaneous bleaching of the solution. CV analysis revealed a 76% SOC was achieved immediately upon addition of the RAP, and a final SOC of 96% was reached within 5 minutes (blue trace).

Example 6

In this example, factors affecting charging were explored. A better understanding of the charging mechanism can allow for parameters like C-rate and flow rate to be optimized. First, exploration of particle size can be done to see if the shuttles can penetrate through the surface of the particle to charge the inner core. If only surface charging occurs, there can be a significant effect on charging caused by the size of the particles. This can also provide insight into the porosity of the material. The stability of the material under a variety of conditions can also be investigated.

While the small particulates appeared to be attractive forms of the RAP for RTFB applications because of their high charge rates and accessible SOCs, every attempted flow study with the materials resulted in high backpressures and clogging of the system. Again, without wishing to be bound by any theory, it was hypothesized that clogging likely stems from the tight packing of the jagged particulates. In an effort to improve flow while maintaining the charging performance of small-particulate RAPs, the spherical analogs of the RAP that would preserve flow-through channels even when tightly packed were targeted. Emulsion polymerization in the combination of benzene and water with dioctyl sodium sulfosuccinate (AOT) as a surfactant reliably afforded spherical RAPs with a narrow size distribution that was determined by scanning electron microscopy (SEM, FIG. 10C). Minor variations to solvent, counter solvent, and surfactant provided spherical RAPs in a range of sizes.

Figures 10A, 10B, 10C, 10D, 10E, 10F:
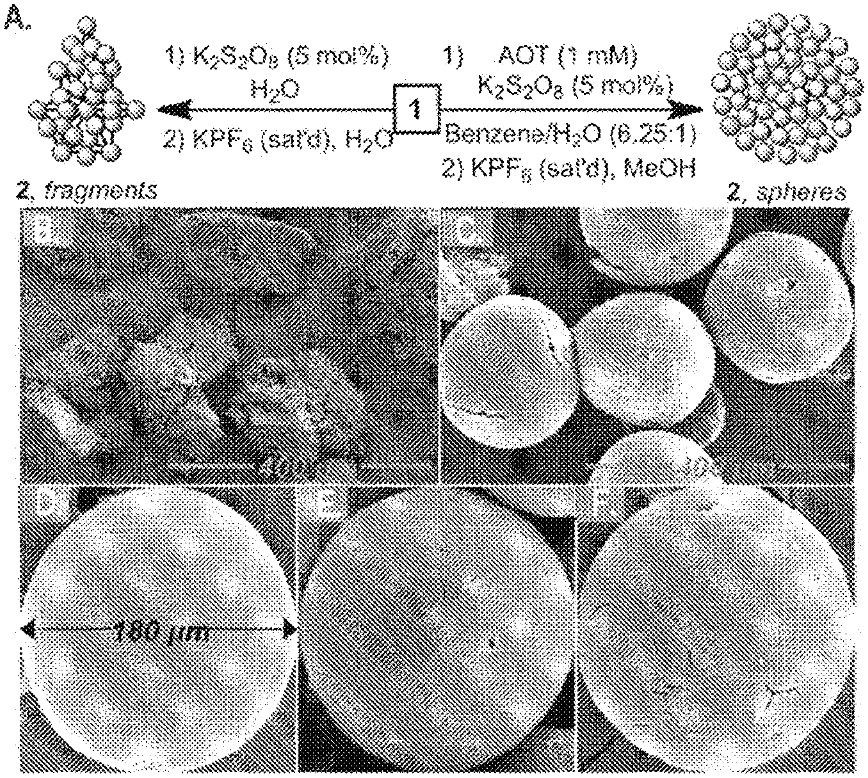
FIGS. 10A-10F show: polymerization conditions to control polymer shape in one aspect (FIG. 10A); an SEM image of polymer fragments (FIG. 10B); an SEM image of polymer spheres (FIG. 10C). SEM images of RAP 2: initial material (FIG. 10D); RAP 2 charged (FIG. 10E) and discharged (FIG. 10F).

The charging performance of spheres with an average diameter of 210 μm was evaluated using the reporter shuttles as described above. High SOCs (90%) were reached within just 5 minutes (FIG. 9, red trace), and—in contrast to the particulates—filtration of the charging solution through a bed of the spherical RAPs was easily accomplished. Finally, SEM studies of the spherical RAPs at both charged and discharged state revealed no change to the average diameter of the spheres (FIGS. 10D-10F). This morphological stability was found to be needed because viologen cores are known to undergo π-stacking and to a contraction in the reduced state, which can inhibit mass transport through the material or fragment the spheres altogether. Without wishing to be bound by any theory, the disclosed robust properties were found to likely be due to the high crosslinking density of the polymer and yield materials with an ideal combination of rapid charge rate, high depth of charge, and unimpeded flow.

Example 7

The disclosed above physical properties allowed cycling to be performed in flow as a symmetric RTFB, which was not possible with the initial RAPs. With the preliminary aim of evaluating accessible depths of charge and discharge, rather than optimizing voltaic efficiency, the spherical RAP 2 was loaded into a cartridge and charged/discharged by flowing a solution containing solvated dimethyl viologen ($Vy^{++}$, 4) and ferrocene (Fc, 5). The actual structures are disclosed above and also shown in FIG. 12.

Figure 11:
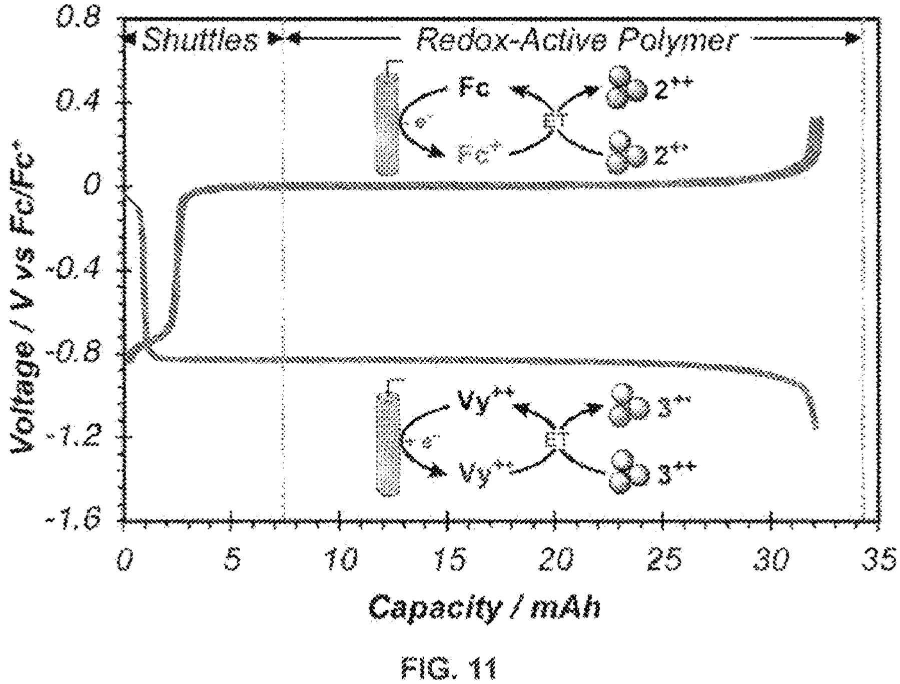
FIG. 11 depicts a charge-discharge profile using compound 5 (10 mM) as a discharge shuttle, 4 (15 mM) as a charge shuttle, and spheres of RAP 2 (1 mmol) at 3 Ma. Dashed lines mark theoretical capacities.

Electrochemically-generated $Vy^{+\cdot}$ would reduce the RAP to $2^{+\cdot}$ during the charging phase, and electrochemically-generated $Fc^+$ would oxidize $2^{+\cdot}$ back to the discharged state. The opposite half-cell reactions occur in the counter-chamber. Summarized in FIG. 11, symmetric cycling of a 25 mM solution of only the ROM shuttles—like in a conventional RFB—has a theoretical capacity of 7.4 mAh. In contrast, cycling of the same 25 mM solution but over 0.68 g of the spherical RAP 2 has provided a 4-fold increase to storage capacity. The measured capacity of 32.1 mAh corresponded to a 92% utilization of the polymer. Achieving such storage capacities with just 11 mL of electrolyte in a conventional RFB would require a ROM concentration of over 100 mM. However, such concentrations exceed the solubility of ferrocene in MeCN with supporting electrolyte and would necessitate synthetic modifications to form a more soluble analog. In addition to the high storage capacity, the RTFB was found to exhibit a non-Nemstian voltaic profile that results from a constant concentration of chargeable shuttle. Charging overpotentials in conventional RFBs increase as a solvated ROM is charged to greater SOCs, but the RAP continuously discharges the shuttle to maintain a steady-state shuttle concentration in an RTFB and maintain a constant voltaic output.

Example 8

Shuttle Selection

This example focused on identifying shuttles that could charge (reduce) and discharge (oxidize) the solid RAP to high states of charge (>80%) without significant voltaic losses. From a thermodynamic perspective, a shuttle with a standard potential that is just 60 mV lower than that of the RAP should be reducing enough to charge the RAP to over 90% SOC. Conversely, oxidation to discharge the RAP requires a shuttle that has an $E_{1/2}$ that is just 60 mV more positive than that of the RAP. Identification of compatible shuttles with standard potentials that fall within the narrow range of ±60 mV of the storage solid is generally challenging, but the strategy of building RAPs from ROMs provides a natural starting point for shuttle selection.

Figures 12A, 12B, 12C:
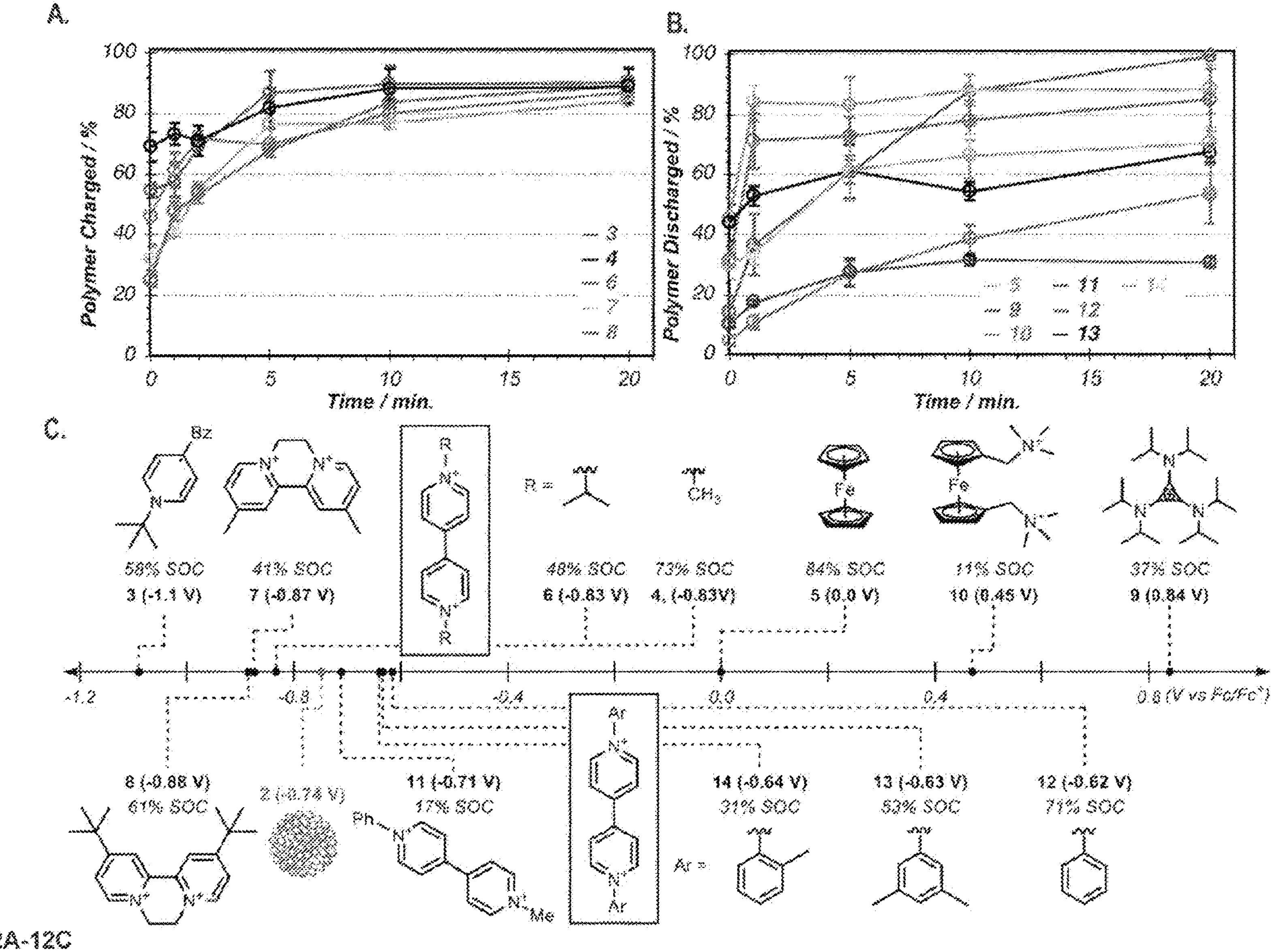
FIGS. 12A-12C depict optimization of various redox-active shuttle species.

The viologen derivatives were targeted as shuttles that fall within the targeted voltaic range for the RAP (FIG. 12). Shuttle analogs with varying steric and electronic properties were isolated in the reduced form and added to known quantities of RAP. The rate and degree of ET to charge the RAP was monitored by CV according to the established protocol in FIG. 8. Shuttles 3, 4, and 6-8 (FIG. 12) all charged the RAP to roughly 90% SOC after 20 minutes, regardless of their standard potential. However, the time-dependent studies revealed significant differences in the rates of charging that are more dependent on the structural features of the shuttle than on the $E_{1/2}$. For example, a SOC of 73% was reached 1 minute after adding the weakly-reducing dimethylviologen 4 ($\Delta E_{1/2}$=90 mV), while a SOC of only 58% was measured with the highly-reducing, but sterically-hindered, pyridine radical 3 ($\Delta E_{1/2}$=370 mV). A similar steric effect on the rate of charging was observed from studies with the diisopropyl analog of viologen (6), which only charges the RAP to 48% SOC after 1 minute (FIG. 12A, red trace-). Identifying shuttles with high rates of ET with the RAP is critical for regenerating the shuttle solution and limiting voltaic losses during RTFB operation. For example, shuttle solutions that undergo quantitative electron transfer immediately upon contacting the RAP exist almost entirely in their discharged states. With no concentration buildup of the charged shuttle, electrolysis of the solution is maintained at a low overpotential.

The structural properties of the shuttle have an even greater impact on the rate with which the RAP is discharged than with which it is charged (FIG. 12B). The electronic properties of the discharge shuttle have almost no influence on the rate or depth of discharge, as long as the shuttle has a higher $E_{1/2}$ than the RAP. Highly-oxidizing ($E_{1/2\ shuttle}$>>>$E_{1/2\ RAP}$) but sterically-bulky shuttles discharged the RAP more slowly and to lower SOCs than weakly-oxidizing shuttles that are less sterically hindered. The strong oxidants based on cyclopropenium 9 (+0.84 V) required 20 minutes to achieve high SOCs (purple trace), while the tricationic ferrocenyl derivative 10 (+0.45 V) failed to oxidize the RAP beyond 54% in 20 minutes (light blue trace). In addition to the steric bulk of these highly-oxidizing shuttles, the electronic repulsion between the dication 9 or trication 10 and the cationic polymer likely reduces the rate of discharge even further. These findings reveal that highly oxidizing or reducing shuttles—which lead to voltaic inefficiencies—are not necessary for reaching high SOCs and that the focus of shuttle design should be on the molecular structure.

Figure 19:
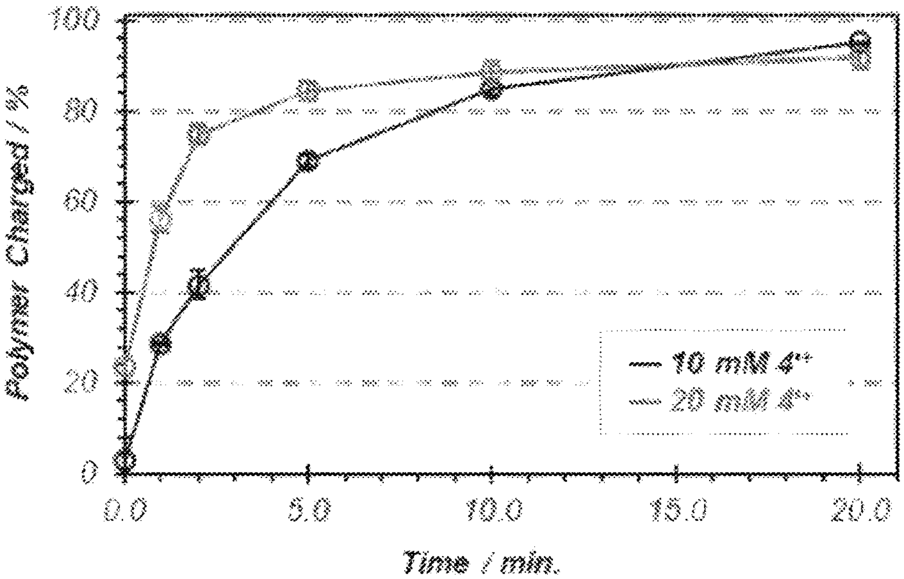
FIG. 19: Charging analysis of RAP 2 utilizing 1 equiv of a 10 mM solution of 4·+ (black) or a 1 equiv of a 20 mM solution of 4·+ (red). Analysis indicates that a more concentrated solution of shuttle charges the RAP at a faster rate, even though the mmol of shuttle used in each case was the same.

These insights guided the design of viologen discharge shuttles with narrow structural profiles that are weakly oxidizing relative to the RAP. The electron-donating N-alkyl groups of viologen were replaced with electron-withdrawing N-aryl groups to shift the $E_{1/2}$ of the shuttle to higher potentials. Replacement of just one methyl group with a phenyl group resulted in a cathodic shift of 96 mV. However, the oxidation potential of the resulting methyl phenyl viologen 11 was too low relative to the RAP ($\Delta E_{1/2}$=25 mV), and the shuttle failed to discharge the RAP beyond 40% SOC (dark blue trace). A series of diaryl viologens were prepared with substituents on the aryl groups that could further increase the oxidation potential of the discharge shuttle (12, 13, 14). Of these ROMs, discharge of the RAP with the unsubstituted diphenyl viologen 12 occurred with high rates (75% in 1 minute) and provided a final SOC that matched that of studies with ferrocenium (>85%) (red trace). Finally, these studies at just 10 mM shuttle concentration serve to benchmark and compare the performance of shuttles on charge and discharge. RTFBs are expected to operate at higher concentrations of the shuttle, where ET with the solid occurs with even greater rates (FIG. 19).

Example 9

RTFB Testing

Figures 13A, 13B, 13C:
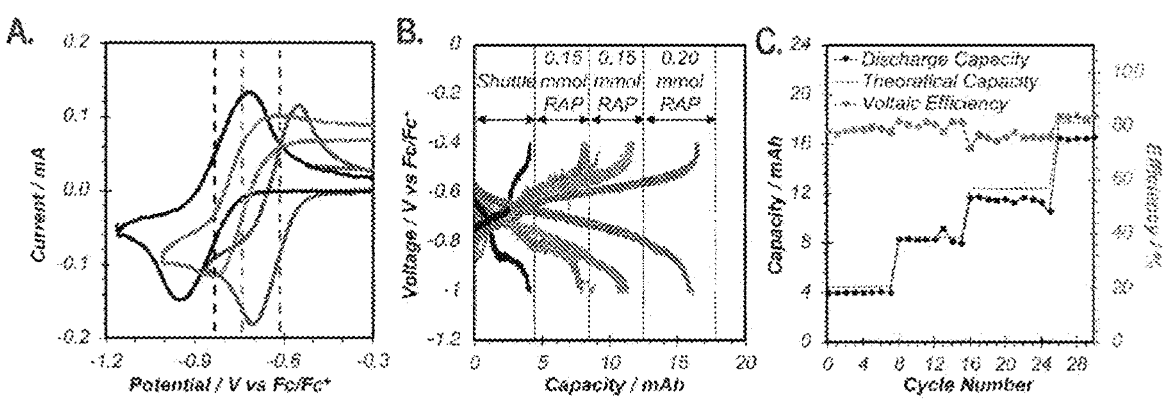
FIGS. 13A-13C show a voltammogram of 1 $e^-$ reduction of shuttles 12 (blue) and 4 (black) overlaid with RAP 2 (red) (FIG. 13A); charge-discharge curves of RTFB with shuttles 12 (10 mM) and 4 (10 mM) only (black). RAP 2 was added in three separate additions to the cell (0.15 mmol [red], 0.15 mmol [blue], and 0.2 mmol [purple]). Dashed lines indicate theoretical capacities as indicated (FIG. 13B); and charge, discharge, and efficiencies with respect to each cycle in battery (FIG. 13C).

The dimethyl- and diphenyl-viologens 4 and 12 were selected as respective charge and discharge shuttles for a symmetric RTFB (FIG. 13A). The shuttles were first cycled in the absence of RAP to establish a baseline voltaic profile and to measure the accessible SOC of the solution alone. A storage capacity of 4.0 mAh was measured with a 20 mM concentration of shuttles, which corresponds to 90% SOC of the solution. This capacity was compared to capacities that could be reached during cycling of the same solution but with various loadings of RAP 2. Polymer was added to double, triple, and quadruple the theoretical capacities of the symmetric cell. Summarized in FIG. 13B, RAP was added after cycle 8 of the solution to double the theoretical capacity of the cell. Now cycling as an RTFB instead of a homogeneous RFB, a discharge capacity of 8.2 mAh was achieved, which corresponds to a >98% utilization of the storage solid. Progressively higher capacities were easily achieved by adding additional solid to the RTFB. The theoretical capacity was ultimately quadrupled and still allowed over 90% polymer utilization. Furthermore, high voltaic efficiencies (~80%) were consistent upon each sequential addition of storage solid (FIG. 13C). While higher capacity RTFBs could be easily assembled using this strategy, crossover through the simple separator became a concern during the long cycle times (>12 h) of these high-capacity cells.

In addition to easily-improved energy densities, the voltaic profiles of the hybrid systems were far more constant compared to those observed from charging the shuttles alone and had similar voltaic efficiencies. Charging of the shuttles alone reveals unsymmetrical plateaus that are consistent with a thermodynamically-unfavorable reduction of dimethylviologen 4 ($E_{1/2}$=−0.82 V) before all of ROM 12 is reduced ($E_{1/2}$=−0.65 V). The kinetic reduction at a more negative potential is often observed in homogeneous systems containing compounds with multiple redox events. The reduced form of 4 undergoes homogeneous comproportionation with uncharged ROM 12 remaining in solution, which results in voltaic losses. While RTFBs operate by similar mechanisms of electron exchange, the RAP continuously discharges the shuttles to maintain low concentrations of charged shuttle and, therefore, low cell overpotentials. This reduction of overpotentials counters the small voltaic losses during charge/discharge of the RTFB and results in equivalent voltaic efficiencies with higher energy density compared to the cycling of the homogeneous solutions alone.

Figure 24:
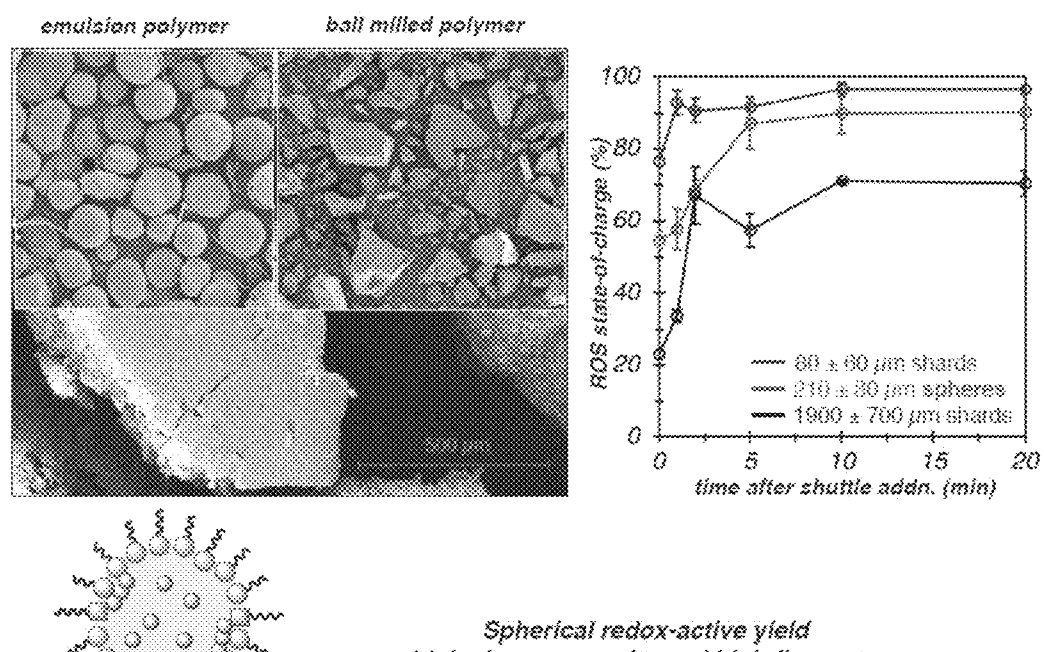
FIG. 24 depicts solid's size and shape of the ROSs vs. function in some aspects.

In summary, the examples shown herein describe a bottom-up approach to designing redox-targeting chemistries based on all-organic materials and shuttles that can be utilized for high-capacity storage systems. Insoluble storage polymers are tailored to have the ideal size and shape to undergo rapid and high capacity cycling using solvated forms of the monomeric redox core as shuttles. This strategy provides a pairing between the redox-targeting shuttles and the polymers. FIG. 24 shows the effect of the size and the shape of ROSs on their electrochemical performance.

Figure 25:
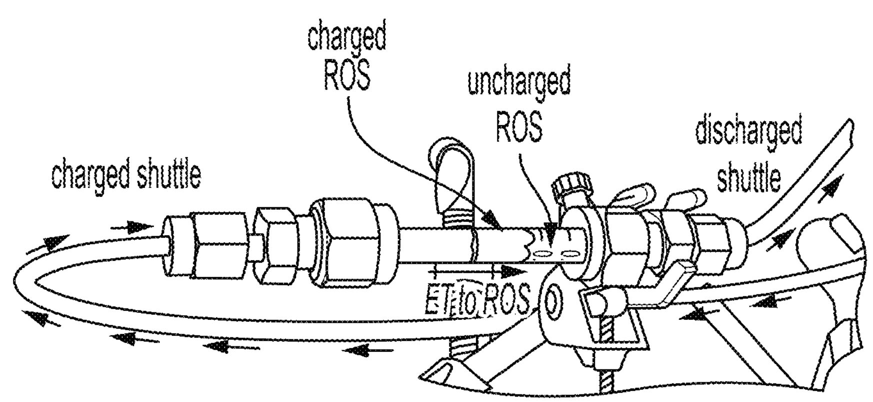
FIG. 25 depicts an exemplary symmetric flow-cell cycling of ROS in one aspect.
Figure 25:
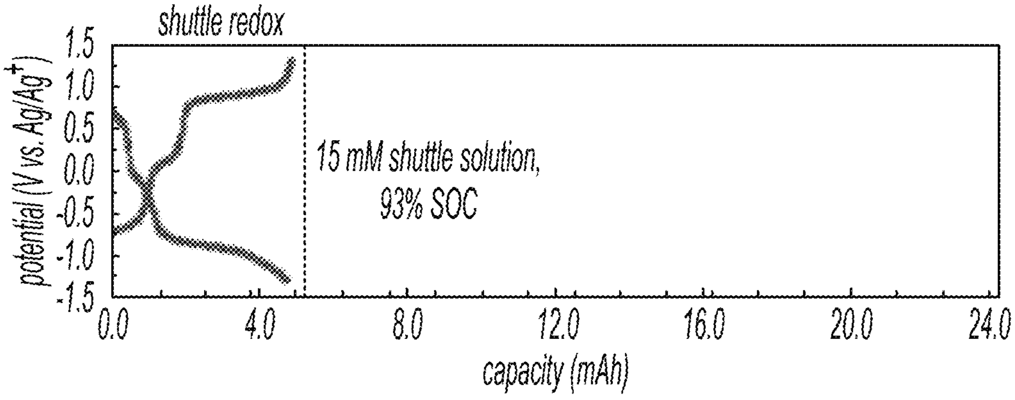
Figure 26:
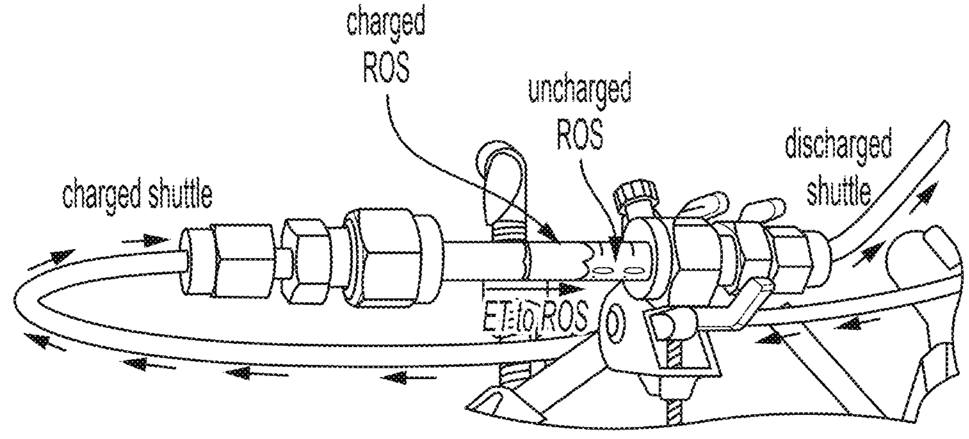
FIG. 26 depicts an exemplary symmetric flow-cell cycling of ROS in one aspect.
Figure 26:
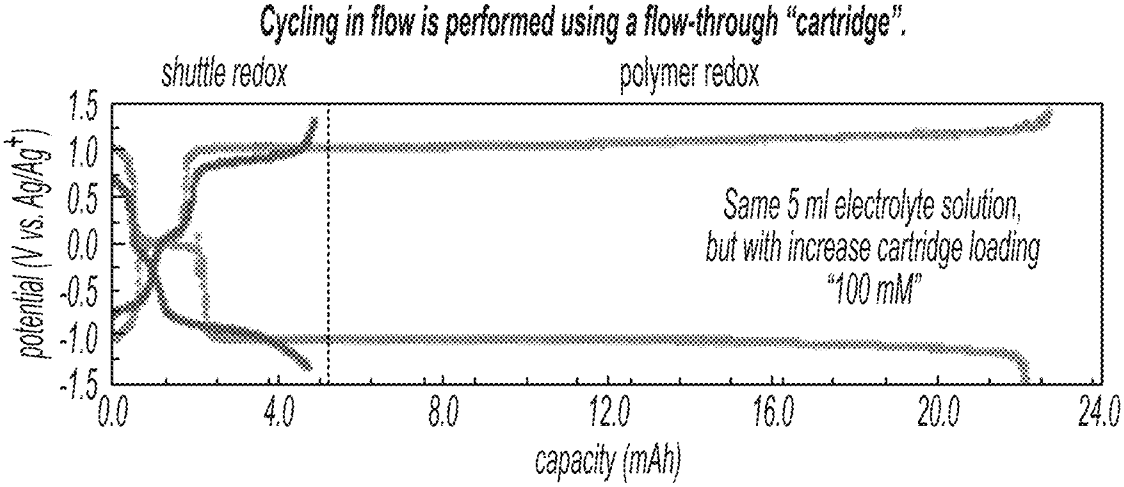

FIGS. 25-26 show exemplary cartridges and systems, as described herein.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods, in addition to those shown and described herein, are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less; however, other combinations of steps, elements, components, and constituents are included, even though not explicitly stated.

Although several aspects of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove and that many modifications and other embodiments are intended to be included within the scope of the appended claims. Moreover, although specific terms are employed herein, as well as in the claims which follow, they are used only in a generic and descriptive sense and not for the purposes of limiting the described invention nor the claims which follow.

Unless defined otherwise, all technical and scientific terms used herein have the same meanings as commonly understood by one of skill in the art to which the disclosed invention belongs. Publications cited herein and the materials for which they are cited are specifically incorporated by reference.

The claims are not intended to include, and should not be interpreted to include, means-plus- or step-plus-function limitations, unless such a limitation is explicitly recited in a given claim using the phrase(s) "means for" or "step for," respectively.

REFERENCES

Energy Information Administration, U. Annual Energy Outlook 2019 with Projections to 2050; 2019

Haegel, N. M.; Margolis, R.; Buonassisi, T.; Feldman, D.; Froitzheim, A.; Garabedian, R.; Green, M.; Glunz, S.; Henning, H.-M.; Holder, B.; et al. Terawatt-Scale Photovoltaics: Trajectories and Challenges. Science (80–·). 2017, 356 (6334), 141-143. https://doi.org/l0.1126/science.aa11288.

Yang, Z.; Liu, J.; Baskaran, S.; Imhoff, C. H.; Holladay, J. D. Enabling Renewable Energy—and the Future Grid—with Advanced Electricity Storage. JOM 2010, 62 (9), 14-23. https://doi.org/10.1007/s11837-010-0129-0.

Yang, Z.; Zhang, J.; Kintner-Meyer, M. C. W.; Lu, X.; Choi, D.; Lemmon, J. P.; Liu, J. Electrochemical Energy Storage for Green Grid. Chem. Rev. 2011, 111 (5), 3577-3613. https://doi.org/10.1021/cr100290v.

Soloveichik, G. L. Flow Batteries: Current Status and Trends. Chem. Rev. 2015, 115 (20), 11533-11558. https://doi.org/10.1021/cr500720t.

Heame, S. J.; lacopi, F.; Faunce, T. A.; Su, D.; Prest, J. On-Grid Batteries for Large-Scale Energy Storage: Challenges and Opportunities for Policy and Technology. MRS Energy Sustain. 2018. https://doi.org/10.1557/mre.2018.11.

Wahlquist, C. South Australia's Tesla Battery on Track to Make Back a Third of Cost in a Year. The Guardian. Sep. 27, 2018.

Gaultois, M. W.; Sparks, T. D.; H Borg, C. K.; Seshadri, R.; Bonificio, W. D.; Clarke, D. R. Data-Driven Review of Thermoelectric Materials: Performance and Resource Considerations. Chem. Mater. 2013, 25, 2911-2920. https://doi.org/10.1021/cm400893e.

Darling, R. M.; Gallagher, K. G.; Kowalski, J. A.; Ha, S.; Brushett, F. R. Pathways to Low-Cost Electrochemical Energy Storage: A Comparison of Aqueous and Nonaqueous Flow Batteries. Energy Environ. Sci. 2014, 7 (11), 3459-3477. https://doi.org/10.1039/c4ee02158d.

Hyun-woo, N. Frequent Fire Raising Concerns over Safety of Solar Energy. The Korea Times. Dec. 18, 2018.

Gü, T. M. Review of Electrical Energy Storage Technologies, Materials and Systems: Challenges and Prospects for Large-Scale Grid Storage. Energy Environ. Sci 2018, 11, 2696. https://doi.org/10.1039/c8ee01419a.

Song, Y.; Zhao, S.; Chen, Y.; Cai, J.; Li, J.; Yang, Q.; Sun, J.; Liu, Z. Enhanced Sulfur Redox and Polysulfide Regulation via Porous VN-Modified Separator for Li—S Batteries. ACS Appl. Mater. Interfaces 2019, 11, 5687-5694. https://doi.org/l0.1021/acsami.8b22014.

Liu, T.; Zhang, Y.; Jiang, Z.; Zeng, X.; Ji, J.; Li, Z.; Gao, X.; Sun, M.; Lin, Z.; Ling, M.; et al. Exploring Competitive Features of Stationary Sodium Ion Batteries for Electrochemical Energy Storage. Energy Environ. Sci. 2019. https://doi.org/l0.1039/C8EE03727B.

Weber, A. Z.; Mench, M. M.; Meyers, J. P.; Ross, P. N.; Gostick, J. T.; Liu, Q. Redox Flow Batteries: A Review. J. Appl. Electrochem. 2011, 41 (10), 1137-1164.
https://doi.org/l0.1007/s10800-011-0348-2.

Ponce de León, C.; Frias-Ferrer, A.; Gonzelez-Garcia, J.; Szanto, D. A.; Walsh, F. C. Redox Flow Cells for Energy Conversion. J. Power Sources 2006, 160 (1), 716-732. https://doi.org/10.1016/j.jpowsour.2006.02.095.

Wei, X.; Pan, W.; Duan, W.; Hollas, A.; Yang, Z.; Li, B.; Nie, Z.; Liu, J.; Reed, D.; Wang, W.; et al. Materials and Systems for Organic Redox Flow Batteries: Status and Challenges. ACS Energy Lett. 2017, 2 (9), 2187-2204. https://doi.org/l0.1021/acsenergylett.7b00650.

Dmello, R.; Milshtein, J. D.; Brushett, F. R.; Smith, K. C. Cost-Driven Materials Selection Criteria for Redox Flow Battery Electrolytes. J. Power Sources 2016, 330, 261-272. https://doi.org/10.1016/j.jpowsour.2016.08.129.

Zhang, J.; Corman, R. E.; Schuh, J. K.; Ewoldt, R. H.; Shkrob, I. A.; Zhang, L. Solution Properties and Practical Limits of Concentrated Electrolytes for Nonaqueous Redox Flow Batteries. J. Phys. Chem. C 2018, 122 (15), 8159-8172. https://doi.org/10.1021/acs.jpcc.8b02009.

Winsberg, J.; Hagemann, T.; Janoschka, T.; Hager, M. D.; Schubert, U. S. Redox-Flow Batteries: From Metals to Organic Redox-Active Materials. Angew. Chemie-Int. Ed. 2017, 56 (3), 686-711. https://doi.org/10.1002/anie.201604925.

Pan, F.; Yang, J.; Huang, Q.; Wang, X.; Huang, H.; Wang, Q. Redox Targeting of Anatase $TiO_2$ for Redox Flow Lithium-Ion Batteries. Adv. Energy Mater. 2014, 4 (15), 1400567. https://doi.org/10.1002/aenm.201400567.

Jia, C.; Pan, F.; Zhu, Y. G.; Huang, Q.; Lu, L.; Wang, Q. High-Energy Density Nonaqueous All Redox Flow Lithium Battery Enabled with a Polymeric Membrane. Sci. Adv. 2015, 1 (10), 1-7. https://doi.org/10.1126/sciadv.1500886.

Yu, J.; Fan, L.; Yan, R.; Zhou, M.; Wang, Q. A Redox Targeting-Based Aqueous Redox Flow Lithium Battery. ACS Energy Lett. 2018, acsenergylett.8b01420. https://doi.org/10.1021/acsenergylett.8b01420.

Roe, S.; Menictas, C.; Skyllas-Kazacos, M. A High Energy Density Vanadium Redox Flow Battery with 3 M Vanadium Electrolyte. J. Electrochem. Soc. 2015, 163 (1), A5023-A5028. https://doi.org/10.1149/2.0041601jes.

Sevov, C. S.; Fisher, S. L.; Thompson, L. T.; Sanford, M. S. Mechanism-Based Development of a Low-Potential, Soluble, and Cyclable Multielectron Anolyte for Nonaqueous Redox Flow Batteries. J. Am. Chem. Soc. 2016, 138 (47), 15378-15384. https://doi.org/10.1021/jacs.6b07638.

Zhang, J.; Shkrob, I. A.; Assary, R. S.; Tung, S. O.; Silcox, B.; Curtiss, L. A.; Thompson, L.; Zhang, L. Toward Improved Catholyte Materials for Redox Flow Batteries: What Controls Chemical Stability of Persistent Radical Cations? J. Phys. Chem. C 2017, 121 (42), 23347-23358. https://doi.org/10.1021/acs.jpcc.7b08281.

Liu, T.; Wei, X.; Nie, Z.; Sprenkle, V.; Wang, W. A Total Organic Aqueous Redox Flow Battery Employing a Low Cost and Sustainable Methyl Viologen Anolyte and 4-HO-TEMPO Catholyte. Adv. Energy Mater. 2016, 6 (3), 1-8. https://doi.org/10.1002/aenm.201501449.

Wei, X.; Xu, W.; Vijayakumar, M.; Cosimbescu, L.; Liu, T.; Sprenkle, V.; Wang, W. TEMPO-Based Catholyte for High-Energy Density Nonaqueous Redox Flow Batteries. Adv. Mater. 2014, 26 (45), 7649-7653. https://doi.org/l0.1002/adma.201403746.

Janoschka, T.; Morgenstern, S.; Hiller, H.; Friebe, C.; Wolkersdörfer, K.; Haupler, B.; Hager, M. D.; Schubert, U. S. Synthesis and Characterization of TEMPO- and Viologen-Polymers for Water-Based Redox-Flow Batteries. Polym. Chem. 2015, 6 (45), 7801-7811. https://doi.org/10.1039/C5PY01602A.

Sevov, C. S.; Samaroo, S. K.; Sanford, M. S. Cyclopropenium Salts as Cyclable, High-Potential Catholytes in Nonaqueous Media. Adv. Energy Mater. 2017, 7 (5). https://doi.org/10.1002/aenm.201602027.

Hendriks, K. H.; Robinson, S. G.; Braten, M. N.; Sevov, C. S.; Helms, B. A.; Sigman, M. S.; Minteer, S. D.; Sanford, M. S. High-Performance Oligomeric Catholytes for Effective Macromolecular Separation in Nonaqueous Redox Flow Batteries. ACS Cent. Sci. 2018, acscentsci.7b00544. https://doi.org/10.1021/acscentsci.7b00544.

Beh, E. S.; De Porcellinis, D.; Gracia, R. L.; Xia, K. T.; Gordon, R. G.; Aziz, M. J. A Neutral PH Aqueous Organic-Organometallic Redox Flow Battery with Extremely High Capacity Retention. ACS Energy Lett. 2017, 2 (3), 639-644. https://doi.org/l0.1021/acsenergylett.7b00019.

DeBruler, C.; Hu, B.; Moss, J.; Luo, J.; Liu, T. L. A Sulfonate-Functionalized Viologen Enabling Neutral Cation Exchange, Aqueous Organic Redox Flow Batteries toward Renewable Energy Storage. ACS Energy Lett. 2018, No. 614, 663-668. https://doi.org/l0.1021/acsenergylett.7b01302.

Hendriks, K. H.; Sevov, C. S.; Cook, M. E.; Sanford, M. S. Multielectron Cycling of a Low-Potential Anolyte in Alkali Metal Electrolytes for Nonaqueous Redox Flow Batteries. ACS Energy Lett. 2017, 2 (10), 2430-2435. https://doi.org/10.1021/acsenergylett.7b00559.

Sevov, C. S.; Hickey, D. P.; Cook, M. E.; Robinson, S. G.; Bamett, S.; Minteer, S. D.; Sigman, M. S.; Sanford, M. S. Physical Organic Approach to Persistent, Cyclable, Low-Potential Electrolytes for Flow Battery Applications. J. Am. Chem. Soc. 2017, 139 (8), 2924-2927. https://doi.org/10.1021fjacs.7b00147.

Duan, W.; Huang, J.; Kowalski, J. A.; Shkrob, I. A.; Vijayakumar, M.; Walter, E.; Pan, B.; Yang, Z.; Milshtein, J. D.; Li, B.; et al. "wine-Dark Sea" in an Organic Flow Battery: Storing Negative Charge in 2,1,3-Benzothiadiazole Radicals Leads to Improved Cyclability. ACS Energy Lett. 2017, 2 (5), 1156-1161. https://doi.org/10.1021/acsenergylett.7b00261.

Aminabhavi, T. M.; Balundgi, R. H.; Cassidy, P. E. A Review on Biodegradable Plastics. Polym. Plast. Technol. Eng. 1990, 29 (3), 235-262. https://doi.org/10.1080/03602559008049843.

Muench, S.; Wild, A.; Friebe, C.; Ha, B.; Janoschka, T.; Schubert, U. S. Polymer-Based Organic Batteries. Chem. Rev. 2016, No. 116, 9438-9484. https://doira/10.1021/acs.chemrev.6b00070.

Janoschka, T.; Martin, N.; Martin, U.; Friebe, C.; Morgenstem, S.; Hiller, H.; Hager, M. D.; Schubert, U. S. An Aqueous, Polymer-Based Redox-Flow Battery Using Non-Corrosive, Safe, and Low-Cost Materials. Nature 2015, 527, 78-81. https://doi.org/l0.1038/nature15746.

Doris, S. E.; Ward, A. L.; Baskin, A.; Frischmann, P. D.; Gavvalapalli, N.; Chenard, E.; Sevov, C. S.; Prendergast, D.; Moore, J. S.; Helms, B. A. Macromolecular Design Strategies for Preventing Active-Material Crossover in Non-Aqueous All-Organic Redox-Flow Batteries. Angew. Chemie-Int. Ed. 2017, 56 (6), 1595-1599. https://doi.org/10.1002/anie.201610582.

Schon, T. B.; McAllister, B. T.; Li, P.-F.; Seferos, D. S. The Rise of Organic Electrode Materials for Energy Storage. Chem. Soc. Rev. 2016, 45 (22), 6345-6404. https://doi.org/l0.1039/C6CS00173D.

Ruckenstein, E.; Li, Z. F. Surface Modification and Functionalization through the Self-Assembled Monolayer and Graft Polymerization. Adv. Colloid Interface Sci. 2005, 113 (1), 43-63. https://doi.org/10.1016/J.CIS.2004.07.009.

Phal, S.; Shatri, B.; Berisha, A.; Geladi, P.; Lindholm-Sethson, B.; Tesfalidet, S. Covalently Electrografted Carboxyphenyl Layers onto Gold Surface Serving as a Platform for the Construction of an Immunosensor for Detection of Methotrexate. J. Electroanal. Chem. 2018, No. October 2017, 0-1. https://doi.org/10.1016/j.jelechem.2017.12.072.

Moeller, K. D. Using Physical Organic Chemistry To Shape the Course of Electrochemical Reactions. Chem. Rev. 2018, 118, 4817-4833. https://doi.org/10.1021/acs.chemrev.7b00656.

Sun, Z.; Li, Z.; Gao, L.; Zhao, X.; Han, D.; Gan, S.; Guo, S.; Niu, L. Grafting Benzenediazonium Tetrafluoroborate onto LiNi x Co y Mn z O 2 Materials Achieves Subzero-Temperature High-Capacity Lithium-Ion Storage via a Diazonium Soft-Chemistry Method. 2018. https://doi.org/10.1002/aenm.201802946.

Jalkh, J.; Leroux, Y. R.; Vacher, A.; Lorcy, D.; Hapiot, P.; Lagrost, C. Tetrathiafulvalene-Tetracyanoquinodimethane Charge-Transfer Complexes Wired to Carbon Surfaces: Tuning of the Degree of Charge Transfer. J. Phys. Chem. C 2016, acs.jpcc.6b09459. https://doi.org/10.1021/acs.jpcc.6b09459.

Derible, A.; Diebold, C.; Dentzer, J.; Gadiou, R.; Becht, J. M.; Le Drian, C. A Palladium Catalyst Supported on Carbon-Coated Cobalt Nanoparticles-Preparation of Palladium-Free Biaryls by Suzuki-Miyaura Reactions in Ethanol. European J. Org. Chem. 2014, 2014 (34), 7699-7706. https://doi.org/10.1002/ejoc.201403038.

Johnson, B. M.; Francke, R.; Little, R. D.; Berben, L. A. High Turnover in Electro-Oxidation of Alcohols and Ethers with a Glassy Carbon-Supported Phenanthroimidazole Mediator. Chem. Sci. 2017, 8 (9), 6493-6498. https://doi.org/10.1039/C7SC02482G.

Ortiz-Medina, J.; Wang, Z.; Cruz-Silva, R.; Morelos-Gomez, A.; Wang, F.; Yao, X.; Terrones, M.; Endo, M. Defect Engineering and Surface Functionalization of Nanocarbons for Metal-Free Catalysis. Adv. Mater. 2019, 1805717. https://doi.org/10.1002/adma.201805717.

Yoo, S. J.; Li, L.-J.; Zeng, C.-C.; Little, R. D. Polymeric Ionic Liquid and Carbon Black Composite as a Reusable Supporting Electrolyte: Modification of the Electrode Surface. Angew. Chemie Int. Ed. 2015, 54 (12), 3744-3747. https://doi.org/10.1002/anie.201410207.

Chen, H.; Tu, H.; Hu, C.; Liu, Y.; Dong, D.; Sun, Y.; Dai, Y.; Wang, S.; Qian, H.; Lin, Z.; et al. Cationic Covalent Organic Framework Nanosheets for Fast Li-Ion Conduction. J. Am. Chem. Soc. 2018, No. step II, jacs.7b12292. https://doi.org/10.1021/jacs.7b12292.

Maharjan, M.; Wai, N.; Veksha, A.; Giannis, A.; Lim, T. M.; Lisak, G. Sal Wood Sawdust Derived Highly Mesoporous Carbon as Prospective Electrode Material for Vanadium Redox Flow Batteries. J. Electroanal. Chem. 2019, 834, 94-100. https://doi.org/10.1016/j.jelechem.2018.12.049.

Friedrich, J. M.; Ponce-de-León, C.; Reade, G. W.; Walsh, F. C. Reticulated Vitreous Carbon as an Electrode Material. J. Electroanal. Chem. 2004, 561, 203-217. https://doi.org/l0.1016/j.jelechem.2003.07.019.

Gietter, A. A. S.; Pupillo, R. C.; Yap, G. P. A.; Beebe, T. P.; Rosenthal, J.; Watson, D. A. On-Surface Cross-Coupling Methods for the Construction of Modified Electrode Assemblies with Tailored Morphologies. Chem. Sci. 2013, 4, 437. https://doi.org/l0.1039/c2sc21413j.

Pinson, J.; Podvorica, F. Attachment of Organic Layers to Conductive or Semiconductive Surfaces by Reduction of Diazonium Salts. Chem. Soc. Rev. 2005, 34 (5), 429-439. https://doi.org/10.1039/b406228k.

What is claimed is:

1. A redox-relay flow battery comprising:

a half-cell electrode chamber comprising an electrode, wherein the half-cell electrode chamber is in fluid communication with a reservoir;

wherein the half-electrode chamber further comprises a shuttle material comprising one or more redox-active organic compounds (ROM);

wherein the reservoir comprises a plurality of redox-active solids (ROS);

wherein at least a portion of the plurality of the redox-active solids comprises insoluble analogs of the one or more redox-active organic compounds of the shuttle material, wherein the insoluble analogs comprise the same monomer units present in the one or more redox-active organic compounds of the shuttle material;

wherein the shuttle material is configured to circulate through the half-cell electrode chamber to the reservoir to relay a charge between at least a portion of the redox-active solids and the electrode; and wherein the plurality of the redox-active solids exhibit a redox potential substantially identical to a redox potential of the one or more redox-active organic compounds.

2. The redox-relay flow battery of claim 1, further comprising an electrolyte, wherein the electrolyte circulates between the half-cell electrode chamber and the reservoir.

3. The redox-relay flow battery of claim 2, wherein the plurality of the redox-active solids are substantially insoluble in the electrolyte.

4. The redox-relay flow battery of claim 1, wherein the insoluble analogs comprise an insoluble crosslinked polymer comprising the monomers units of the shuttle material; or the insoluble analogues comprise a covalent self-assembly comprising the monomer units of the shuttle material; or at least a portion of the plurality of the redox-active solids comprises the one or more redox-active organic compounds of the shuttle material covalently bonded to a support.

5. The redox-relay flow battery of claim 1, wherein the one or more of redox-active organic compounds present in the shuttle material have a structure comprising

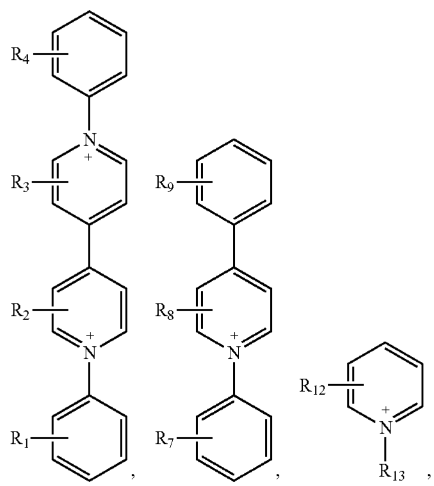

, , ,

-continued

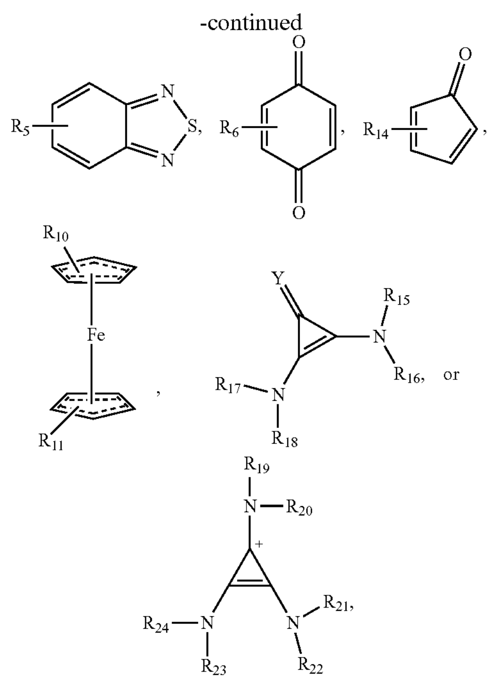

wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl;

wherein $R_1$ through $R_{24}$, each independent of other are optionally substituted by a group having a formula —$XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur.

6. The redox-relay flow battery of claim 1, wherein the half-cell electrode chamber is a cathode cell chamber, and wherein the electrode is a cathode.

7. The redox-relay flow battery of claim 1, wherein the battery further comprises an anode cell chamber comprising an anode that is in fluid communication with a reservoir; wherein the anode cell chamber further comprises the shuttle comprising one or more redox-active organic compounds; wherein the reservoir comprises a plurality of redox-active solids (ROS), wherein at least a portion of the plurality of the redox-active solids comprises insoluble analogs comprising monomer units of the one or more redox-active organic compounds of the shuttle material; wherein the shuttle material is configured to circulate through the anode cell chamber to the reservoir to relay a charge between at least a portion of the redox-active solids and the anode; and wherein the plurality of the redox-active solids exhibit a redox potential substantially identical to a redox potential of the one or more redox-active organic compounds.

8. The redox-relay flow battery of claim 1, wherein the half-cell electrode chamber is an anode cell chamber, and wherein the electrode is an anode.

9. The redox relay flow battery of claim 8, wherein the battery further comprises a cathode cell chamber comprising a cathode, and wherein the cathode cell chamber is in fluid communication with a reservoir; wherein the cathode cell chamber further comprises the shuttle comprising one or more redox-active organic compounds; wherein the reservoir comprises a plurality of redox-active solids (ROS) wherein at least a portion of the plurality of the redox-active solids comprises insoluble analogs comprising monomer units of the one or more redox-active organic compounds of the shuttle material; wherein the shuttle material is configured to circulate through the cathode cell chamber to the reservoir to relay a charge between at least a portion of the redox-active solids and the cathode; and wherein the plurality of the redox-active solids exhibit a redox potential substantially identical to a redox potential of the one or more redox-active organic compounds.

10. The redox-relay flow battery of claim 1, wherein the plurality of redox-active solids have a shape of spheres, shards, or a combination thereof, and wherein the shape of at least a portion of the redox-active solids, is substantially unchanged during charge/discharge operation of the battery.

11. A method comprising:

providing one or more redox-active organic compounds having a structure comprising:

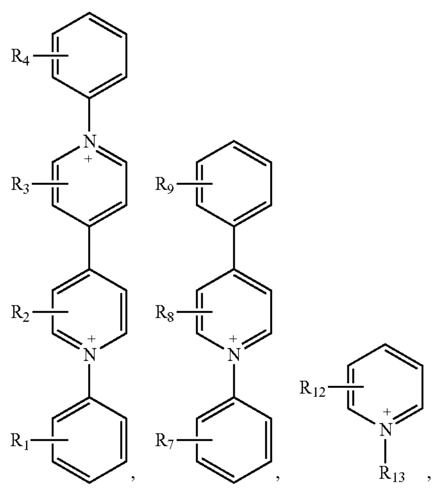

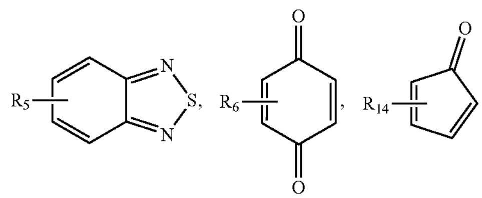

-continued

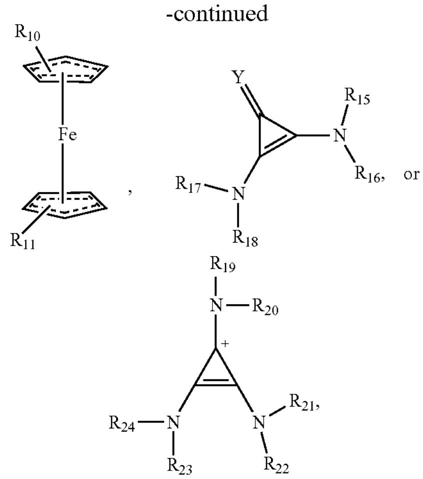

, or wherein $R_1$ through $R_{24}$, each independent of other, are selected from a hydrogen, halogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each of $R_1$ through $R_{24}$ independent of the other, is further optionally substituted with $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl;

wherein $R_1$ through $R_{24}$, each independent of other are optionally substituted by a group having a formula —$XR_n$, wherein X is O, S, or N, and each R of $R_n$ is independently selected from a hydrogen, $C_1$-$C_{22}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, $C_6$-$C_{14}$ aryloxy, wherein each R of $R_n$ independently of each other, is further optionally substituted with $C_1$-$C_{10}$ alkyl, $C_1$-$C_{22}$ alkoxy, $C_2$-$C_{22}$ alkenyl, $C_2$-$C_{22}$ alkynyl, $C_6$-$C_{14}$ aryl, $C_1$-$C_{13}$ heteroaryl, halogen, amino, carbonyl, ester, ether, halide, carboxyl, hydroxy, nitro, cyano, silyl, sulfo-oxo, sulfonyl, sulfone, sulfoxide, thiol, or phosphonyl; and wherein n is from 0 to 3; and wherein Y is oxygen or sulfur;

forming a plurality of redox-active solids; and forming a redox-relay battery of claim 1.

12. The method of claim 11, wherein the step of forming the plurality of the redox-active solids comprises polymerizing monomers of the one or more redox-active organic compounds to form an insoluble crosslinked polymer comprising monomer units of the redox-active organic compounds; or wherein the step of forming the plurality of the redox-active solids comprises polymerizing monomers of the one or more redox-active organic compounds to form a covalent self-assembly, or wherein the step of forming the plurality of the redox-active solids comprises covalently bonding the one or more redox-active organic compounds to a support.

13. The method of claim 11, wherein the step of forming the battery comprises:

positioning an electrode in a half-cell electrode chamber;

providing an electrolyte comprising the one or more redox-active organic compounds;

wherein the half-cell electrode chamber is in fluid communication with a reservoir comprising the plurality of the redox-active solids; and wherein the one or more redox-active organic compounds behave as a shuttle material configured to circulate through the half-cell electrode chamber to the reservoir to relay a charge between at least a portion of the redox-active solids and the electrode.

14. The method of claim 11, wherein the plurality of the redox-active solids exhibit a redox potential substantially identical to a redox potential of the one or more redox-active organic compounds.

15. The method of claim 13, further comprising providing a counter half-cell electrode chamber is in fluid communication with a reservoir comprising the plurality of the redox-active solids; and wherein the one or more redox-active organic compounds behave as a shuttle material configured to circulate through the half-cell electrode chamber to the reservoir to relay a charge between at least a portion of the redox-active solids and the counter electrode.

16. The redox-relay flow battery of claim 1, wherein the battery exhibits a voltaic efficiency of greater than 95%.

* * * * *